July 3, 1962

L. W. IMM ET AL 3,042,297

ATTACK DIRECTOR

Filed Feb. 19, 1954

INVENTORS:
LEWIS W. IMM,
ROY I. CASE, JR.,
BY CHESTER BRANDON,

ATTORNEY.

July 3, 1962

L. W. IMM ET AL 3,042,297

ATTACK DIRECTOR

Filed Feb. 19, 1954

INVENTORS:
LEWIS W. IMM,
ROY I. CASE, JR.,
BY CHESTER BRANDON.

ATTORNEY.

July 3, 1962

L. W. IMM ET AL 3,042,297

ATTACK DIRECTOR

Filed Feb. 19, 1954

AUTOMATICALLY TRANSMITTED INPUTS

| SOURCE | RC'D BY | QUANTITY | SYM. |
|---|---|---|---|
| BEARING CONSOLE | 519 - 520 | RELATIVE SONAR BEARING | $Brq$ |
| RANGE RECORDER | 106 - 107 | SONAR RANGE | $Rq$ |
| RANGE RECORDER | 250 | SONAR RANGE CORRECTION | $Rqj$ |
| GYRO COMPASS | 526 - 525 | OWN SHIP COURSE | $Co$ |
| PITOMETER LOG | 401 | OWN SHIP SPEED | $So$ |

MANUALLY INTRODUCED INPUTS

| QUANTITY | ENTERED AT | SYMBOL |
|---|---|---|
| TARGET ANGLE | 17 | $A$ |
| TARGET SPEED | 20 | $S$ |
| TARGET TURN | 22 | $jC$ |
| TARGET DEPTH | 25 | $Hq$ |
| DEAD TIME PLUS TIME OF FLIGHT (FIXED) | 27 | $Tg+Tf$ |
| DEAD TIME PLUS TIME OF FLIGHT (TRAINABLE) | 30 | $Tg+Tf$ |
| PARALLAX PLUS EFFECTIVE RANGE (FIXED) | 32 | $Pl$ or $P+Re$ |
| PARALLAX (TRAINABLE) | 35 | $P$ |
| SINKING RATE (FIXED) | 37 | $Sd$ |
| SINKING RATE (TRAINABLE) | 40 | $Sd$ |

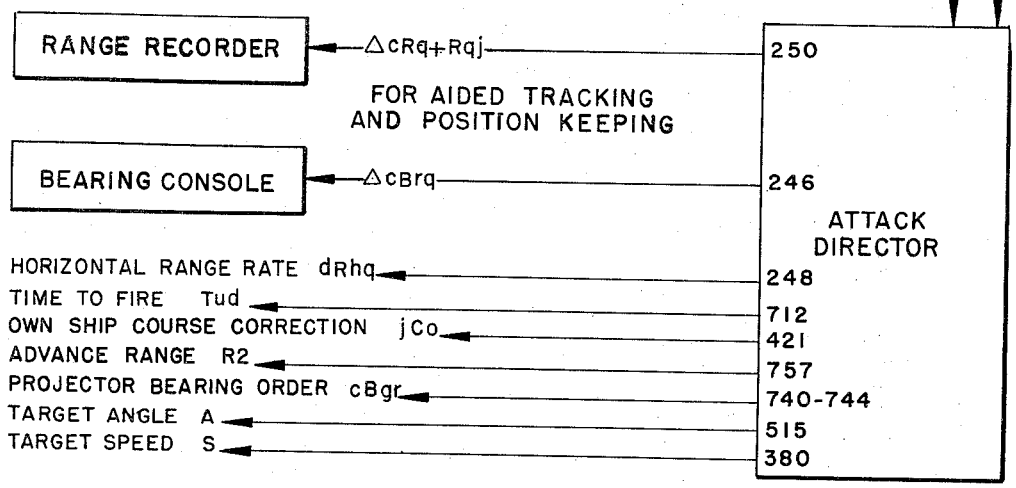

FIG.3.

INVENTORS:
LEWIS W. IMM,
ROY I. CASE, JR.,
BY  CHESTER BRANDON.

ATTORNEY.

July 3, 1962 L. W. IMM ET AL 3,042,297
ATTACK DIRECTOR
Filed Feb. 19, 1954 57 Sheets-Sheet 6

INVENTORS:
LEWIS W. IMM,
ROY I. CASE, JR.
BY CHESTER. BRANDON.

*F. Munro Redman*
ATTORNEY.

July 3, 1962

L. W. IMM ET AL 3,042,297

ATTACK DIRECTOR

Filed Feb. 19, 1954

INVENTORS:
LEWIS W. IMM,
ROY I. CASE, JR.,
BY CHESTER BRANDON.

ATTORNEY.

L. W. IMM ET AL 3,042,297

ATTACK DIRECTOR

Filed Feb. 19, 1954

INVENTORS:
LEWIS W. IMM,
ROY I. CASE, JR.,
BY CHESTER BRANDON.

ATTORNEY.

July 3, 1962

L. W. IMM ET AL 3,042,297

ATTACK DIRECTOR

Filed Feb. 19, 1954

INVENTORS:
LEWIS W. IMM,
ROY I. CASE, JR.,
BY  CHESTER BRANDON.

ATTORNEY.

July 3, 1962

L. W. IMM ET AL 3,042,297

ATTACK DIRECTOR

Filed Feb. 19, 1954

INVENTORS
LEWIS W. IMM,
ROY I. CASE, JR.,
BY CHESTER BRANDON.

ATTORNEY.

July 3, 1962

L. W. IMM ET AL 3,042,297

ATTACK DIRECTOR

Filed Feb. 19, 1954

INVENTORS:
LEWIS W. IMM,
ROY I. CASE, JR.,
BY      CHESTER BRANDON,

ATTORNEY.

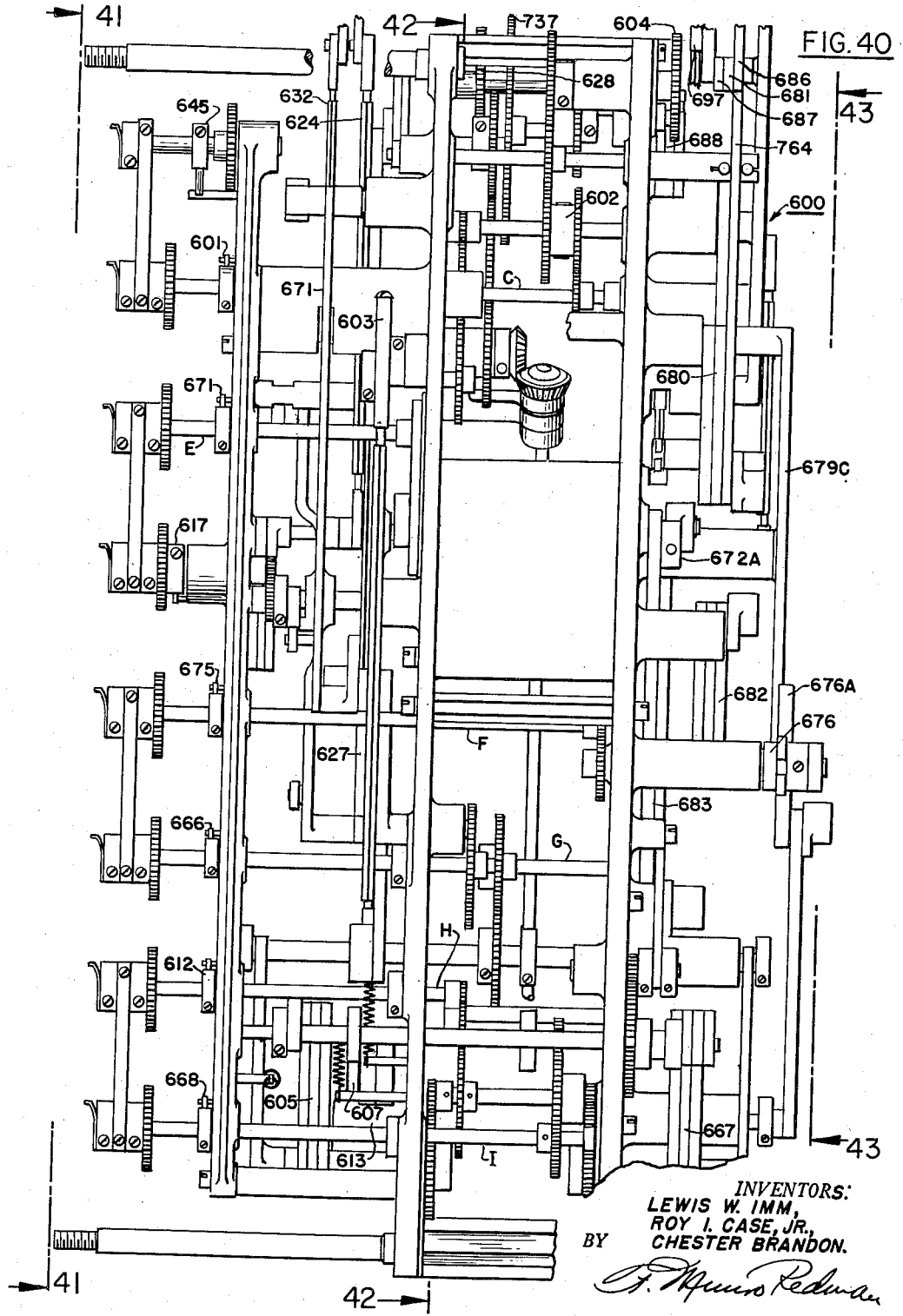

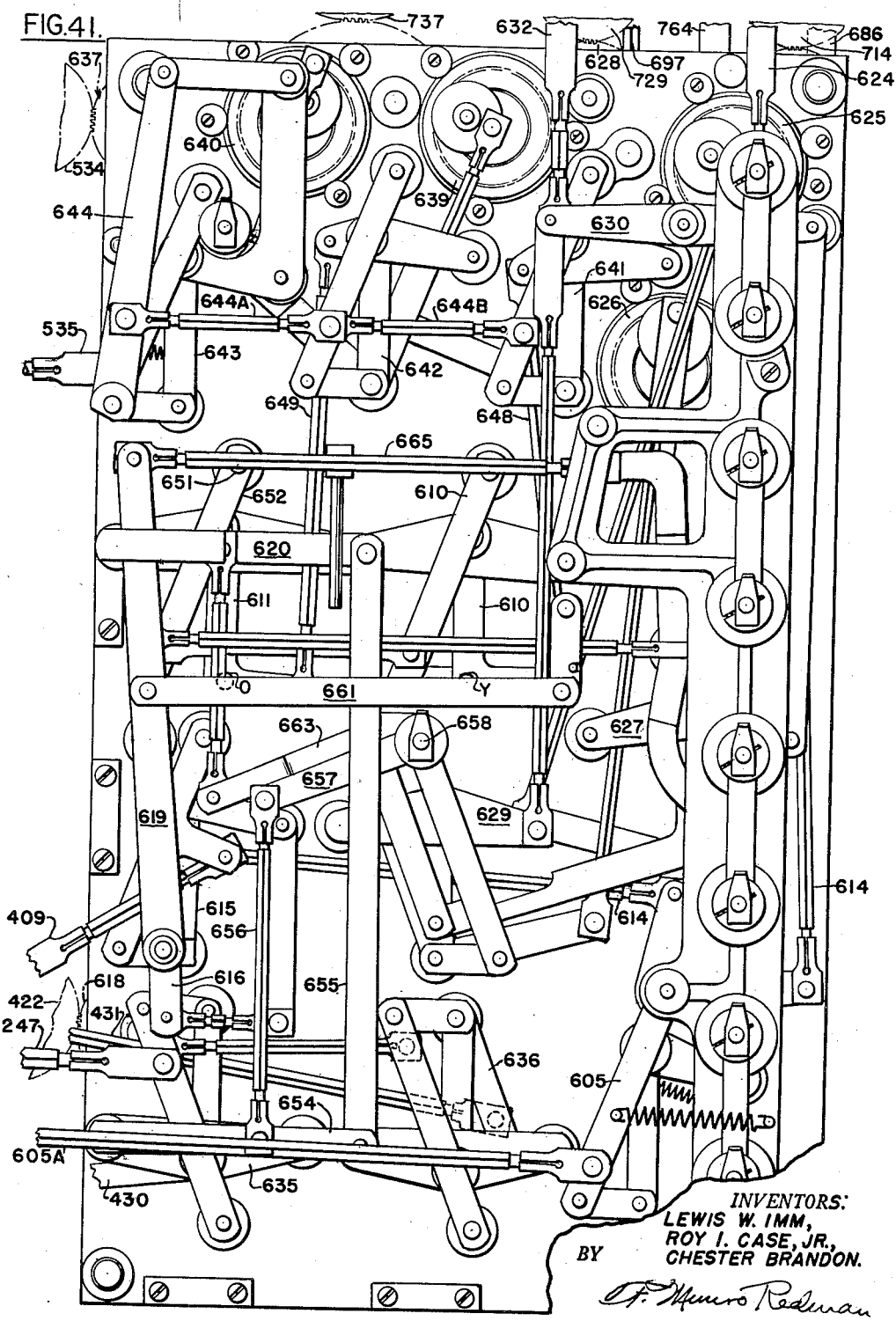

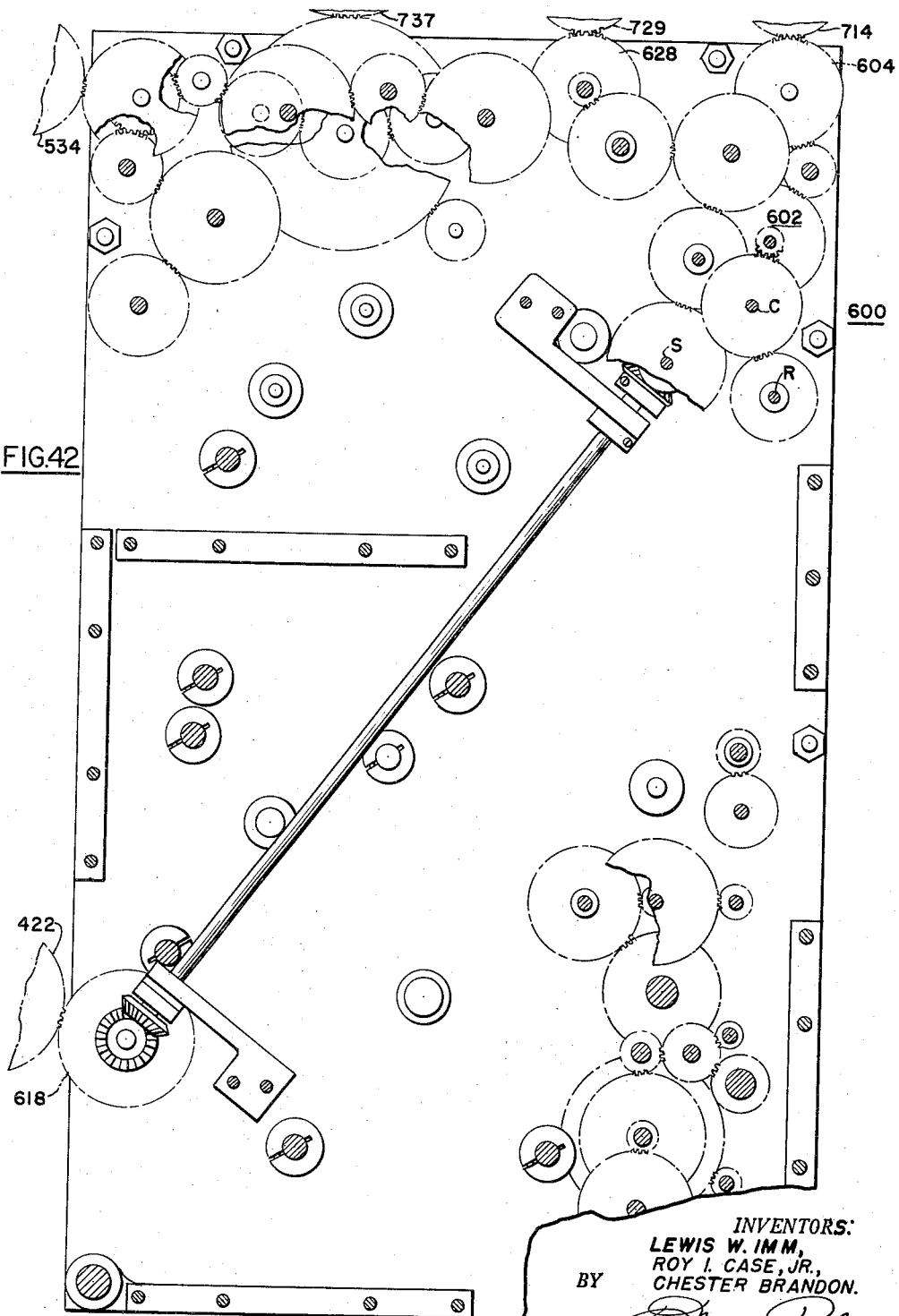

July 3, 1962  L. W. IMM ET AL  3,042,297
ATTACK DIRECTOR
Filed Feb. 19, 1954  57 Sheets-Sheet 44
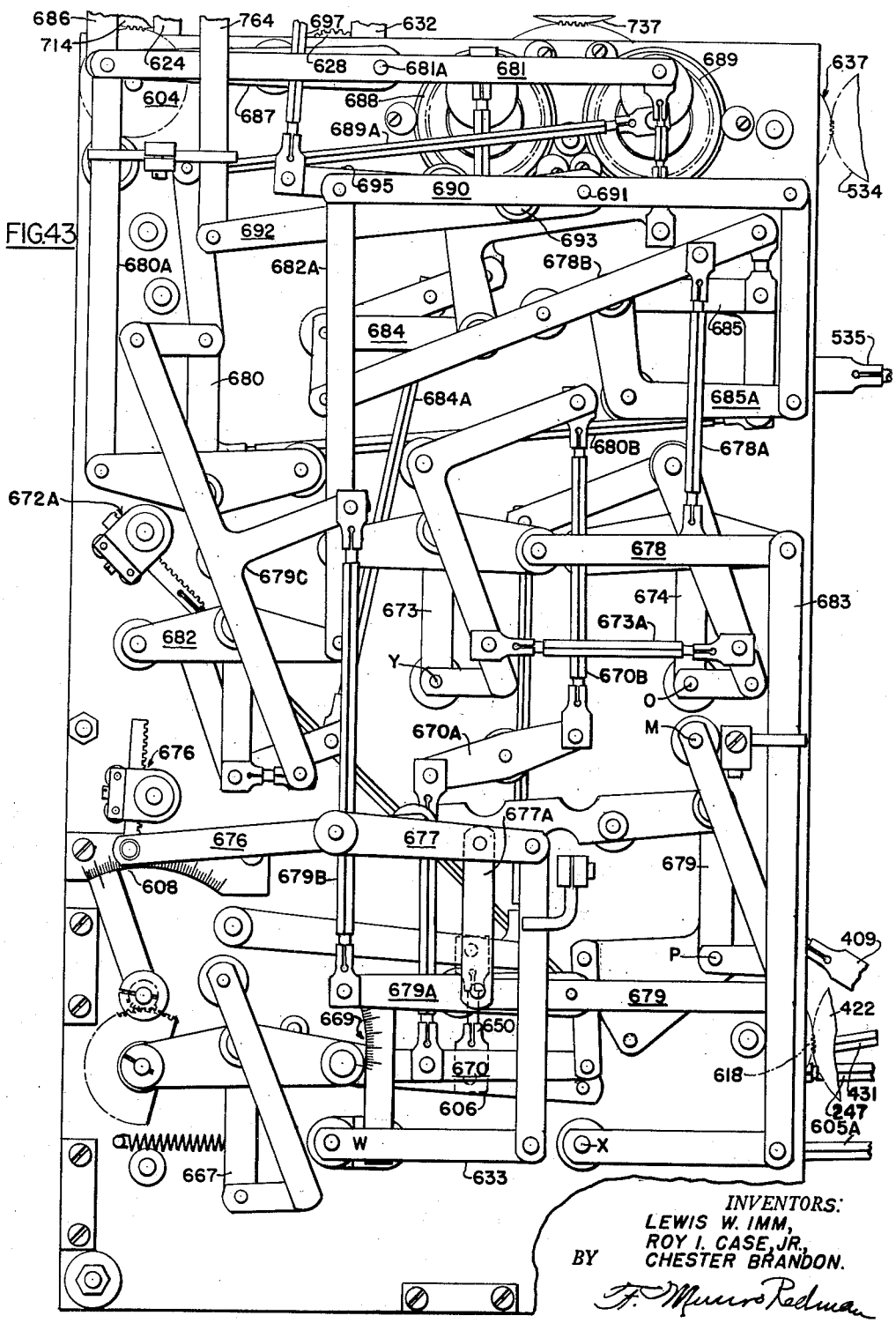
INVENTORS:
LEWIS W. IMM,
ROY I. CASE, JR.,
CHESTER BRANDON.
BY F. Munro Redman
ATTORNEY.

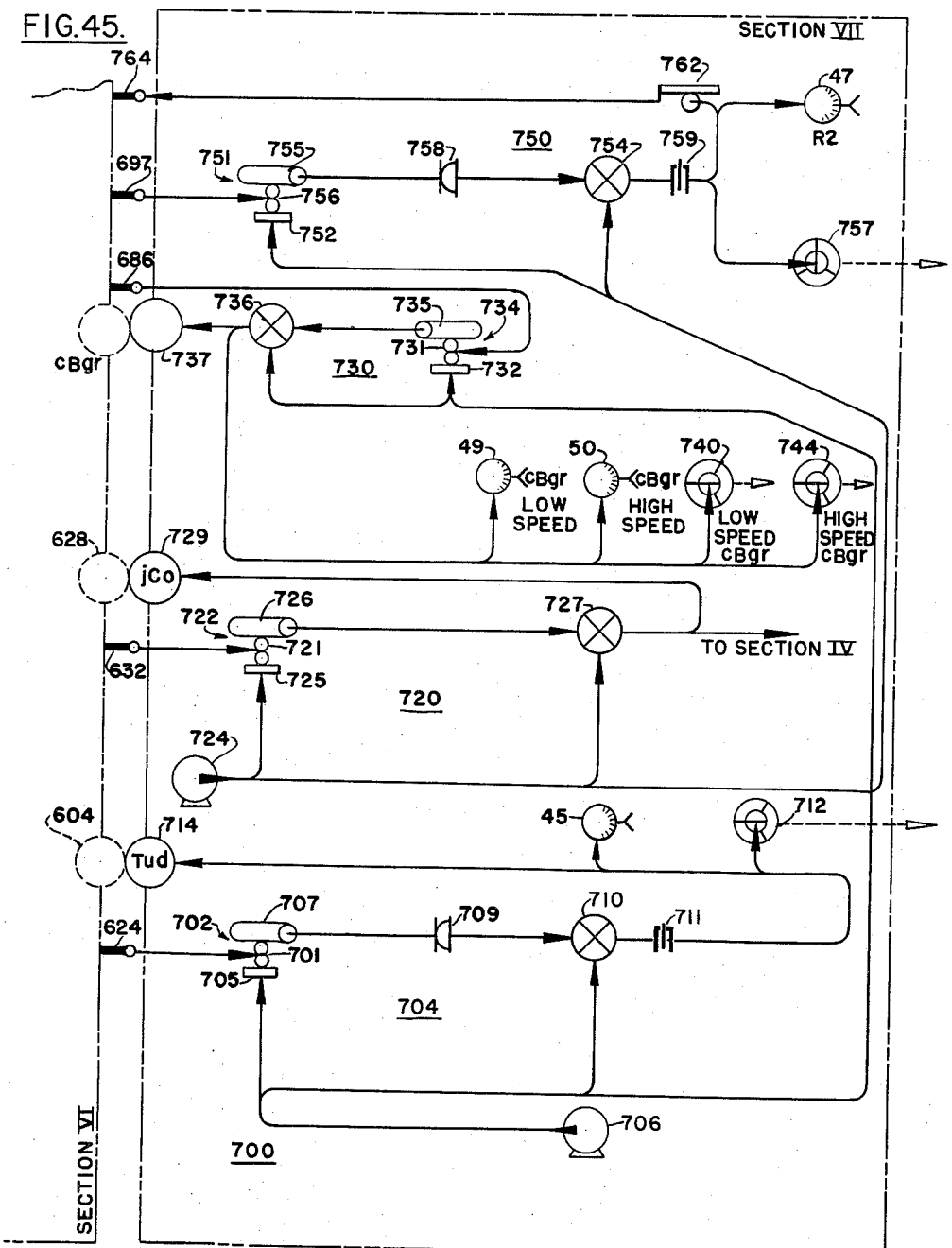

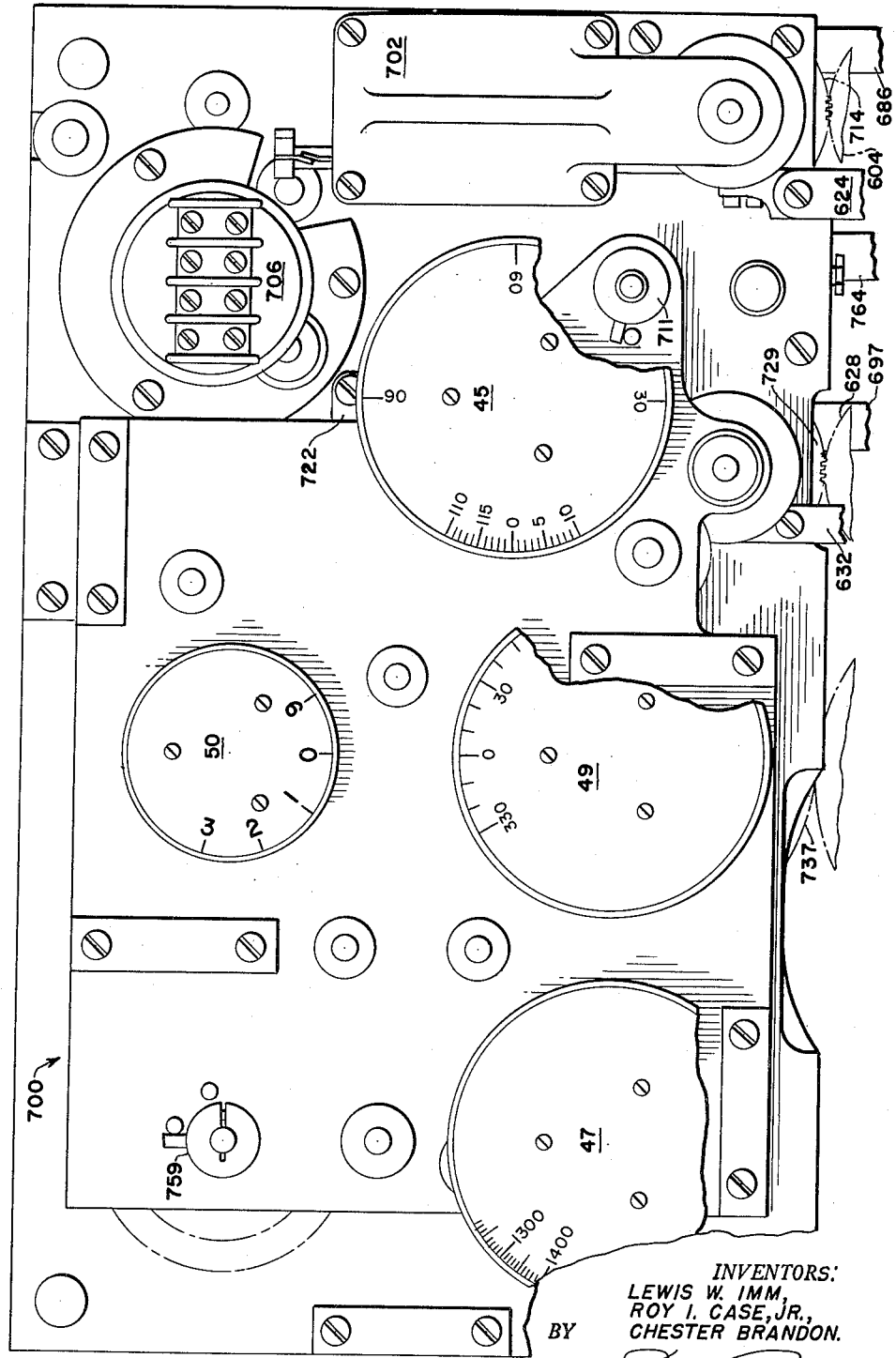

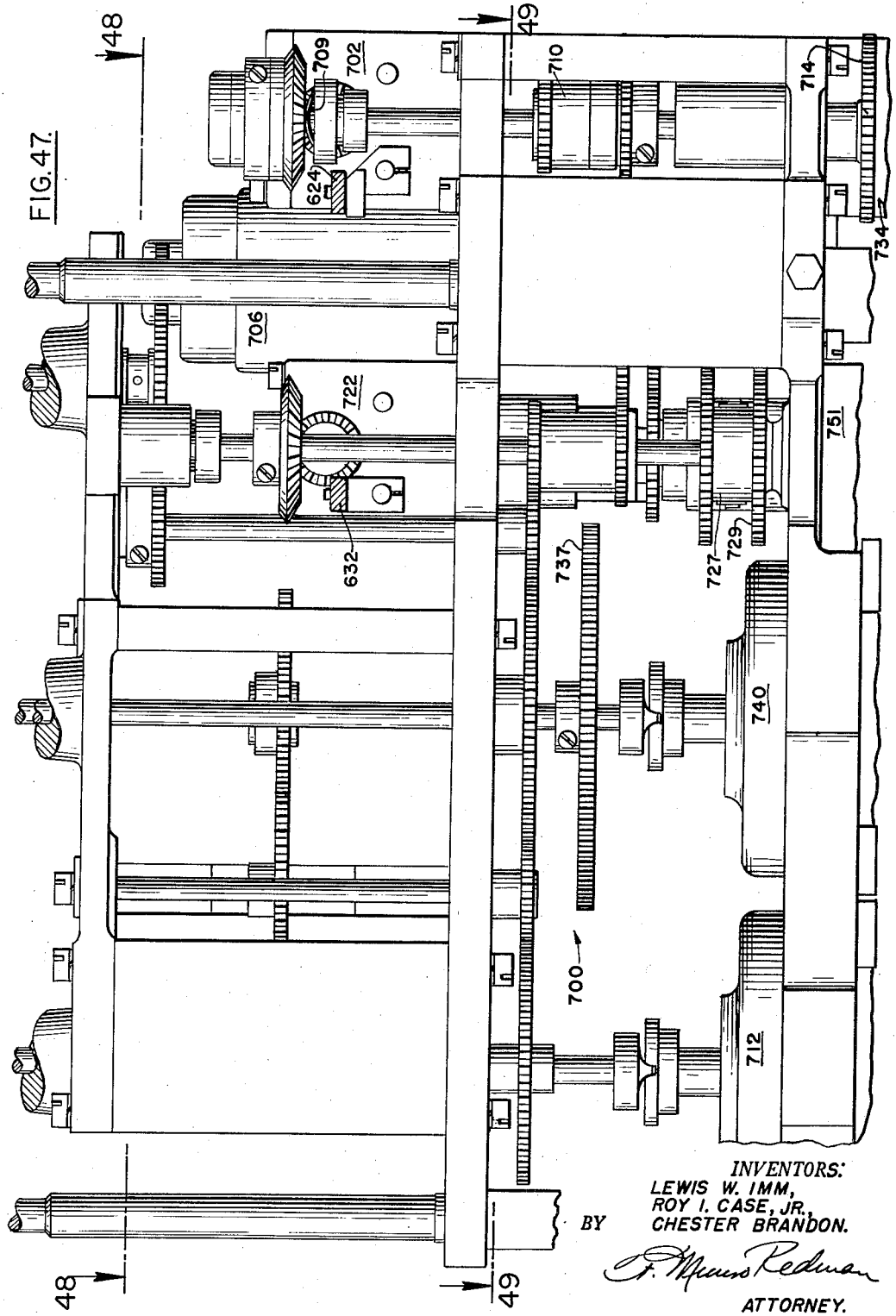

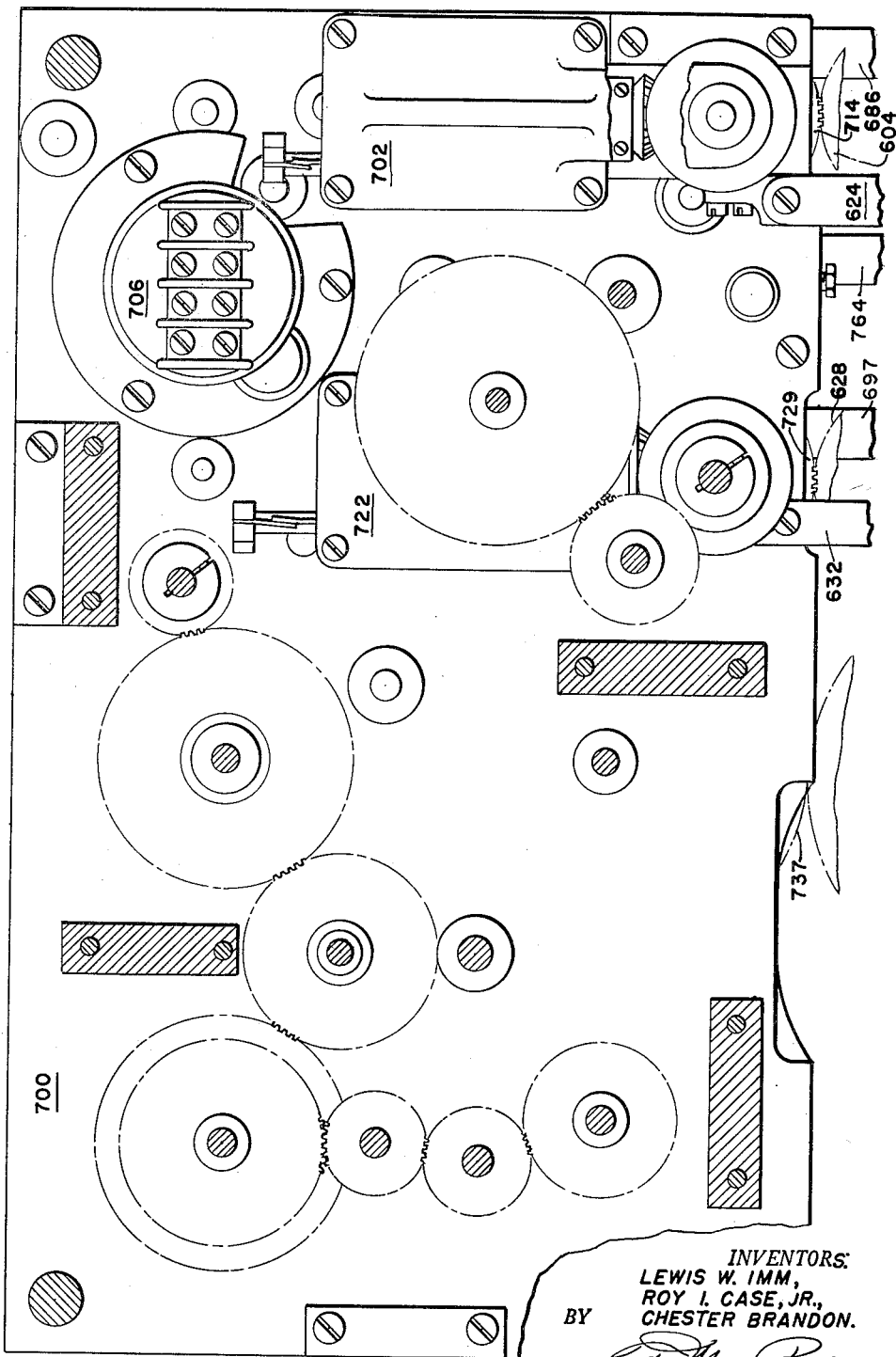

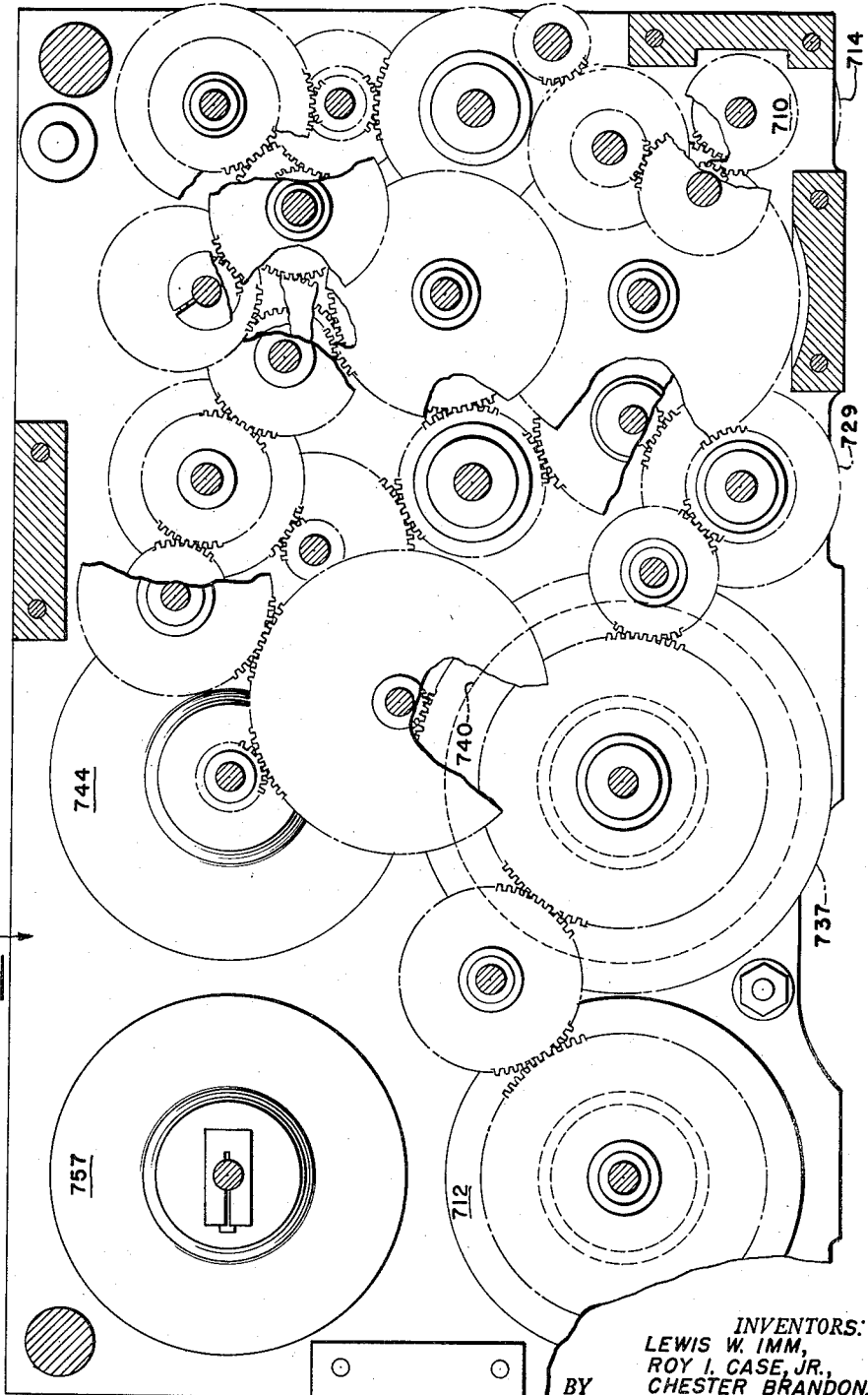

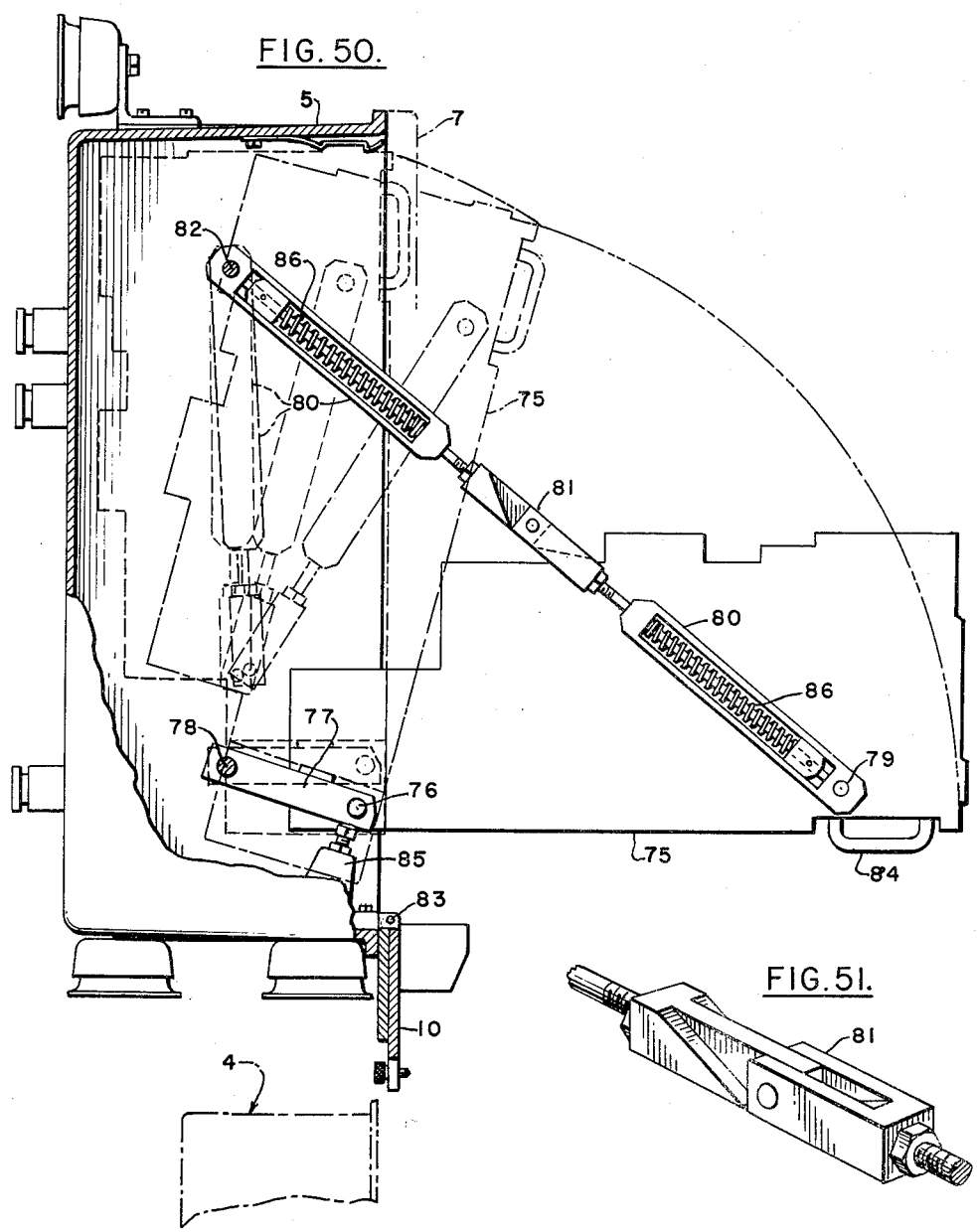

July 3, 1962 L. W. IMM ET AL 3,042,297
ATTACK DIRECTOR
Filed Feb. 19, 1954 57 Sheets-Sheet 52

INVENTORS:
LEWIS W. IMM,
ROY I. CASE, JR.,
BY CHESTER BRANDON.

ATTORNEY.

July 3, 1962 L. W. IMM ET AL 3,042,297
ATTACK DIRECTOR
Filed Feb. 19, 1954 57 Sheets-Sheet 53

INVENTORS:
LEWIS W. IMM,
ROY I. CASE, JR.,
BY CHESTER BRANDON.

ATTORNEY.

INVENTORS:
LEWIS W. IMM,
ROY I. CASE, JR.,
BY CHESTER BRANDON.

ATTORNEY.

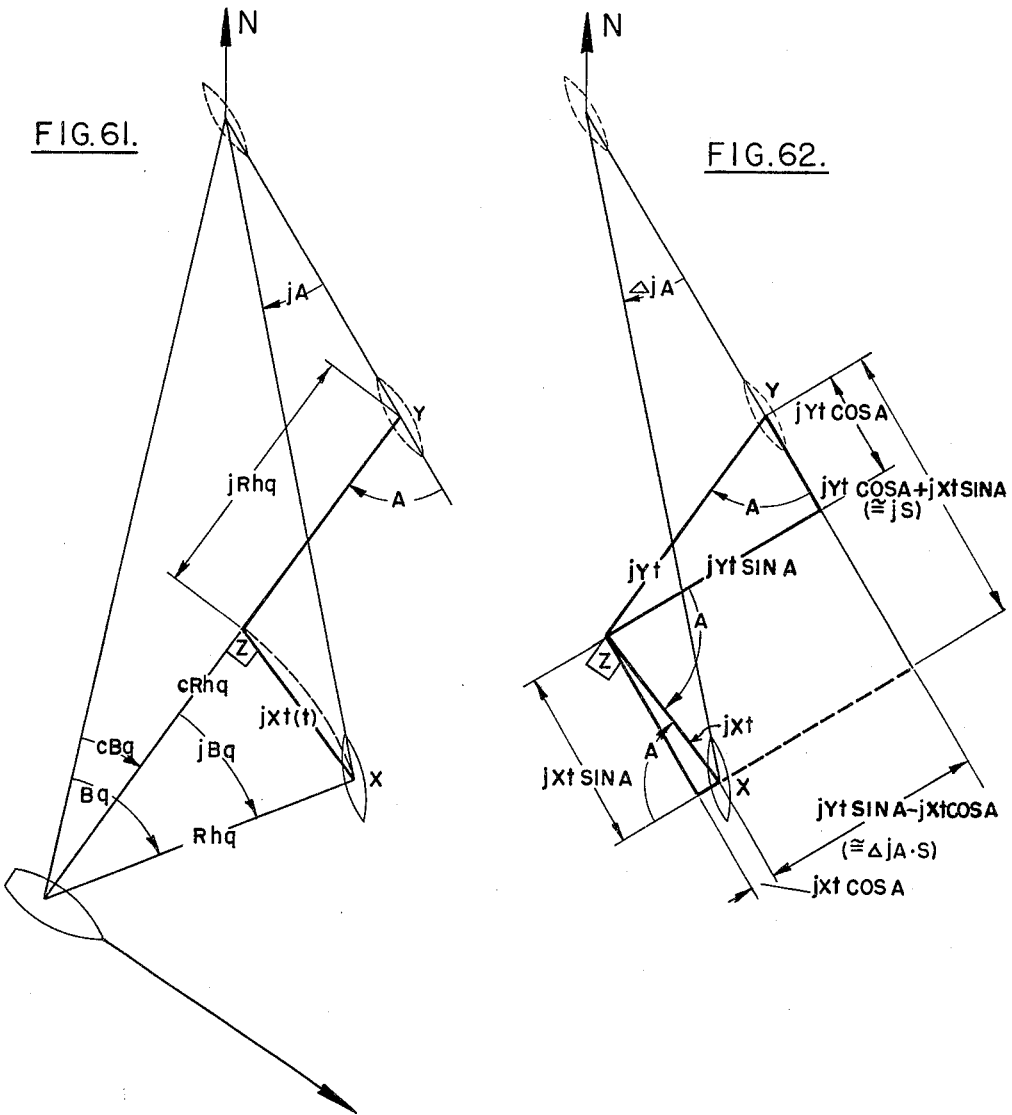

July 3, 1962   L. W. IMM ET AL   3,042,297
ATTACK DIRECTOR
Filed Feb. 19, 1954   57 Sheets-Sheet 56

INVENTOR.
LEWIS W. IMM,
ROY I. CASE, JR.,
BY   CHESTER BRANDON.

ATTORNEY.

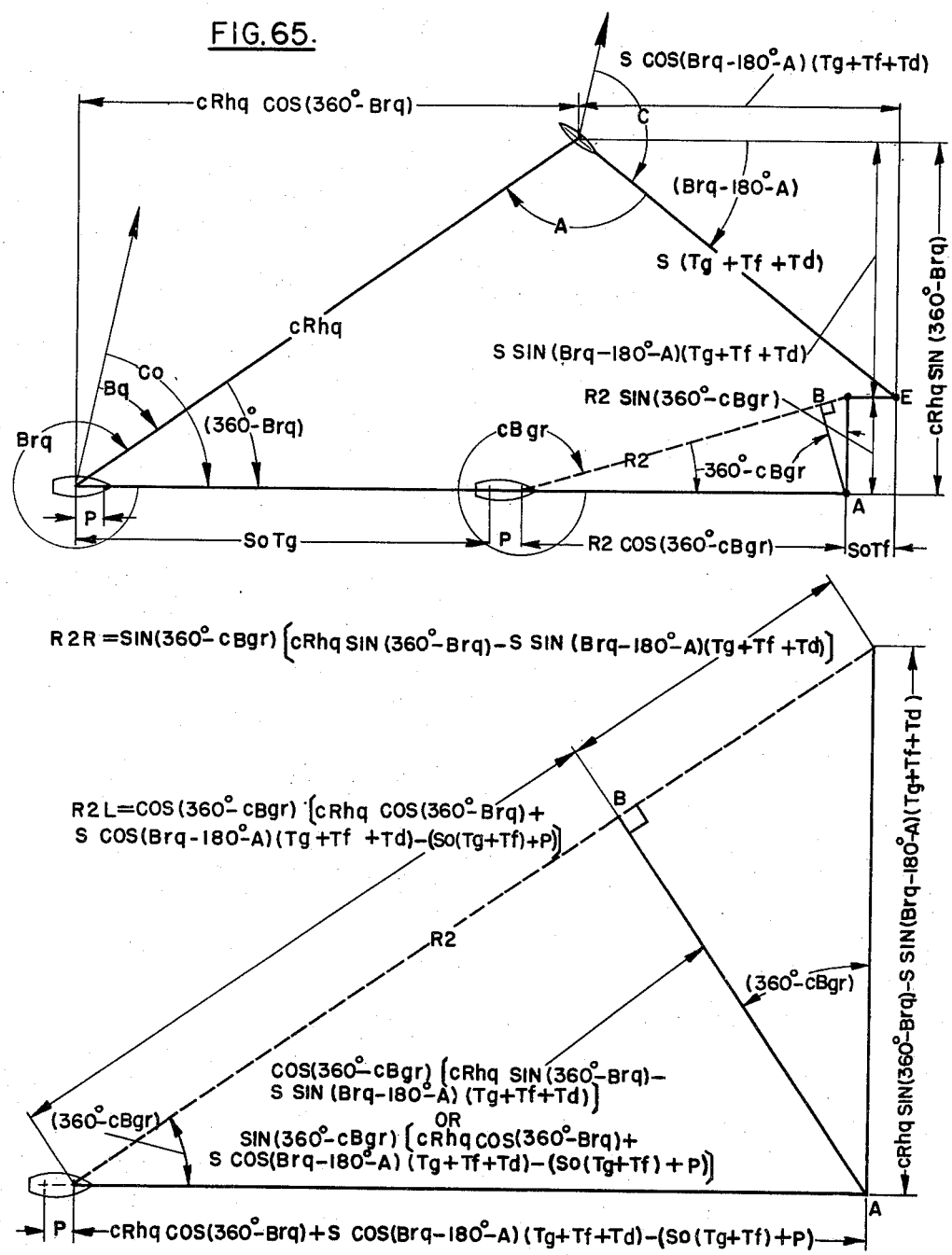

United States Patent Office 3,042,297
Patented July 3, 1962

3,042,297
ATTACK DIRECTOR
Lewis W. Imm, Los Angeles, Roy I. Case, Glendale, and Chester Brandon, La Canada, Calif., assignors to General Precision Inc., a corporation of Delaware
Filed Feb. 19, 1954, Ser. No. 411,334
59 Claims. (Cl. 235—61.5)

This invention relates to computing devices, and particularly to improvements in instruments for directing an attack by a surface vessel against a submarine.

Instruments for determining the course to steer and the time to fire in planning and carrying out the most effective attack on a submarine have been developed and used successfully. Such a device was disclosed in the pending U.S. patent application of Lewis W. Imm entitled "Anti-Submarine Attack Director," filed November 9, 1945 under Serial Number 627,587. The present invention is an improvement on the disclosure there presented.

In order that an instrument may function accurately for such a purpose, it is necessary to combine a substantial number of factors, both known and computed, as to the travel of the attacking vessel and the target, and of the explosive charges. Some of these factors are set into the device at the time of the attack by the operator, some are constants associated with a particular vessel, and others are computed by the device from data supplied to it.

An attack director of this sort is normally called into play when the presence of a submarine within an area is detected or suspected. The ship's sonar equipment is used to locate the submarine, giving the range and bearing of the target relative to the direction in which the attacking ship is headed. Successive bearings and ranges furnished by such sonar equipment are used by the attack director to compute the course and speed of the target continuously, with accuracy increasing as the attacking vessel comes closer to the target submarine.

At the same time, information as to the course and speed of the attacking vessel, or "own ship," is being furnished to the director, and this, together with the values representing the ballistic factors involved, is combined with the data as to target course and speed to give solutions to the problem which are continuously corrected as the attack proceeds.

The director transmits continuously signals for the guidance of the ship's personnel. At the proper time they may initiate firing signals, or such signals may be automatically transmitted to the appropriate equipment. When the data supplied to the instrument has been properly utilized, the projectiles discharged by own ship will explode in close proximity to the target, and the experience in actual use has been that such an attack director is able to increase by a substantial amount the probability of destroying the enemy submarine.

Three different solutions for the attack problem may be computed by the instrument, one for each of the three types of attacks employed. One solution is used for an attack with "stern-dropped" depth charges, which are released over the stern of the ship. A second is used with those missiles which are projected ahead of the ship in a direction parallel to its longitudinal axis, which are known as "fixed ahead-thrown" charges. The third solution is employed with explosives shot out by a projector which may be rotated in azimuth to point it at the target: these are known as "trainable-thrown" charges.

The director is arranged to solve either a fixed ahead-thrown problem or the stern-dropped and the trainable-thrown problems simultaneously. Thus an attack may include two firings on the target, an initial delivery by the trainable or ahead-thrown weapon, followed by a pattern of stern-dropped charges.

The target, during the progress of an attack, will probable be engaged in evasive maneuvers, so that continuous re-computations of the problem are necessary to take account of changes in target speed, course and depth. In some cases, sonar contact may be lost. If this occurs, the director is arranged to continue to predict the movements of the target on the basis of the data last available. This information is that most likely to keep the attacking ship on a course on which contact may be re-established with the target, and the function is referred to as "position keeping." Own ship may use the position keeping computations to continue to solve the attack problems.

The primary object of the invention will be seen to be to provide improved means for directing an attack upon an enemy submarine from a surface vessel.

Another object is the provision of means for following and predicting the course of a submerged vessel from a surface vessel.

It is a further object to correlate information as to the future positions of an attacking vessel and a target where the latter cannot be directly observed from the former.

Yet another object is to predict the future positions, relative to an attacking vessel, of a target which cannot be directly observed.

A still further object is to provide mechanisms and methods for effecting a variety of computations involving the relations between two or more bodies moving independently in a three-dimensional frame of reference.

The invention is not limited to these objects or to the particular embodiments illustrated, but is intended to include applications to any and all similar or related uses, and the employment of all equivalent means within the knowledge of those skilled in the art.

In the drawings:

FIG. 3 is a chart showing the sources of input data supplied to the computer and the destinations of output data furnished by the instrument.

Figure 33:
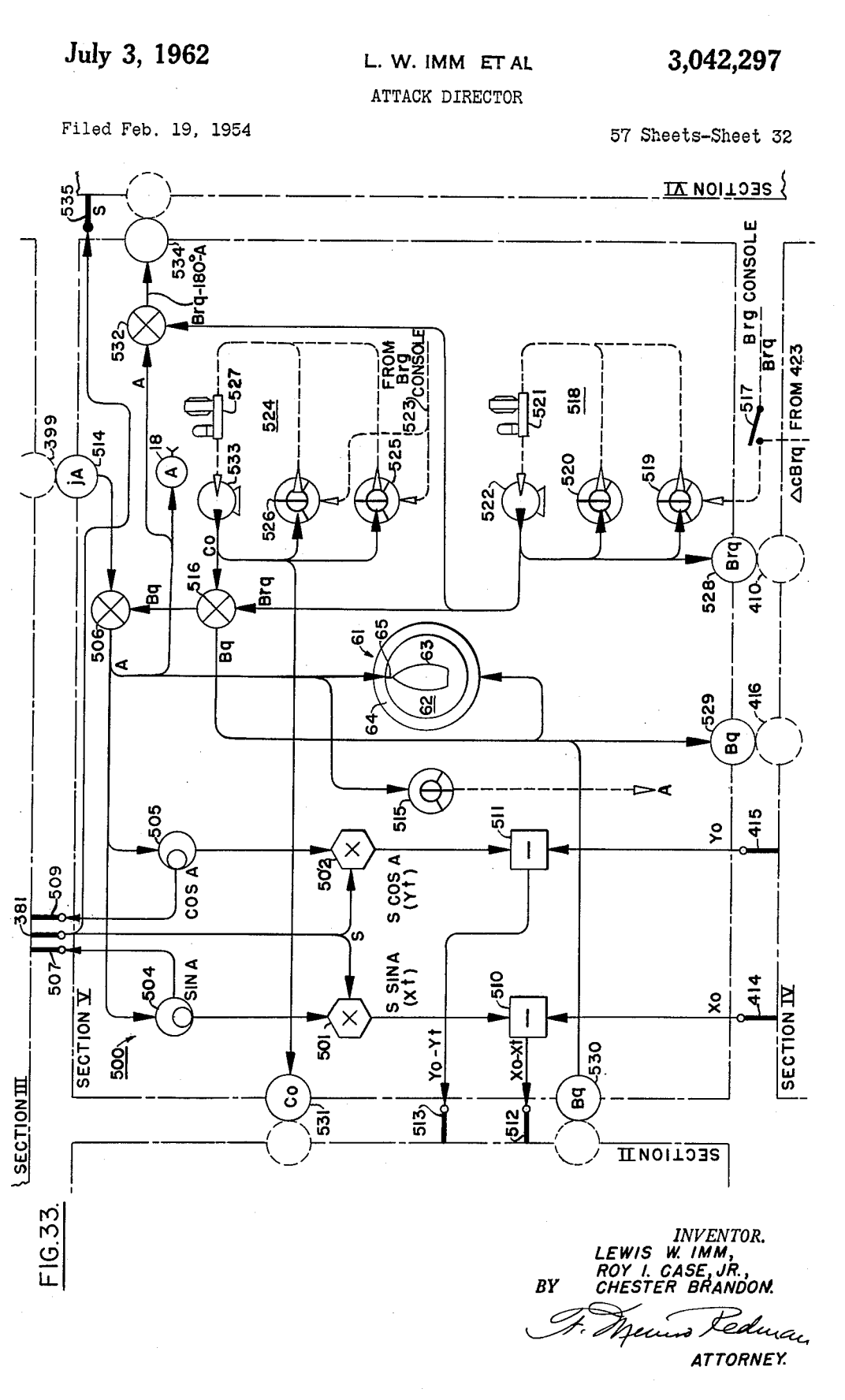

FIG. 33 is a functional schematic diagram of the Section V mechanism for computing the components of target speed.

Figure 37:
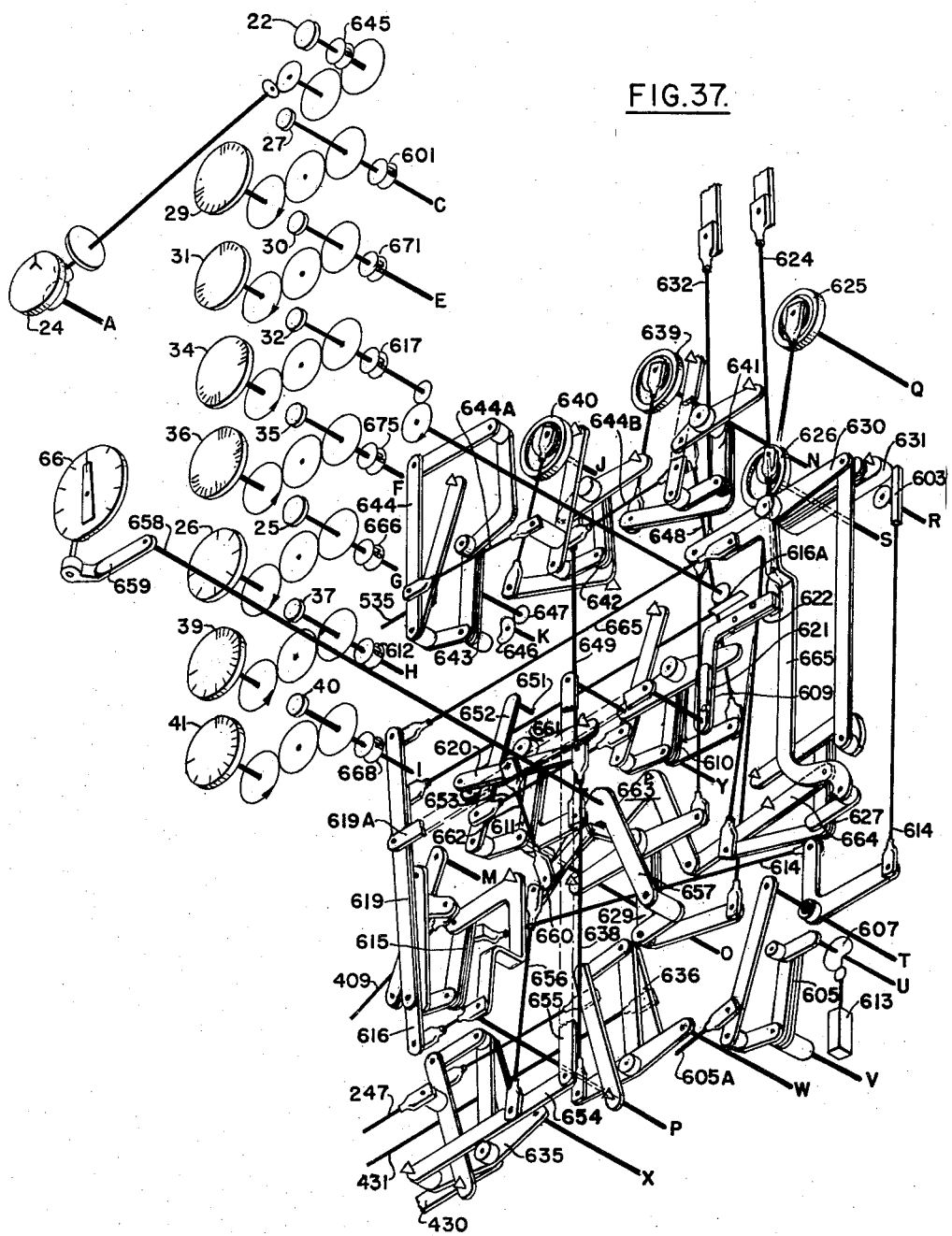
FIG. 37 is a fragmentary exploded schematic perspective view of the forward half of Section VI of the instrument, which computes the ballistic factors involved. Where a shaft rotation passes between the two halves of the section, the shaft is broken and a letter designation applied.
Figure 38:
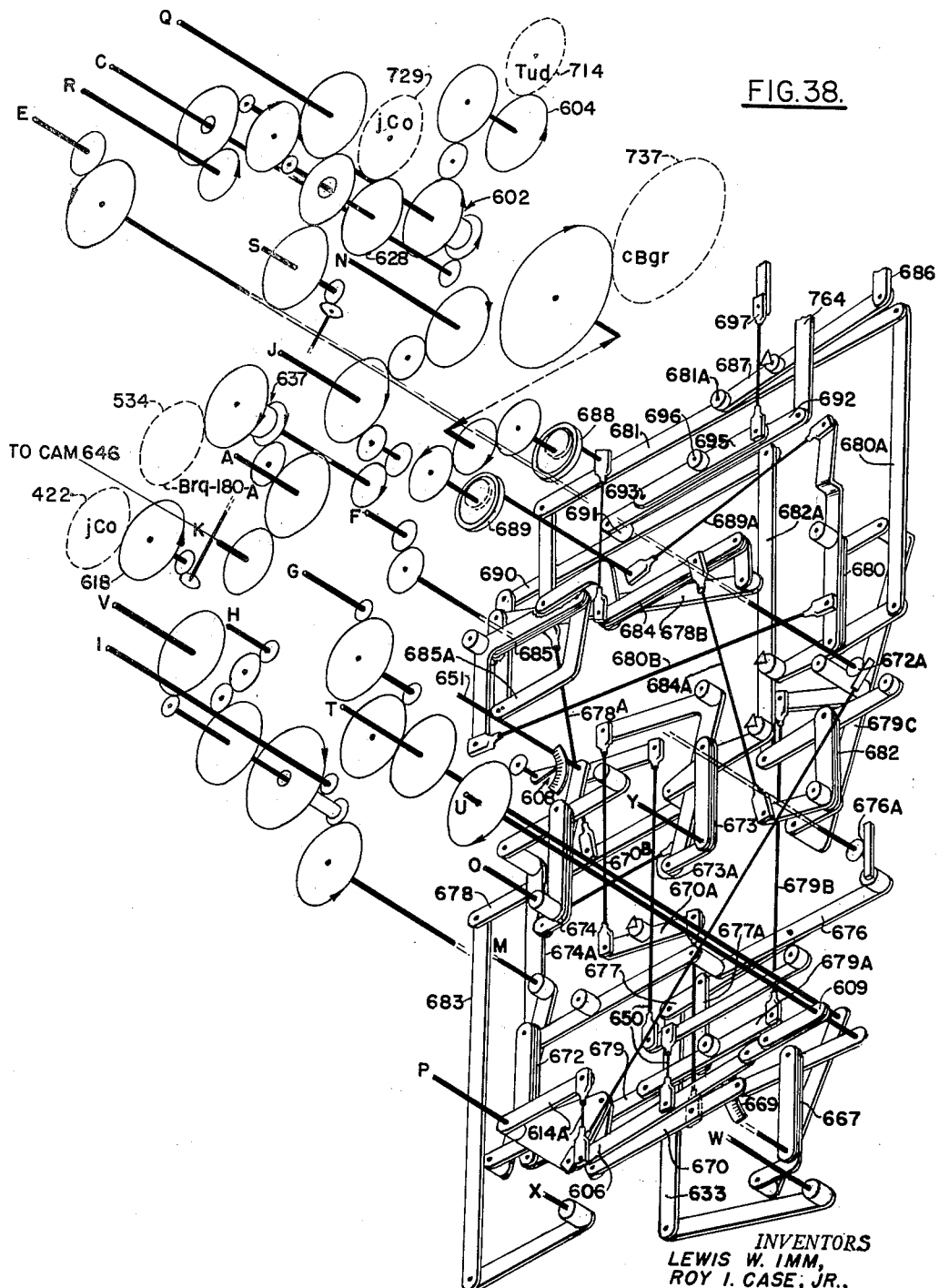

FIG. 38 is a fragmentary exploded schematic perspective of the rear half of Section VI, arranged to be seen as a view complementary to that of FIG. 37, and with the broken shafts lettered to correspond with those in that figure: where a letter is used in describing a path for the passage of data, it will be understood that at that point it is transmitted from the front half of the section to the rear half, or vice versa.

Figure 39A:
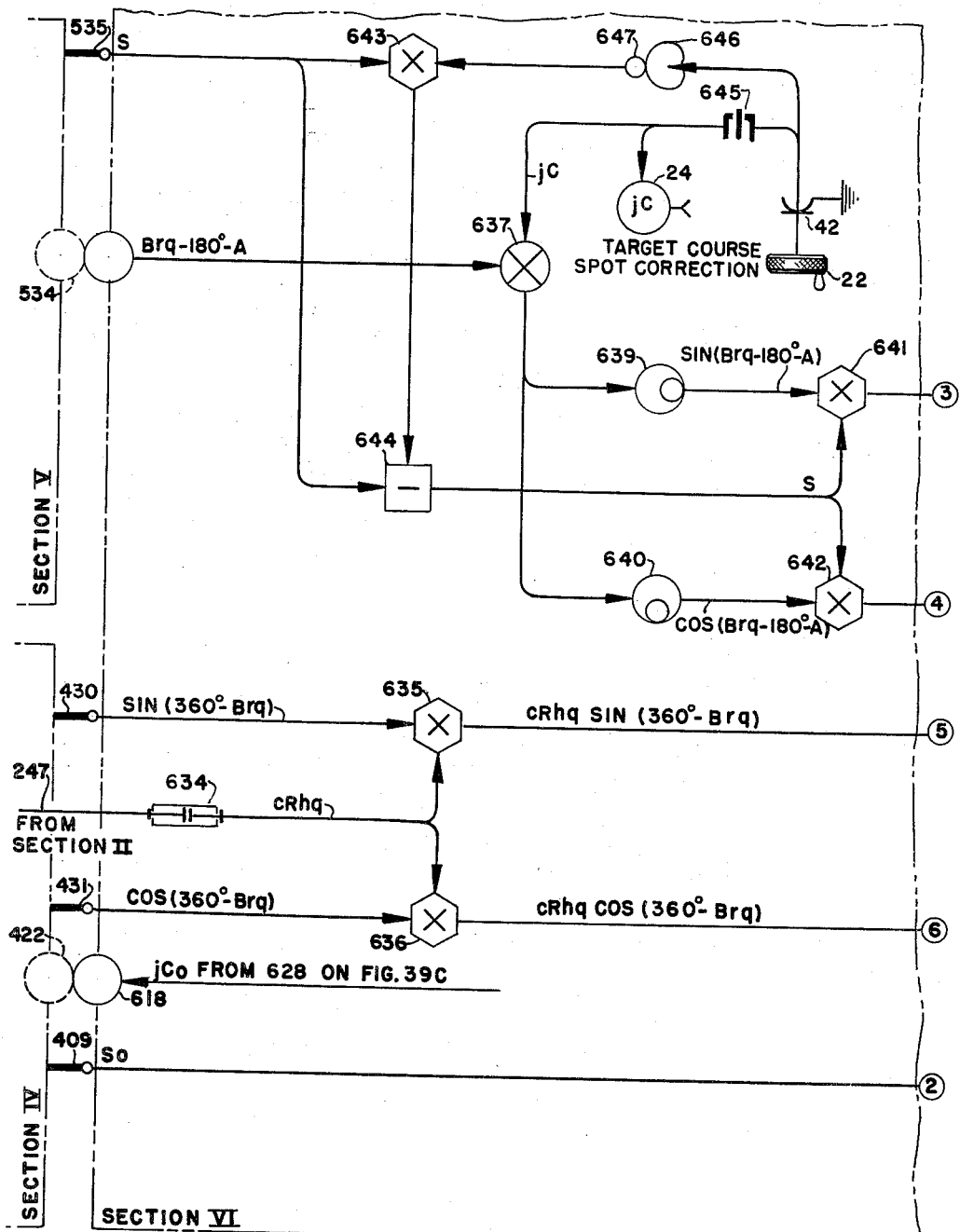
Figure 39B:
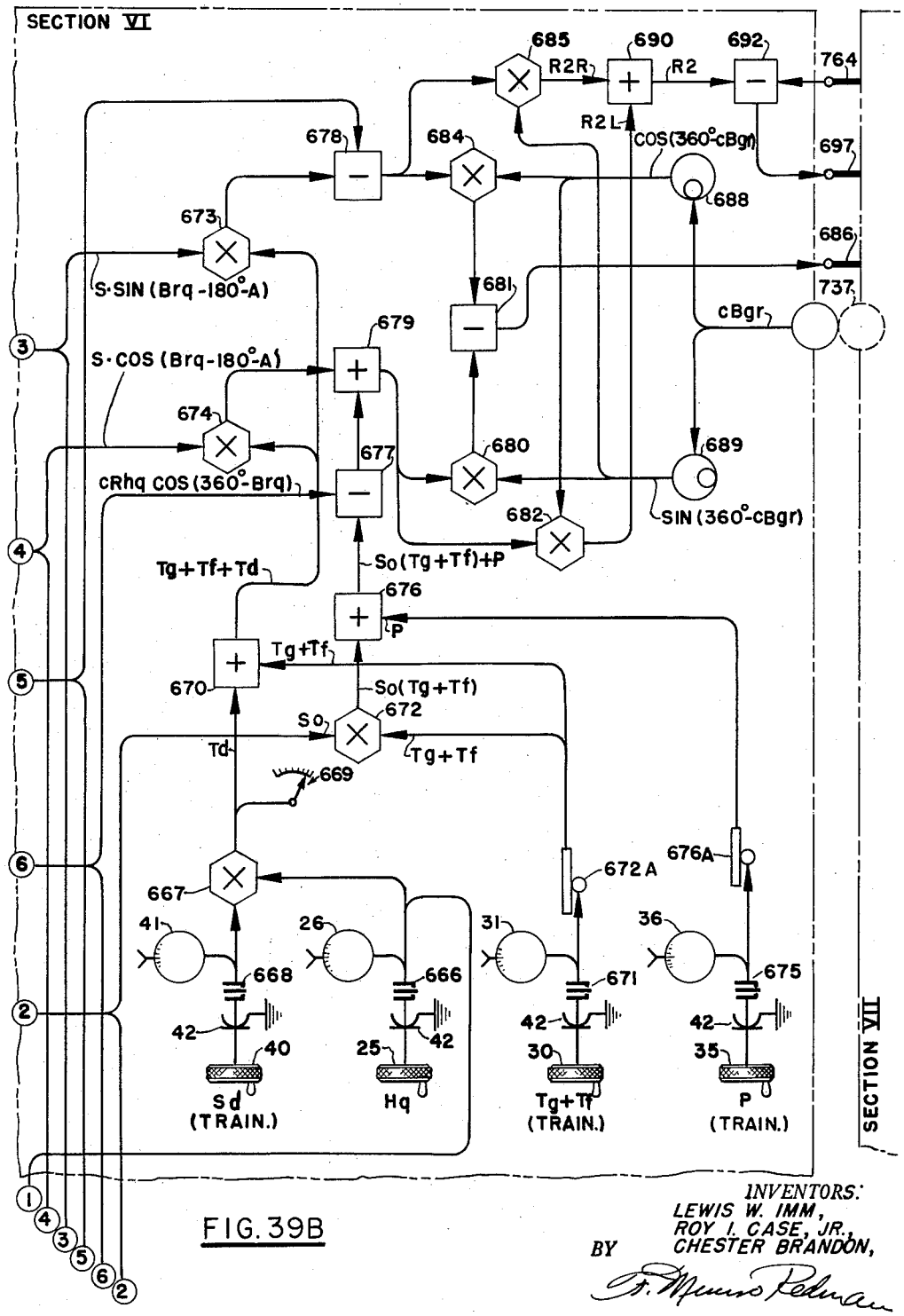
Figure 39C:
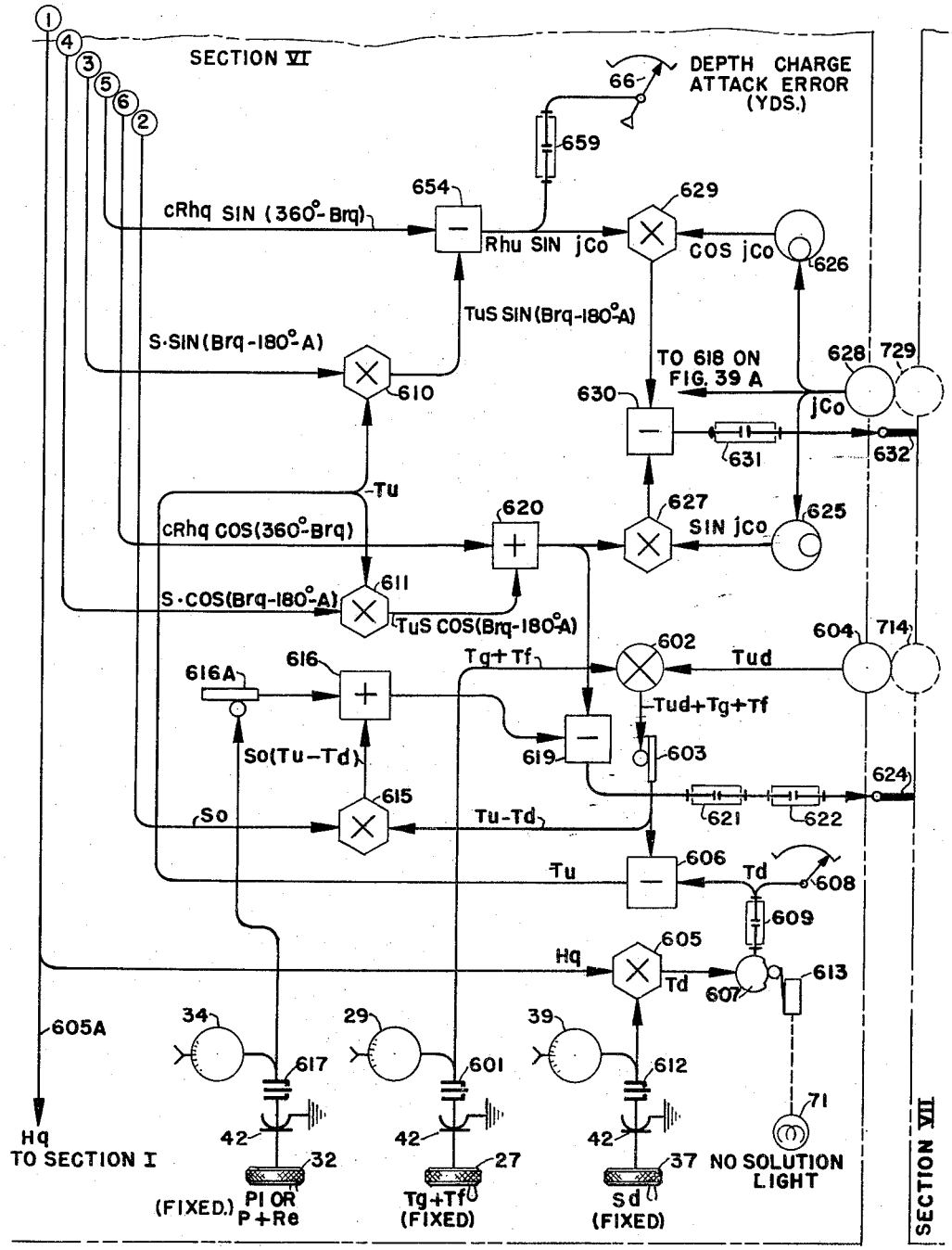

FIGS. 39A, 39B and 39C together show a functional schematic diagram of Section VI: continuing connections between the three sheets are shown as corresponding circled numbers on the broken leads, so that the three sheets may be read as one.

Figure 5:
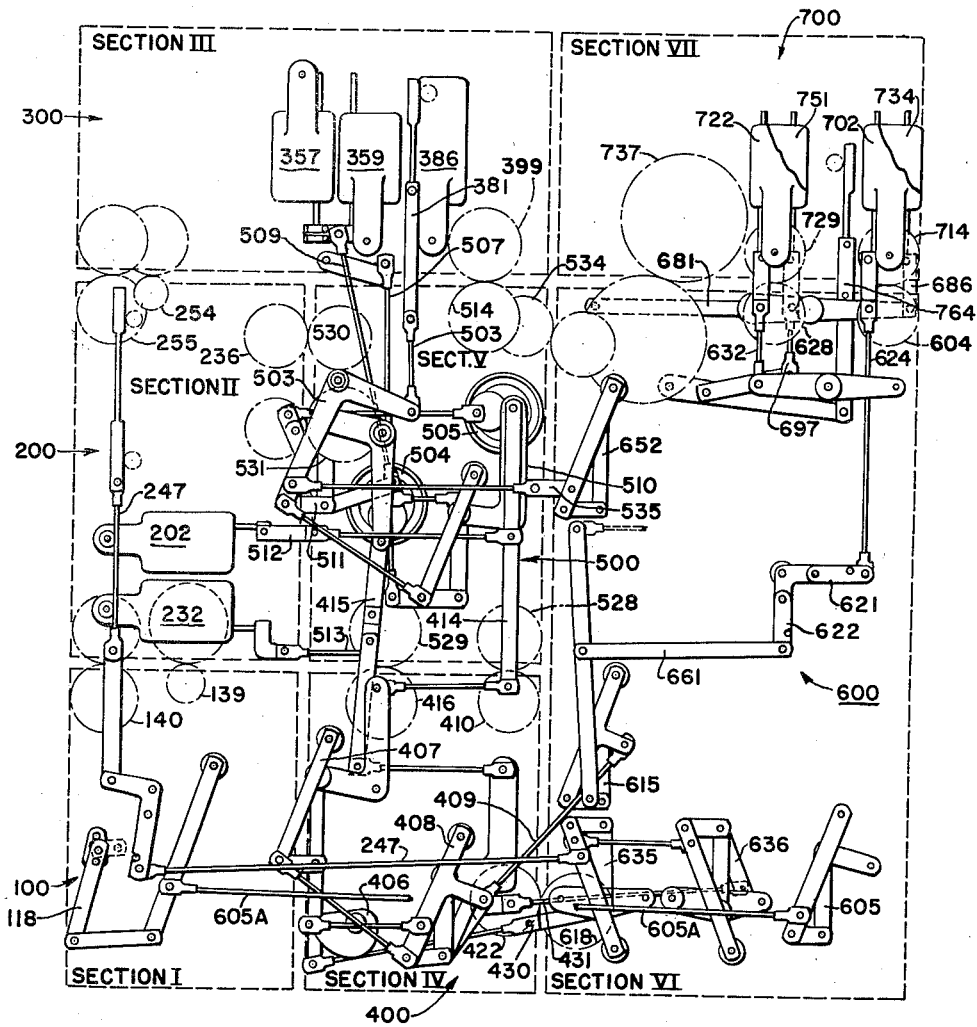
FIG. 5 is a diagram showing the linkages connecting the major components in Sections I–VII as shown in FIG. 4, looking toward the rear immediately behind the instrument panel.

FIG. 40 is a view of Section VI taken from the right side as seen in FIG. 5.

FIG. 41 is a front elevation of Section VI, taken as indicated by line 41—41 of FIG. 40.

FIG. 42 is a sectional view of the elements of Section VI, taken as indicated by line 42—42 of FIG. 40, looking in a rearward direction.

FIG. 43 is a rear elevational view of Section VI, taken on line 43—43 of FIG. 40.

Figure 44:
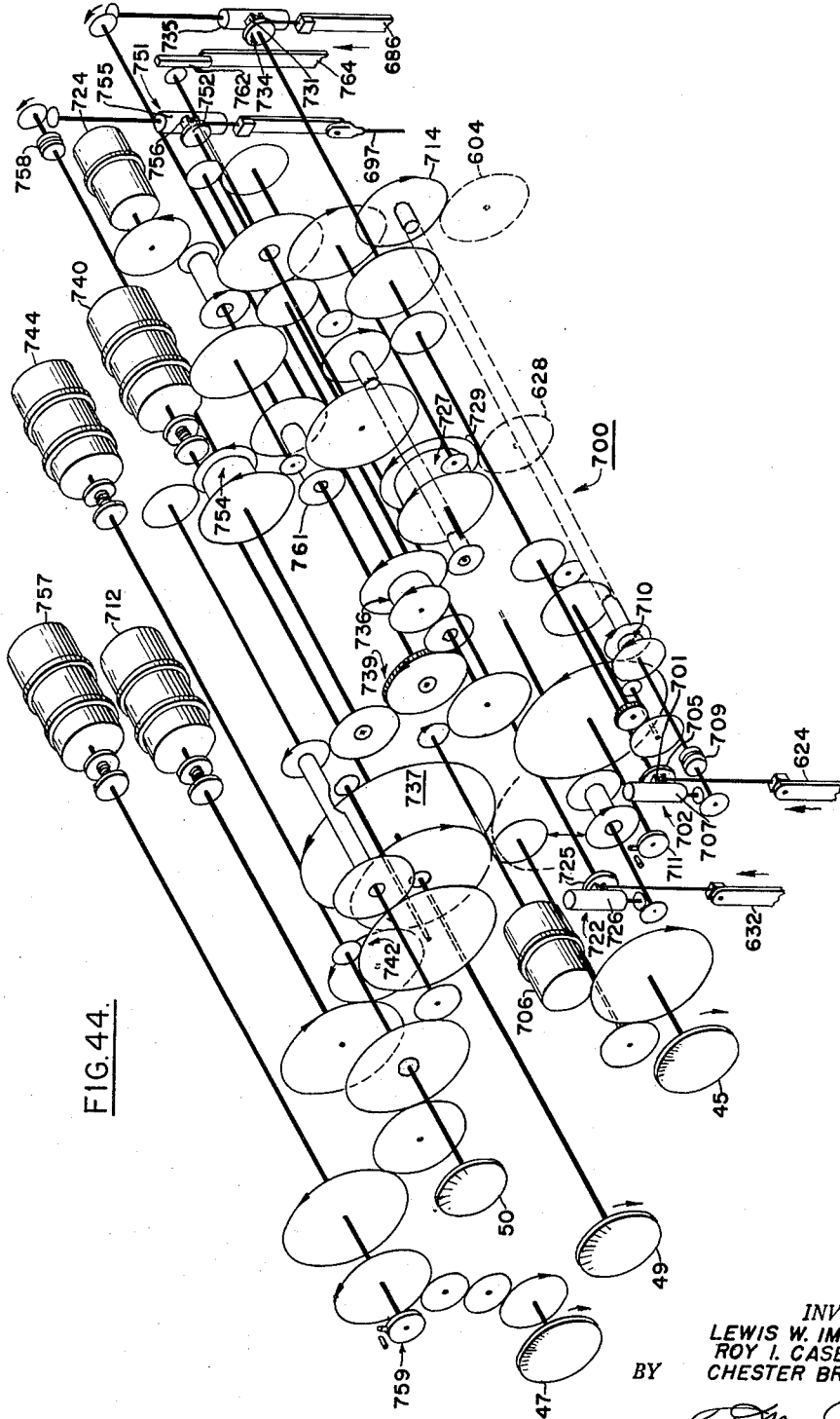

FIG. 44 is an exploded schematic perspective view of the mechanism of Section VII.

FIG. 45 is a functional schematic diagram illustrating the operation of the integrator servos of Section VII.

FIG. 46 is a detailed front elevation of Section VII, with certain parts broken away, taken in the plane of the dials but with the instrument panel removed.

FIG. 47 is a bottom plan view of the mechanism of Section VII.

FIG. 48 is a sectional view of the mechanism of Section VII, taken as indicated by line 48—48 of FIG. 47.

FIG. 49 is a front sectional view, taken as indicated by line 49—49 of FIG. 47, of Section VII.

FIG. 50 is a side view showing how the computing unit is swung down into position for inspection and servicing.

FIG. 51 is a detailed schematic perspective view showing the hinge construction used in supporting the computing unit in servicing position.

Figure 52:
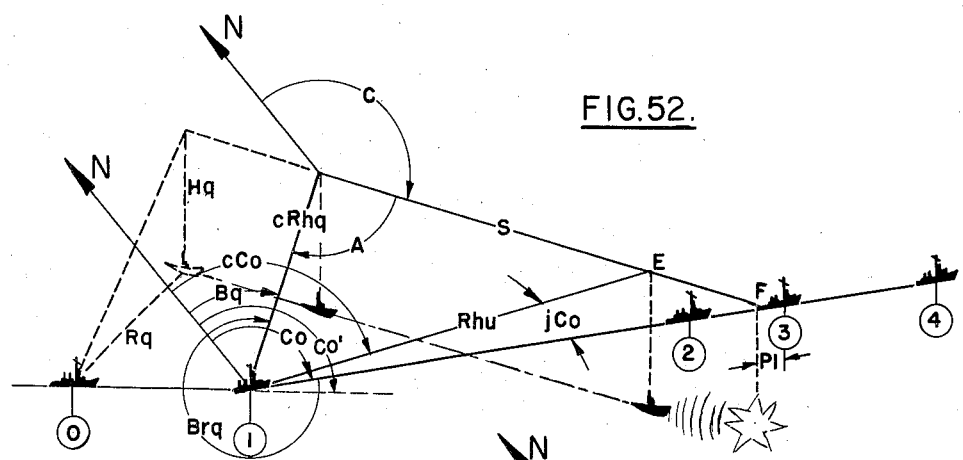

FIG. 52 shows the trigonometric relations involved in a stern-dropped attack, illustrated schematically in three dimensions.

Figure 53:
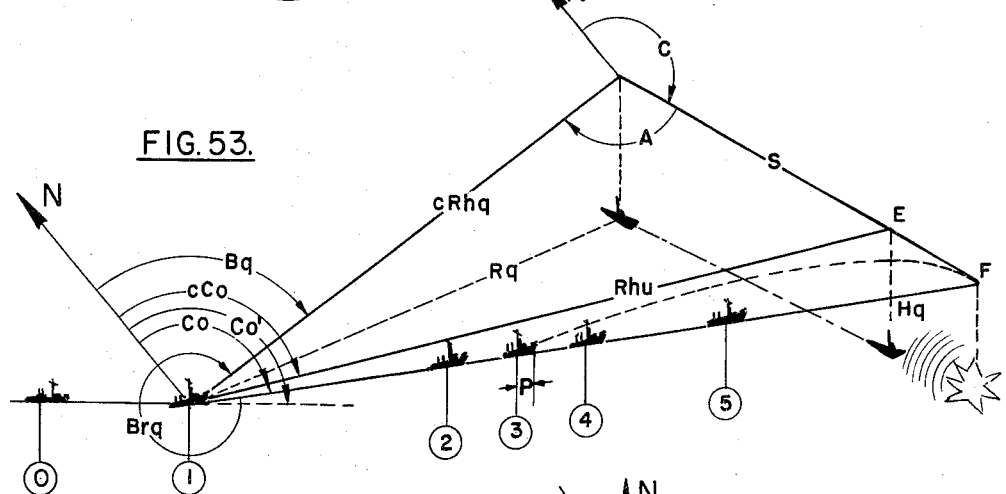

FIG. 53 shows the trigonometric relations of a fixed ahead-thrown attack illustrated schematically in three dimensions.

Figure 54:
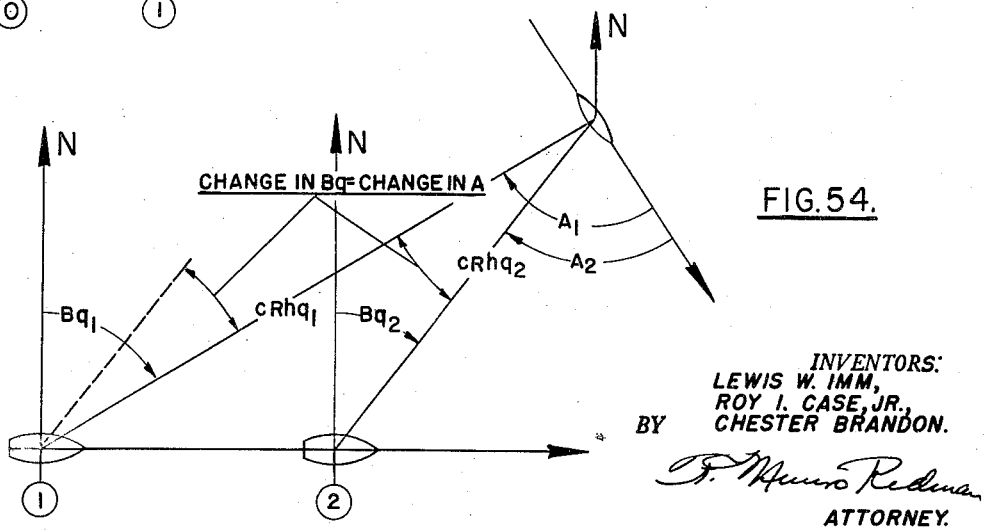

FIG. 54 is a schematic diagram showing the relations of true sonar bearing to target angle.

Figure 55:
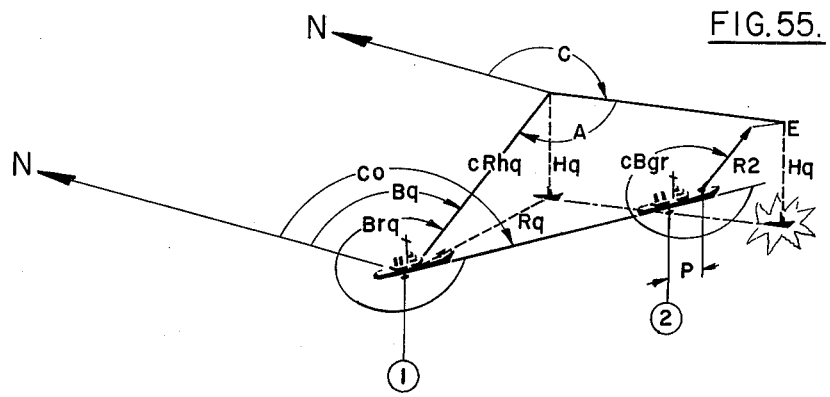

FIG. 55 shows the trigonometric relations involved in the attack with the trainable-thrown weapon, illustrated schematically in three dimensions.

Figure 56:
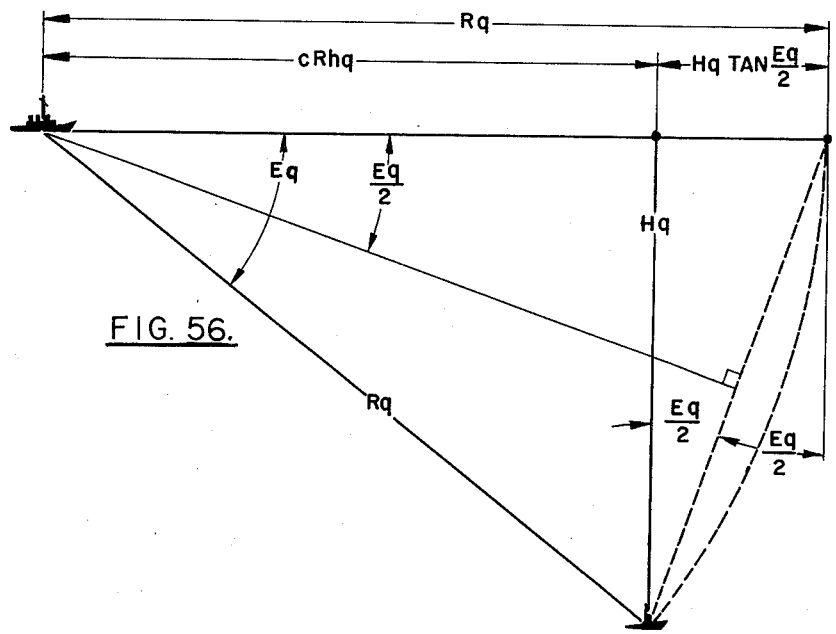

FIG. 56 is a diagram showing the trigonometric relations between ship and target involved in finding the horizontal range from slant range data.

Figure 57:
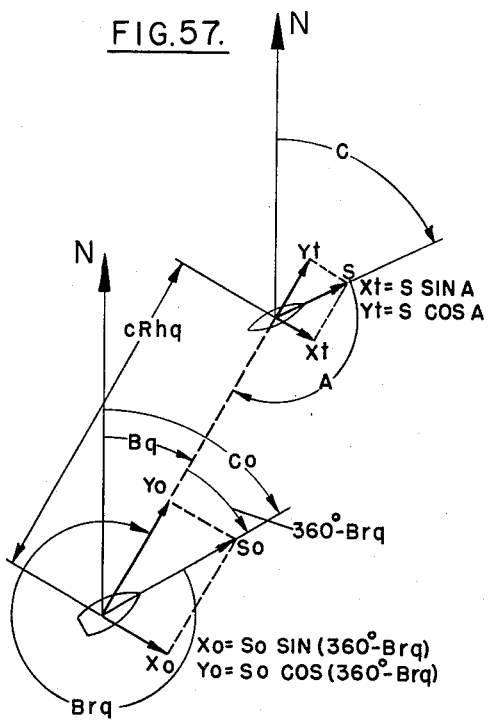

FIG. 57 is a diagram showing the components of the velocity of own ship and target along and across the line of sound.

Figure 58:
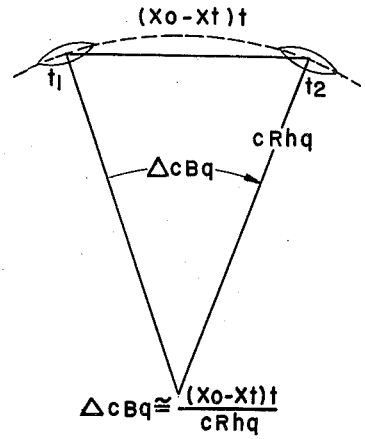

FIG. 58 is a diagram showing how $\Delta cBq$ is obtained.

Figure 59:
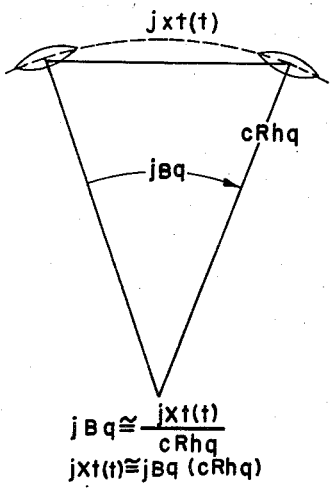

FIG. 59 is a trigonometric diagram showing how a solution is obtained for the computed values of $jBq$ and $jXt \cdot t$.

Figure 60:
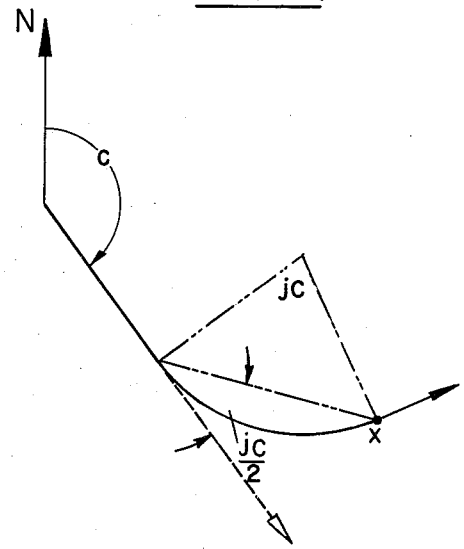

FIG. 60 is a diagram showing the correction for curved course attacks.

FIG. 61 is a trigonometric diagram showing the displacement vectors in a situation in which there is a difference between the assumed position of ship and the actual position of the ship.

FIG. 62 is a trigonometric diagram showing the velocity vectors where a difference exists between the assumed and actual positions of the target relative to own ship.

Figure 63:
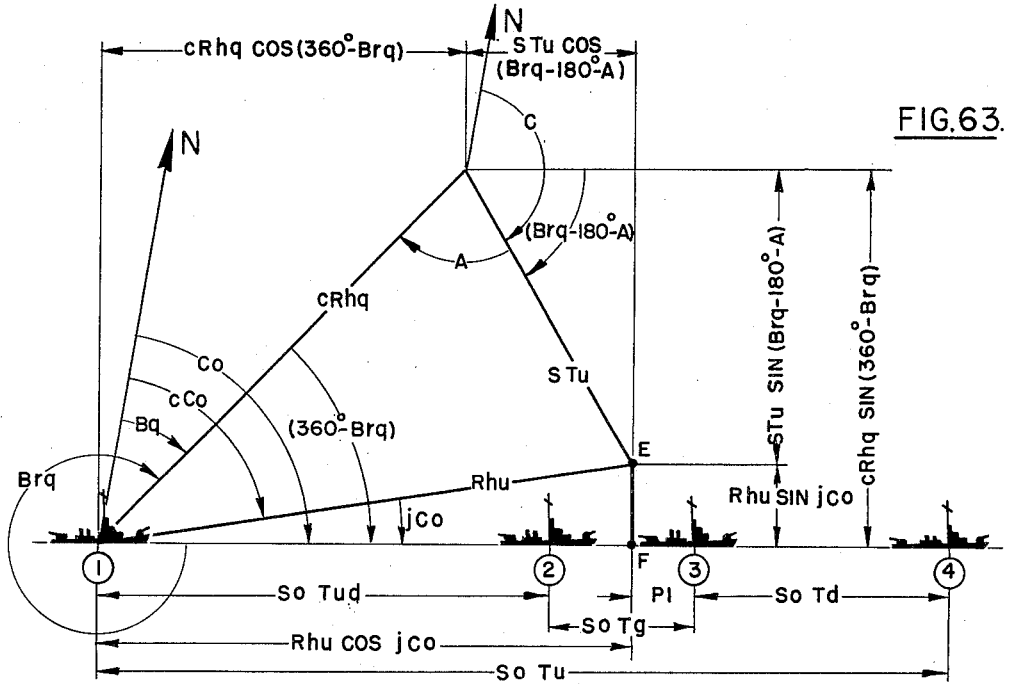

FIG. 63 is a schematic diagram showing the solution to the stern-dropped attack problem. Own ship is shown in elevation to assist in visualizing the progress of the attack, but the trigonometric relations involved are shown as if the ship and target were seen from above in projection on the plane of the drawing.

Figure 64:
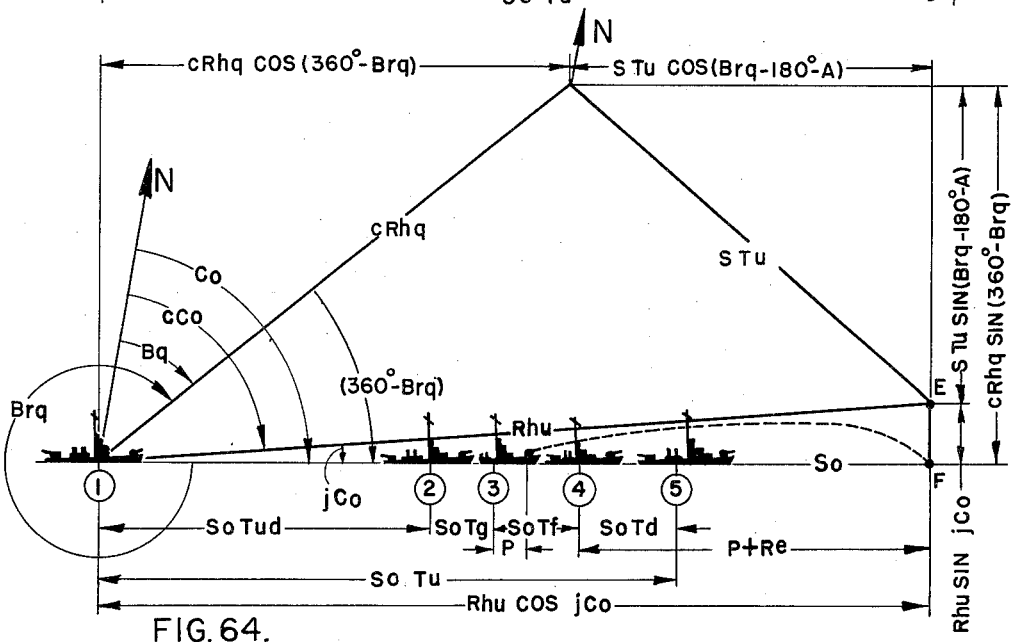

FIG. 64 is a schematic diagram showing the solution for the fixed ahead-thrown attack problem. As in FIG. 63, the progress of own ship along its course during the attack is shown in elevation, but the trigonometric relations are shown as if seen from above in projection on the plane of the drawing.

FIG. 65 is a trigonometric diagram showing the relations in a trainable-thrown weapon attack.

FIG. 66 shows the relations on which are based the equations use in computing advance range, and is an expanded view of a portion of FIG. 65.

The entire assembly has been shown in perspective in

Figure 1:
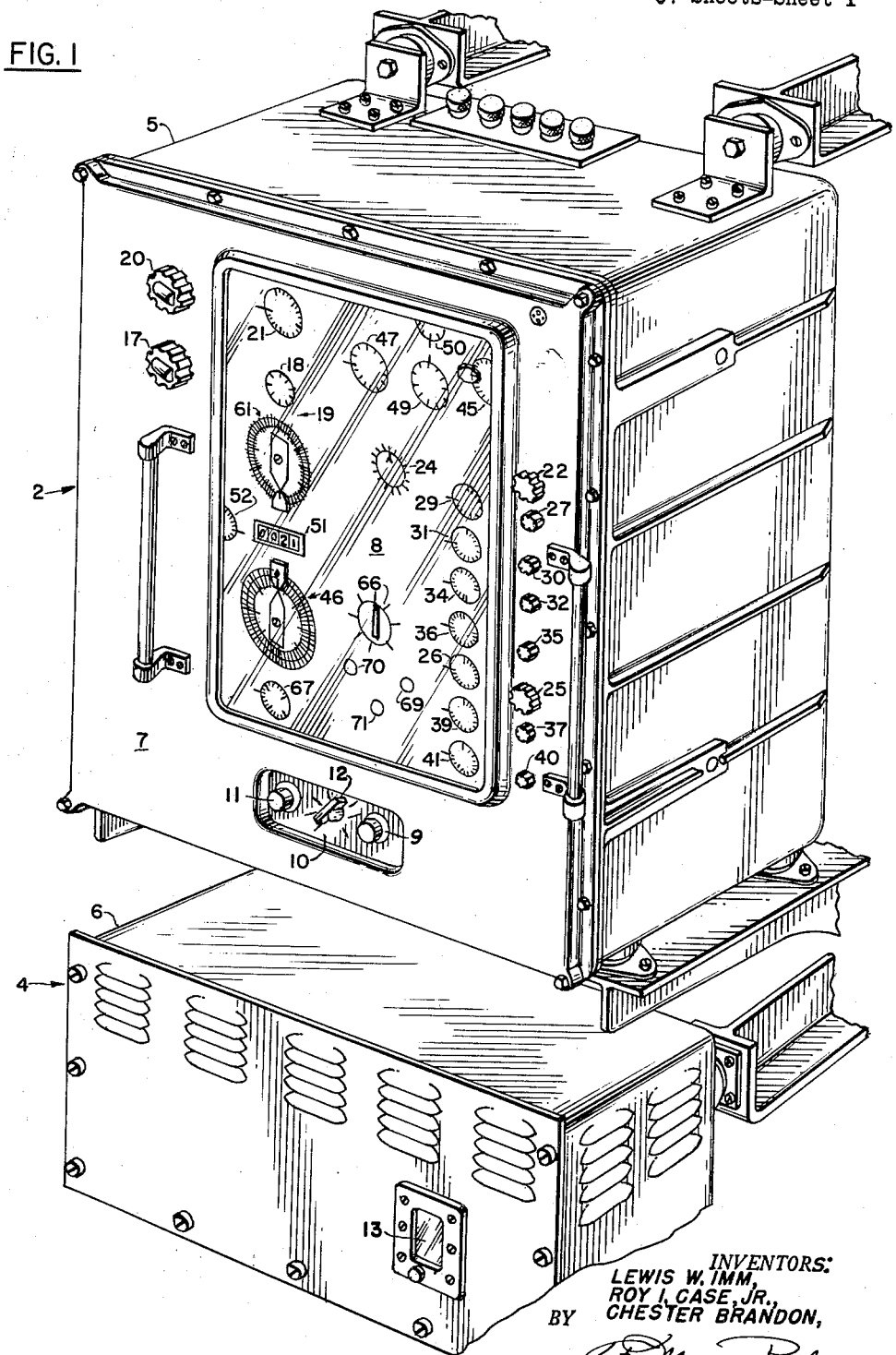
FIG. 1 is a perspective view of the complete director including the computer and amplifier units.
Figure 2:
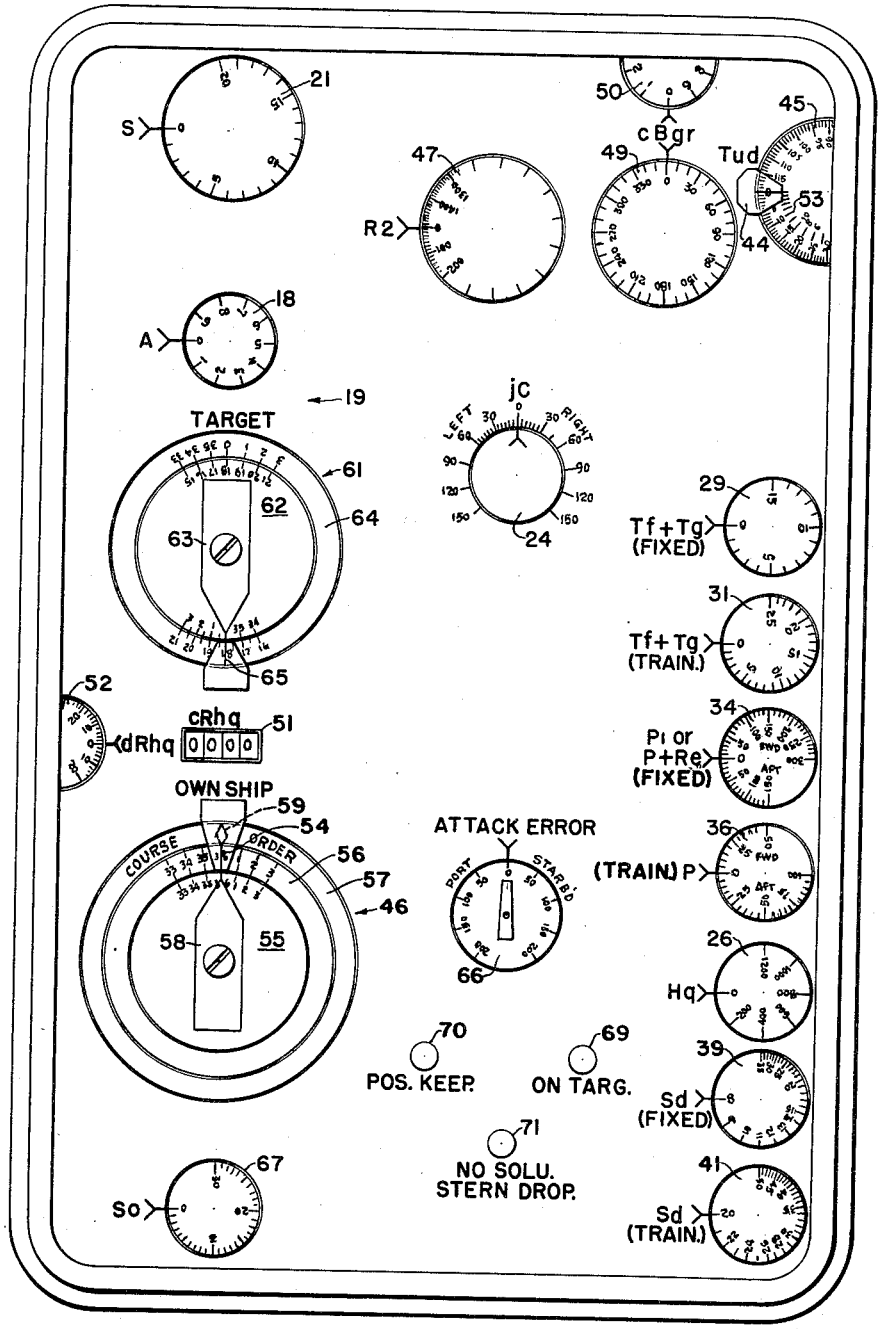
FIG. 2 is an expanded view of the dial mask portion of the instrument panel of the computer.
Figure 4:
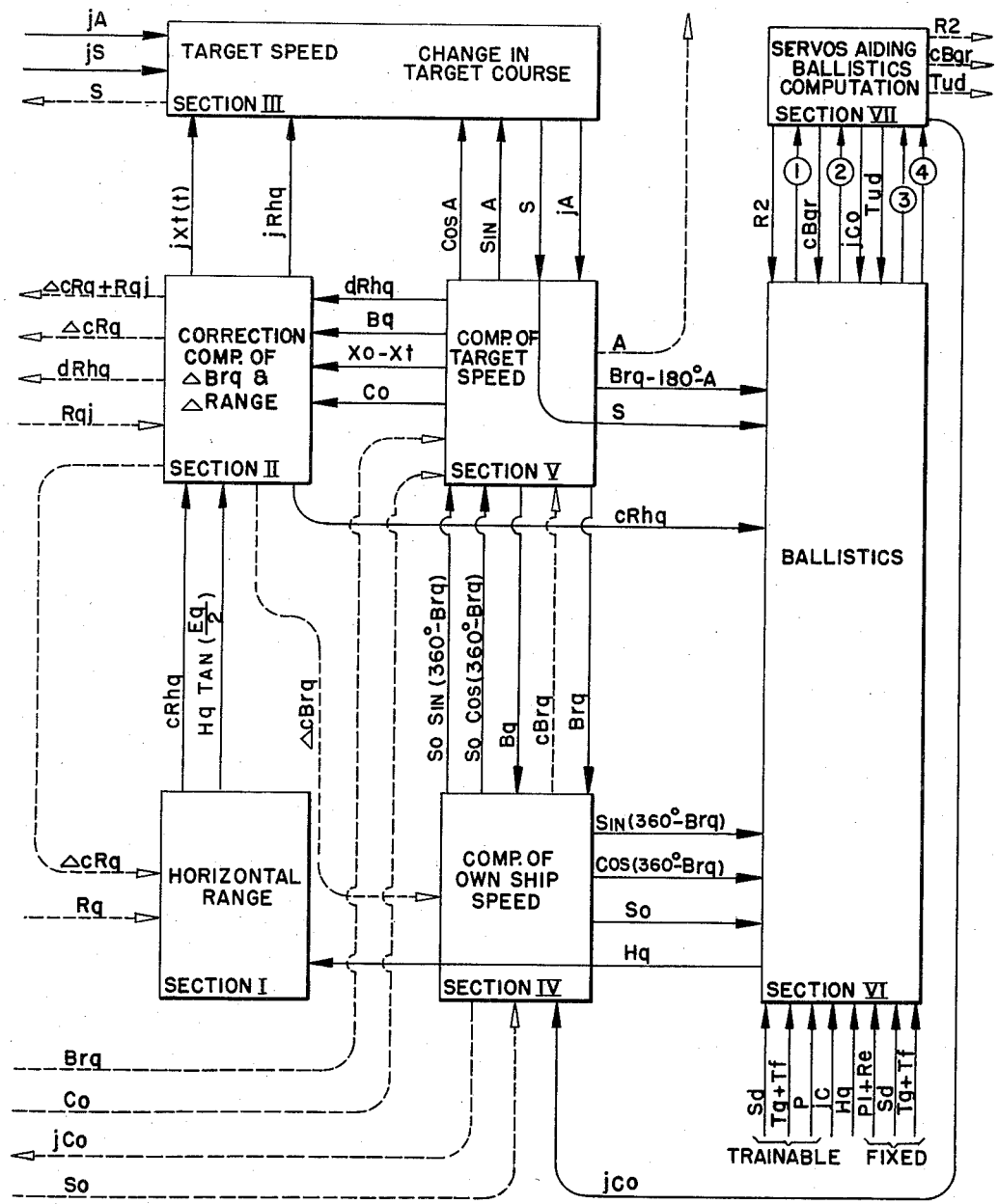
FIG. 4 is a diagram showing the physical relation and the flow of information between the major components of the computer unit of FIG. 1. The broken lines represent data in electrical form.

FIG. 1, while FIG. 2 shows the instrument panel in greater detail. The sources and destinations of the input and output data may be seen from FIG. 3; how data travels within the instrument, and what each section contributes, may be understood from the flow diagram of FIG. 4, assisted by the showing of the linkages aiding in this flow at the front of the machine in FIG. 5. In subsequent views, the gearing and linkages of each section are illustrated in a schematic perspective exploded view to show the structure with greater clarity, and by a functional schematic diagram to assist in understanding the method of operation. The sheets representing Sections I–VII in functional schematic form, may be placed adjacent each other in the same arrangement as shown in FIG. 4, to show the relations and connections between the separate sections more clearly.

The complexity of the device makes it desirable first to consider the theoretical problems to be solved. Next will be discussed how each section arrives at a solution for its particular portion of the problem. Finally, the means for combining all these factors will be described for the solution of the three specified types of attack problems: stern-dropped, fixed ahead-thrown, and trainable-thrown. The physical and trigonometric relations upon which the solutions of these problems are based are shown in FIGURES 55 to 66 following the detailed structural showings. The symbols used in solving the problems are defined as they occur in the discussion, and are collected in tabular form at the end of the specification for ease of reference.

For attacks in which charges are dropped over the stern or ejected straight ahead from a fixed projector in the bow, the instrument directs own ship on a course to intercept the target, and determines how long it must proceed on that course before firing; for attacks in which charges are to be ejected from a trainable weapon, it determines the advance range to the target, and transmits a projector bearing order to aim the weapon in azimuth so that its projectiles will score hits after the firing signal has been given.

In generating its solutions, the attack director uses quantities which represent the various factors involved in these problems. Many of these quantities are received by the attack director as inputs, as shown in FIG. 3. Not all the quantities it needs are automatically transmitted to it, or even set in manually, however. For example, the instrument must compute horizontal range, target angle and target speed from inputs of own ship's course and speed, and from the target bearing and range information transmitted from the sonar gear.

If sonar contact with the target is lost, the attack director's continuous solutions to the attack problems are not interrupted. When current sonar bearing and range information is no longer available, the attack director continues to predict the relative position of the target from generated increments of true sonar bearing and horizontal range, computed from own ship's inputs of course and speed and the bearing and range information received from the sonar gear at the last instant of sonar contact. The attack director of the invention is thus able to serve as a position keeper for use in the aided-tracking operation of the sonar equipment.

*The Stern-Dropped Attack Problem*

A stern-dropped attack, illustrated in three dimensions in FIG. 52, begins when the target proceeding on course C is detected by conventional echo-ranging sonar gear aboard own ship. Own ship, then at circled point 0 in FIG. 52 is proceeding along an original course $Co'$, and the sonar range $Rq$ of the target, determined by the sonar equipment, is within the range of operation for which the Director is designed, which in the present case is 3000 yards or less. Until the horizontal range $cRhq$ computed by the director closes to 1500 yards, the attack director functions only as a position keeper with aided sonar tracking. Own ship continues on its original course $Co'$, unless a new course is arbitrarily selected in an effort to make the paths of own ship and target converge more quickly.

When own ship comes within 1500 yards of the target, at the circled point 1 in FIG. 52, the director starts to solve the attack problem. The trigonometric relations are then as shown in FIG. 63. The circled, numbered points in FIGS. 52 and 63 have the same significance. Throughout the attack the director continues to predict the future position of the target, and to compute a course to steer that will enable own ship to intercept it. This is the ordered course $cCo$. Own ship should proceed in the direction $cCo$, so that the projectiles will intercept the target track at exactly the point that it is predicted the target will occupy at the time of the explosion. This would result in travel along the proper track $Rhu$, which is the shortest distance from own ship to point E, beneath which the charges should explode. In the hypothetical situation depicted in FIG. 52, own ship turns to proceed along $Rhu$, the proper track, but due to its inertia and other factors, does not immediately reach the correct heading $cCo$. The course $Co$ along which own ship is actually headed at any instant in the figures, must still be corrected by angle $jCo$. Point F, directly above the point where the explosion will actually occur, would coincide with point E, directly above the point at which the explosion should occur, if own ship were exactly on the ordered course, $cCo$. As long as own ship is not exactly on the ordered course, there will be a depth-charge attack error, shown in FIGS. 52 and 63 as the distance between points E and F. Depth charge attack error is the distance along the target track to the right or left of its intersection with the $Rhu$ line at which the charges will be dropped if own ship continues on the course it is pursuing at any given instant. This distance has been exaggerated in the figures over that which is actually experienced during operation in order to show the relations more clearly. While point F has been shown to the right of the $Rhu$ line, it may as well be to the left. That is, the charges may intercept the target track either ahead of, or behind the target, unless own ship corrects its course by the angle $jCo$.

Some time after own ship has traveled past circled point 1, a synchro transmitter in the attack director transmits the order to fire; in FIGS. 52 and 63 this occurs when own ship is at circled point 2. There is an unavoidable delay, known as "dead time," between the giving of the firing signal and the release of a charge, so that own ship arrives at circled point 3 before the charge is actually dropped. Normally a number of charges are released serially in a spaced pattern, rather than all at the same instant the signal is transmitted, and in such a case own ship reaches circled point 3 before the center charges in the pattern are dropped from its stern at point F. The transducer, which is used as the reference point for measuring own ship's position, is spaced from the stern by the distance $P1$, the parallax for stern-dropped attacks. It will be seen that at circled point 3 the transducer has traveled past F by a distance equal to $P1$. Own ship continues on its way while the charges sink to the target depth; by the time they explode, it is at point 4, out of the danger range.

*The Fixed Ahead-Thrown Attack Problem*

Fixed ahead-thrown attacks, an example of which is illustrated in FIGS. 53 and 64, resemble stern-dropped attacks in all major respects except that the charges are ordinarily fired from a projector in the bow instead of being dropped astern. The circled numbered points have the same significance in FIG. 64 as in FIG. 53. Parallax P is then measured from the sonar transducer ahead to the projector. Therefore, the time the charges are in the air, and the distance they travel before striking the water, must be taken into consideration when the attack director computes the time to fire. The distance the charges will be thrown, neglecting any factors other than the ballistics of the particular projector and propellant, is the effective range. Since the projectors are ordinarily fixed in azimuth, the effective range will be a constant of the particular installation, and is usually about 200 yards.

In the fixed ahead-thrown problem depicted in FIGS. 53 and 64, the horizontal range to the target has been closed to 1500 yards or less when own ship is at circled point 1, and the computer begins to solve the problem. To score a hit upon the target with its fixed projector, own ship's course, initially corrected from Co' to Co, should be further corrected by angle jCo. As before, in the hypothetical situation illustrated in the figure, own ship's heading is changed toward cCo, the ordered course, but its actual track does not coincide with R$hu$, the horizontal line from own ship to the point E directly over the place where explosion should occur. When own ship reaches circled point 2, the time-to-fire signal is transmitted from the attack director. Since, as in the stern-dropped attack there is always a lapse of time, called "dead time," between the firing signal and the actual time of firing, own ship arrives at circled point 3 before the charges are ejected from the weapon. By the time the charges strike the water, own ship is at circled point 4; while they are sinking to the target depth, own ship continues on its way. Own ship reaches circled point 5, not yet within the range of explosion damage, by the time the charges actually explode beneath point F. Own ship is free to veer, after firing, without affecting the results of this particular attack.

The Trainable Thrown Attack Problem

For attacks in which projectiles are to be fired from a trainable projector, the attack director determines the advance position of the target and transmits a projector bearing order to train the weapon so that the projectiles will score a direct hit. Trainable-thrown attacks have this advantage over fixed ahead-thrown attacks: a hit may be scored even though the bow of own ship is not pointed directly at the predicted position of the target. Since the director can solve simultaneously for a trainable-thrown and a stern-dropped attack, it is possible to steer own ship on an intercept course so that the trainable thrown attack may be followed by a stern-dropped attack. At other times, it may be desired to bring own ship within the effective range of the trainable weapon, and then deliver from it a succession of charges while steering parallel to the course of the target.

In FIG. 55, the attack with a trainable weapon is shown starting at circled point 1 when own ship and the target are separated by a horizontal range of not more than 1500 yards. The attack director then predicts the advance range to the target and transmits electrical signals to train the projector upon that position. As the horizontal range closes, the advance range also decreases. When the advance range measured at the transducer decreases to about 200 yards, the effective range of the weapon, at circled point 2, the projector is fired. At this instant, as in the fixed projector situation, the weapon is ahead of the transducer by the parallax distance P.

Generation of Additional Quantities Required for Solving Attack Problems

Certain quantities from which the attack director generates solutions to the attack problems are not supplied to it as inputs. These include the sonar angle of depression E$q$ and horizontal range $cRhq$, target speed S and target angle A. The instrument computes these quantities from the other inputs.

Computing Horizontal Range cRhq

The attack director computes horizontal range $cRhq$ from inputs of sonar range R$q$ and target depth H$q$, finding a function of the sonar angle of depression E$q$ as a preliminary step.

In FIG. 56 the horizontal range $cRhq$ is seen to be shorter than the sonar range R$q$ by the product of target depth H$q$ and the tangent of half the sonar angle of depression E$q$. Neither the angle of depression nor the half angle are supplied to the attack director as inputs. In the right triangle formed in FIG. 56 by the horizontal range $cRhq$, the target depth H$q$, and the sonar range R$q$, the sine function of the angle E$q$ may be determined from the ratio of the side opposite the angle E$q$ to the hypotenuse, or H$q$ over R$q$. This is transposed, so that the attack director may solve for the sine function of E$q$ by a multiplication process, to:

$$Hq = Rq \sin Eq \tag{1}$$

Once sin E$q$ is known, the tangent of half the angle is readily determined, and the attack director then generates horizontal range $cRhq$ by mechanically satisfying the equation:

$$cRhq = Rq - Hq \tan\left(\frac{Eq}{2}\right) \tag{2}$$

Furnishing horizontal range continuously permits the director to carry out major steps in computation as if the action were taking place in a two-dimensional plane, and is a first step toward finding a simple solution for target course and speed. Unless otherwise specified, range will be used hereafter to mean the horizontal range computed from sonar readings, or $cRhq$. Simplicity is also aided by using the principles of radian measurement to make conversions between changes in bearing and displacements across the line of sound.

It will be appreciated that since normally there are no fixed reference points available in the ocean, the solutions must be found in terms of the relative movements of own ship and the target.

At the beginning of a particular attack problem, although data as to own ship's course and speed are being continuously received from other gear, the values of target angle, target speed and other necessary factors which are registered in the director and displayed on the dials will be random quantities, usually those remaining at the end of a previous solution.

Sonar-determined target bearing and range supplied to the director correct progressively the initial random registrations: each increment of corrective adjustment reduces the difference between the random and the true values of target angle, target speed and other pertinent quantities. The magnitude of the corrective adjustments decreases as the registered values approach the true values more and more closely, the actual difference becoming negligible for attack direction purposes after a short time.

The computation of these corrective adjustments involves a series of inter-related operations which will be described in general terms before more detailed explanations are undertaken.

The director solves each problem simultaneously in two ways: one with data known to be accurate—supplied by ship's instruments as to its own course and speed, and from sonar gear as to the range and bearing of the target; the other on the basis of hypothetical values of target angle and speed, which at first are the random quantities remaining in the computer.

If both methods of solution do not result in the same answer, the random values of target angle and speed used must not have been the proper values for the instant problem. The instrument then corrects these random values, and recomputes the preliminary problem. The process is repeated until there is no significant difference between the results of the two methods of solution. At this point, it will be seen that the hypothetical values for target angle and speed must be the same as the actual values, and they may now be used in solving the attack problems.

In computing the target angle and speed at the start of an attack solution, velocity components across and along the line of sound, resolved from the random target angle and speed values remaining registered in the director, are initially utilized. These components are combined with data currently furnished by own ship's instruments to obtain components of target velocity relative to that of own ship across and along the line of sound.

The component of relative target velocity across the line of sound is integrated with respect to time to obtain the distance traveled across the line of sound since the last determination. This distance is compared with that represented by the product of sonar-determined horizontal range and an assumed change in bearing, using the radian measure relations of Equation 11 and FIGURE 58, described in detail hereafter. This comparison enables the director to find a correction factor for the assumed increment of bearing change $\Delta B$ which is combined with the bearing value in the machine to obtain the correction factor $jBq$. The correction factor $jBq$ is multiplied by sonar range to obtain a correction to the calculated travel across the line of sound.

The revised distance traveled by the target across the line of sound is then divided by the time elapsed since the last correction to obtain the rate, and is resolved into target velocity components along and across the target track. From these components target speed correction $jS$ and target angle correction $jA$ are obtained; these are then fed back as corrections to the random target speed and the random target angle values used at the beginning of the computation.

The component of relative target velocity along the line of sound is integrated to obtain an increment of range and combined with sonar determined range to produce a correction to range $jR$ along the line of sound. This correction is divided by the time elapsed since the last correction to obtain the rate of change of range along the line of sound, and is then resolved in accordance with the corrected target angle into components along and across the target track. The director is now in a position to recompute the entire problem with new hypothetical target speed and angle values which approximate more closely the actual values. The computation cycle is repeated until no significant difference is found by the instrument between the solutions based on actual and assumed values of target angle and speed. The details of these computations will be further elaborated below.

*Relation of Target Angle and Speed to Changes in Bearing and Range*

The attack director computes target angle and speed, as said above, from the vector components of the target's velocity along and across the line of sound, quantities derived in turn from bearing and range information. It will be obvious that a change in target speed alone may affect computed values of range, bearing or both; change in target course alone may also affect computed values of range, bearing or both.

*Computing the Relative Velocities of Own Ship and the Target*

In making its analysis of target angle and speed, the attack director uses as a reference the line of sound between own ship and the target: $Xo$ and $Yo$ represent the vector components of own ship's velocity across and along the line of sound, respectively; $Xt$ and $Yt$ are the vector components of target velocity across and along the line of sound, respectively; and $So$ and $S$ are the speeds of own ship and target.

As shown in FIG. 57, these vector components may be expressed in terms of the other factors in the attack problem as follows:

$$Xo = So \sin(360° - Brq) \quad (3)$$
$$Xt = S \sin A \quad (4)$$
$$Yo = So \cos(360° - Brq) \quad (5)$$
$$Yt = S \cos A \quad (6)$$

$Xt$ is subtracted from $Xo$ to obtain $Xo - Xt$, the rate at which target velocity normal to the line of sound is changing with respect to own ship:

$$Xo - Xt = So \sin(360° - Brq) - S \sin A \quad (7)$$

The attack director computes $jXt$, the correction to $Xt$, from changes in true sonar bearing. This analysis parallels as closely as possible the mechanical solution in the instrument, and so is based on changes in true sonar bearing rather than on changes in relative target bearing, although it is a matter of theoretical indifference which is used. The relation of true sonar bearing $Bq$ to relative target bearing $Brq$ may be seen from FIG. 57 to be given by the expression:

$$Brq - (360° - Co) = Bq \quad (8)$$

Equation 8 may be transposed to:

$$Bq = Co + Brq - 360° \quad (9)$$

The rate $dBq$ at which true sonar bearing changes, in radians per second, is determined from $cRhq$, the horizontal range, and $Xo - Xt$, the rate in yards per second at which the target's velocity across the line of sound is changing with respect to own ship:

$$dBq = \frac{Xo - Xt}{cRhq} \quad (10)$$

According to the principles of radian measurement, increments of change in true sonar bearing $\Delta cBq$ during a discrete interval of time $t$ are obtained from the division of the distance $(Xo - Xt)t$ that the target travels across the line of sound during time $t$ by the horizontal range $cRhq$ computed from sonar range $Rg$:

$$\frac{(Xo - Xt)t}{cRhq} = \Delta cBq \quad (11)$$

FIG. 58 illustrates on an exaggerated scale an incremental change in $Bq$ during time $t$ in which the target travels from point $t_1$ to point $t_2$. Treating the arc $(Xo - Xt)t$ as though it were a chord introduces negligible error because these incremental changes in true sonar bearing are computed so often throughout the attack in the continuously repeated computation cycles that the angle $\Delta cBq$, shown in FIG. 58, is extremely small, and the horizontal range $cRhq$, by definition normal to a tangent to the arc $(Xo - Xt)t$, at its central point, is constant for each cycle.

The rate at which the horizontal range is increasing or decreasing is obtained by subtracting $Yt$, the vector component of own ship's velocity along the line of sound, as may be seen from FIG. 57:

$$Yo - Yt = dRhq \quad (12)$$

Substituting the values of Equations 5 and 6 in Equation 12:

$$So \cos(360° - Brq) - S \cos A = Yo - Yt \quad (13)$$

*Computing Corrections to the Vector Components of Target Velocity*

To compute target angle and speed, the bearing and range rates derived in Equations 10 and 13 must be first converted to corrections to the vector components of target velocity along the line of sound, $jYt$, and across the line of sound, $jXt$. By integrating the bearing and range rates with respect to time, the attack director determines $\Delta cBq$ and $\Delta cRhq$, the increments of, or changes in, true sonar bearing and horizontal range during the time interval $t$.

The correction to true sonar bearing, $jBq$, is the algebraic difference between true sonar bearing $Bq$ and the generated increment of true sonar bearing $\Delta cBq$:

$$jBq = Bq - \Delta cBq \quad (14)$$

From the corrected true sonar bearing and the horizontal range, the attack director computes $jXt(t)$, the distance that the target travels across the line of sound in $t$ seconds. By considering $jXt(t)$ as an arc instead of a chord (FIG. 59) the attack director computes this distance in accordance with the principle of radian measurement:

$$jXt(t) = jBq \cdot cRhq \quad (15)$$

Treating $jXt(t)$ as though it were an arc instead of a chord introduces only negligible error, because the corrections to true sonar bearing are computed in continuous cycles throughout the attack, and as successive corrections are made, the correction angle $jBq$ approaches zero.

The difference between the changing horizontal range, as computed from $Rq$ and $Hq$, and the changing horizontal range, as computed by integrating the range rate $\Delta cRhq$, is $jRhq$. A correction to slant range $jRq$ is made at the sonar equipment and is part of the slant range $Rq$ which is used in the later computations for changing horizontal range. Thus the correction to horizontal range $jRhq$ may be stated:

$$jRhq = cRhq - \Delta cRhq \quad (16)$$

The quantities $jXt(t)$ and $jRhq$ are distances in yards. To convert them to rates in yards per second, the attack director divides them by the time elapsed since the last correction was computed:

$$\frac{jXt(t)}{t} = jXt \quad (17)$$

$$\frac{jRhq}{t} = \frac{jYt(t)}{t} = jYt \quad (18)$$

The corrections to the vector components of target velocity across the line of sound and along the line of sound, $jXt$ and $jYt$, are computed in Section III of the instrument.

Computing Target Speed S

How the relations of target angle and speed to changes in bearing and range apply to the attack director's analysis of target motion is shown in FIGS. 61 and 62. In FIG. 61 the target is assumed to have been pursuing a course at a certain speed, and it is therefore expected to be at $y$. It is detected instead at $x$, which means that it has changed course or speed or both. In this displacement vector diagram, the horizontal range to the target at point $x$ has changed by the amount $jRhq$, correction to horizontal range, and the true sonar bearing has changed by the amount $jBq$, correction to true sonar bearing, so that a correction $jA$ to the target angle is required.

In FIG. 62 the same situation is again depicted, this time in terms of velocity vectors. It may be seen from FIG. 62 that as long as the $\Delta jA$ value is not large, the correction to target speed will be closely approximated by the expression:

$$jS = jYt \cos A + jXt \sin A \quad (19)$$

The quantity $jS$ is algebraically added to any correction to target speed which the operator of the attack director may introduce manually into the instrument. Since target speed is usually entered manually only for test purposes and not during attacks, the sum of the $jS$ quantities is, for practical purposes, identical with target speed S.

Computing Target Angle A

According to the rules for radian measure, the length of the arc approximated by the chord $jYt \sin A - jXt \cos A$ in FIG. 62 may also be obtained by multiplying speed by the correction to target angle:

$$\Delta jA \cdot S = jYt \sin A - jXt \cos A \quad (20)$$

In the attack director $\Delta jA$ quantity in Equation 20 is extracted and added algebraically to whatever spot correction to target angle the operator of the instrument may make. This algebraic sum is the correction to target angle $jA$. Under normal conditions, however, target angle is entered manually only for test purposes and not during attacks; the sum of all the $\Delta jA$ quantities is therefore for practical purposes the correction to target angle $jA$.

Target angle A is computed from the relation between target angle and true sonar bearing. This relation is illustrated in FIG. 54. To simplify the presentation, it is postulated in FIG. 62 that only own ship is in motion. The target is headed in a definite direction but remains stationary. When own ship is at circled point 1, the true sonar bearing is $Bq_1$. When it reaches circled point 2, the true sonar bearing is $Bq_2$. The amount by which $Bq$ changes while own ship travels from circled point 1 to circled point 2 is shown by the angle generated at own ship between $cRhq_1$ and a dotted line drawn thru own ship parallel to $cRhq_2$. This changes will be seen to equal the amount by which the target angle changes. This relationship is important, for once the target angle is determined, provided the target does not change speed or direction, changes in target angle are exactly equal to the changes in true sonar bearing. That is:

$$A_1 - A_2 = Bq_2 - Bq_2 \quad (21)$$

Computing Increments of Relative Target Bearing and Sonar Range for Position Keeping By the preliminary computations described below, the attack director determines the values of horizontal range $cRhq$, target angle A, and target speed S. In performing these computations, the attack director computes all the quantities from which the two values of interest for position keeping can also be derived. The incremental change in relative target bearing $\Delta cBrq$ is computed by substituting incremental quantities in equation 8:

$$\Delta cBrq = \Delta Co - \Delta cBq \quad (22)$$

The incremental change in sonar range $\Delta cRq$ is computed by substituting incremental values in equation 2:

$$\Delta cRq = \Delta Rhq - Hq \tan\left(\frac{Eq}{2}\right) \quad (23)$$

Position Keeping

Since relative target bearing and sonar range are among the inputs used by the attack director in generating solutions to attack problems, it is of utmost importance to the accuracy of its solutions that these inputs be correct. When there is sonar contact with the target, the $Brq$ and $Rq$ inputs to the attack director should accord with the observed values of relative target bearing and range. When contact with the target is lost, or the sonar operators are preparing to conduct a search, the introduction of false quantities into the attack director's computations should be avoided. These operating requirements are satisfied by the arrangement which permits the attack director to be operated either on-target or position-keeping. In the on-target condition, the attack director accepts bearing and range inputs from the sonar gear; in the position-keeping condition, it uses for bearing and range inputs only those quantities it has itself computed.

When sonar contact with the target has been established, the operators of the bearing console and the range recorder actuate mark signal switches to complete the circuits through which bearing and range data are transmitted to the attack director. The operator of the attack director may then cause the instrument to operate in the on-target or position-keeping condition at will by turning an operational switch on the switch panel. The instrument operates in the on-target condition only if the operators of the bearing console and the range recorder have actuated mark signal switches to complete the circuits through which bearing and range inputs are transmitted to the attack director and the operator of the attack director has positioned the operational switch of his instrument in the On position so that it will accept these sonar inputs.

When the attack director is operated in the on-target condition, the On Target indicator lamp lights and the circuits through which sonar inputs to the attack director are transmitted from the terminal board to the synchro control transformers are closed.

When either of the mark signal switches is released, or the operational switch of the attack director is set at Position Keeping, the On Target indicator lamp goes out, the Position Keeping indicator lamp lights, the circuits through which sonar inputs are transmitted to the receiving synchro control transformers are interrupted, and generated increments of bearing and range are applied to these receivers in place of the sonar inputs.

The attack director then continues to generate solutions to the attack problems on the assumption that the target changes neither course nor speed after sonar contact with it is interrupted. The attack director's solutions are accurate unless the target actually does change course or speed.

Aided Tracking

The term "aided tracking" refers to the use of quantities generated by the attack director for tracking the target with sonar instruments. Values of $\Delta cBrq$ and $\Delta cRq$, to which the sonar operators can make manual corrections are transmitted to the sonar instruments to position their cursors, or searching equipment. A switching arrangement enables the sonar operators to accept these inputs at will for aided-tracking operation.

Solving the Attack Problems

The solution to the three types of attack problems presented in FIGS. 52, 53 and 55 are illustrated in FIGS. 63–66. Each factor in these problems is referenced from own ship's track, an arrangement which makes it possible to solve each problem by a trigonometric method using the right triangle relationships. Two quantities are of interest in the solution of each attack: time to fire $Tud$, and own ship's course correction $jCo$, for stern-dropped and fixed ahead-thrown attacks; and advance range $R2$, and projector bearing order $cBgr$, for attacks with a trainable weapon.

Solution to Stern-Dropped and Fixed Ahead-Thrown Attacks

Inspection of FIGS. 63 and 64 discloses certain significant differences between the attacks they illustrate. For stern-dropped attacks parallax $P1$ is measured from the transducer aft to the stern. For fixed ahead-thrown attacks parallax $P$ is measured from the transducer forward to the projector. There is no advance range $Re$, nor time of flight $Tf$, for stern-dropped charges. In stern-dropped attacks own ship has passed the explosion point and is continuing out of range during the sinking time $Td$, whereas in fixed ahead-thrown attacks own ship is a considerable distance from the explosion point but is proceeding toward it during the sinking time $Td$.

The over-all distance traveled by own ship from the beginning of the attack at circled point 1 until the explosion occurs at circled point 4, in FIG. 63, or 5 in FIG. 64, is $SoTu$, own ship's speed multiplied by the time remaining until the explosion. The distance traveled by own ship before the order to fire is transmitted is $SoTud$, own ship's speed multiplied by the time remaining to fire, in all cases. During the interval between the transmission of the firing order at circled point 2 and the actual firing at circled point 3, own ship travels the distance $SoTg$, own ship's speed multiplied by dead time. If the charges are launched from the bow, there is an interval of flight time before the charges hit the water; during this period own ship covers the distance $SoTf$, own ship's speed multiplied by time of flight, to circled point 4 in FIG. 64. In stern dropped attacks, the flight time for charges to drop from the stern racks to the water is negligible. While the charges are sinking to the target depth, own ship travels the distance $SoTd$, own ship's speed multiplied by sinking time between circled points 3 and 4 in FIG. 63, or 4 and 5 in FIG. 64.

The over-all distance traveled by the target is $STu$, target speed multiplied by the time remaining until the explosion. At explosion time, own ship will be at circled point 4 in a stern-dropped attack, FIG. 63, or at circled point 5 for an ahead-thrown attack, FIG. 64. Obviously the time to explosion should be the same for both ship and target.

Computing Time Remaining Until the Explosion and Sinking Time, Tu and Td

The quantities $Tu$, time remaining until the explosion should occur, and $Td$, sinking time, are used in the generation of solutions to stern-dropped and fixed ahead-thrown problems. $Tu$ is the sum of time remaining to fire, dead time, time of flight, and sinking time:

$$Tu = Tud + Tg + Tf + Td \qquad (24)$$

In the attack director the terms in Equation 24 are transposed and the equation mechanically satisfied in the form:

$$Tu - Td = Tud + Tg + Tf \qquad (25)$$

The time it takes a charge of known sinking rate $Sd$, to descend to a known target depth $Hq$ is $Td$:

$$Td = Hq\left(\frac{1}{Sd}\right) \qquad (26)$$

$Td$ may be added to $Tu - Td$ to get $Tu$.

Computing Own Ship's Course Correction jCo

The correction to own ship's course $jCo$ is obtained by solving the right triangle in FIGS. 52, 53, 63 and 64 having own ship's track as its base, $Rhu$ as its hypotenuse, and $jCo$ as the angle between them.

The side corresponding to own ship's track may be defined by the expression:

$$Rhu \cos jCo = cRhq \cos (360° - Brq) + STu$$
$$\cos (Brq - 180° - A) \qquad (27)$$

where the expression $(Brq - 180° - A)$ represents the angle made by the target track with a line passing thru the target parallel to own ship's track.

The side $Rhu \sin jCo$ perpendicular to own ship's track is given by:

$$Rhu \sin jCo = cRhq \sin (360° - Brq) - STu \sin$$
$$(Brq - 180° - A) \qquad (28)$$

Dividing Equation 28 by Equation 27, cross-multiplying, and factoring out the unknown $Rhu$ quantity gives:

$$\sin jCo \; [cRhq \cos (360° - Brq) + STu \cos$$
$$(Brq - 180° - A)] = \cos jCo \; [cRhq \sin$$
$$(360° - Brq) - STu \sin (Brq - 180° - A)] \qquad (29)$$

All other terms in Equation 28, except $Tu$, are known, and $Tu$ is being found simultaneously in computing $Tud$, as explained in detail below. Using a hypothetical $Tu$ value, the attack director solves for $jCo$ and then repeats the solution with successively more correct values until $jCo$ is exact.

Computing Time to Fire, Tud

How long own ship should continue on its course during stern-dropped and fixed ahead-thrown attacks before firing upon the target at time $Tud$, time to fire, is determined from the horizontal components of the attack problems shown in FIGS. 63 and 64. Inspection of FIG. 64, the diagram of a fixed ahead-thrown attack, discloses that $$cRhq \cos (360° - Brq) + STu \cos (Brq - 180° - A) =$$
$$SoTu - SoTd + (P + Re) \qquad (30)$$

Equation 30 applies as well to stern-dropped as to fixed ahead-thrown attacks, but in such cases $Re$ and $Tf$ are zero and the parallax $P$ is a negative quantity measured from the transducer to the stern, and referred to hereafter as P1. The parallax is also a negative quantity where a fixed ahead-thrown attack is delivered from a projector located aft of the transducer. Transposing the quantities in Equation 30 to the form in which the attack director mechanically satisfies the equation gives $$cRhq \cos (360°-Brq) + STu \cos (Brq-180°-A) - P1 - So(Tu-Td) = 0 \quad (31)$$

The attack director extracts the $Tud$ quantity as explained hereafter, and determines $Tu$ in accordance with Equations 25 and 26.

Trainable Thrown Attacks

The solution to the problem originally presented in FIG. 55 is shown in FIG. 65. The two quantities of interest in this situation are the projector bearing order $cBgr$ and the advance range $R2$. They are computed by solving the triangle in FIG. 65 having $R2$ for its hypotenuse, a length of own ship's track for its horizontal line, and $(360°-cBgr)$ for the angle included between them. This triangle is shown to an expanded scale in FIG. 66.

The velocity component imparted by own ship to missiles fired from a projector on its deck produces travel for a distance $SoTf$ in a direction parallel to own ship's track. The computations of advance range and projector bearing order both take this vector component into consideration. Advance range is the distance from the projector in own ship to a point aft of the position the target will occupy at time $Tg+Tf+Td$ by an amount equal to the distance $SoTf$ measured along a line parallel to own ship's track. The projector bearing order computed by the attack director to train the projector upon that point is represented by $cBgr$.

Computing Projector Bearing Order cBgr

Projector bearing order $cBgr$ is obtained by a method similar to that used above to find $jCo$, but using the right triangle in FIG. 65, and in expanded form in FIG. 66, having own ship's track as its base, $R2$ as its hypotenuse and $360°-cBgr$ as the angle between them.

The side along own ship's track may be defined by the expression $$R2 \cos (360°-cBgr) = cRhq \cos (360°-Brq) + S(Tg+Tf+Td) \cos (Brq-180°-A) - So(Tg+Tf) - P \quad (32)$$

The side perpendicular to ship's track is, similarly, $$R2 \sin (360°-cBgr) = cRhq \sin (360°-Brq) - S(Tg+Tf+Td) \sin (Brq-180°-A) \quad (33)$$

Dividing Equation 32 by Equation 33 and cross-multiplying factors out the $R2$ quantity and gives:

$$\cos (360°-cBgr)[cRhq \sin (360°-Brq) - S(Tg+Tf+Td) \sin (Brq-180°-A)] = \sin (360°-cBgr)[cRhq \cos (360°-Brq) + S(Tg+Tf+Td) \cos (Brq-180°-A) - So(Tg+Tf) - P] \quad (34)$$

The attack director extracts the quantity $cBgr$ as described hereafter.

Computing Advance Range R2

The expressions on either side of Equation 34 may be seen to represent the length of a perpendicular AB dropped to $R2$ from the right angle in the expanded triangle of FIG. 66. This line is of interest in computing $R2$. Inspection of FIG. 66 shows that the length R2L of the portion of $R2$ to the left of AB is given by the equation:

$$R2L = \cos (360°-cBgr)[cRhq \cos (360°-Brq) + S(Tg+Tf+Td) \cos (Brq-180°-A) - So(Tf+Tg) - P] \quad (35)$$

and the length R2R of $R2$ to the right of AB is:

$$R2R = \sin (360°-cBgr)[cRhq \sin (360°-Brq) - S(Tg+Tf+Td) \sin (Brq-180°-A)] \quad (36)$$

Since $R2$ is the sum of these portions R2L and R2R:

$$R2 = \cos (360°-cBgr)[cRhq \cos (360°-Brq) + S(Tg+Tf+Td) \cos (Brq-180°-A) - So(Tf+Tg) - P] + \sin (360°-cBgr)[cRhq \sin (360°-Brq) - S(Tg+Tf+Td) \sin (Brq-180°-A)] \quad (37)$$

Corrections for Curved-Course Attacks

As the foregoing discussion indicates, the attack director readily computes changes in target course and speed from the sonar inputs. When the target is observed going into a hard turn during evasive maneuvers, the computations of the attack director are accelerated if the total estimated target turning angle is introduced at once. The sonar gear introduces only the actual values of sonar range and target bearing at each successive instant, and it therefore takes longer to compute the full value of a turn if only the automatically transmitted values are used. For this reason, the sonar inputs may be supplemented by manually entered anticipatory corrections for curved course attacks.

When the target is observed going into a hard turn, the operator of the attack director may make an insertion based on the known characteristics of the type of submarine that experience tells him is likely to be encountered in that area. He multiplies the assumed turning rate of the target in degrees per second by the number of seconds the turn will continue, which for an immediate attack is assumed to be equal to the sum of dead time plus time of flight plus sinking time, to estimate the amount of correction to target course that will be needed for a projectile fired now. He adjusts this estimate in accordance with the horizontal range that separates own ship from the target, as below, and enters the spot correction $jC$ in the direction of the target's turn at the Target Turn input knob 22 on the attack director.

If the range is 800 yards or more, he enters triple the originally estimated turn; as the range closes to 500 yards, he turns back the knob to reduce the over-corrected quantity by one-third of the original input, leaving double the value of the estimated turn. When the range closes to about 300 yards, he again reduces the entered correction by one-third so that at this close range it accords with the actual estimate of the turn. This procedure of over-correcting at the outset and reducing toward the correct value as the attack progresses increases the probability of scoring a hit on a target that is attempting an evasive maneuver.

FIG. 60 illustrates a hard turn being executed by the target after its travel along the path with course angle C. The target turn correction $jC$ is entered at the Target Turn knob 22. It is asumed that the path of the turning target will be an arc of a circle. The attack director's computations are then based on the asumption that the target is following a hypothetical straight course which is a chord of the same circle, as shown by the broken line. It assumes that the target will reach point X by following this hypothetical course at the same time as it actually does reach point X following the curved course. The assumed straight course is, of course, shorter than the curved course, and compensation, provided by a functional cam, is introduced into the quantity representing target speed S, to attain a correct solution. The correction to target course is actually applied to C. It will be seen from FIG. 60 that the correction to C will be one half the central angle $jC$ of the circle in which the target turns. Hence entry of the proper $jC$ value on the spot correction scale causes a value proportional to $$\frac{jC}{2}$$

to be applied as a correction to C in the computer.

Depth Charge Attack Error

The distance to right (starboard) or left (port) of $Rhu$ of the point F at which the charges will be dropped if own ship continues on its present course, or depth charge attack error, is of interest during the progress of the attack. In FIGS. 52 and 63 it may be seen that point F will fall on point E when own ship is exactly on the attack course. When these points coincide, the distance $$STu \sin (Brq - 180° - A)$$

will equal the distance $cRhq \sin (360° - Brq)$, and their difference, the error $Rhu \sin jCo$, will equal zero.

If own ship is not exactly on the attack course, the depth charge attack error EF is given by the equation:

$$EF = cRhq \sin (360° - Brq)$$
$$-STu \sin (Brq - 180° - A) \quad (38)$$

Solution of Equation 38 furnishes data for continuous visual indication of the probable success of the attack.

How the attack director mechanically satisfies these expressions for the solution of the three types of attack problems and for position keeping is described hereafter in relation to each of the seven sections of the computer. Sections I–V accept all automatically transmitted inputs, as shown in the chart of FIG. 4, and generate the quantities needed for position keeping. They also generate other quantities needed for solving the attack problems but not supplied to the director as inputs.

In Sections VI and VII, the equations supplying solutions to the attack problems are mechanically satisfied, and the solutions extracted. These sections function as a unit, and will be treated together.

Construction and Operation

The attack director 1 is shown in a preferred embodiment in FIG. 1 as housed in two separate enclosures, mounted one above the other. These enclosures may be of aluminum alloy or any equivalent rigid material. The computer unit 2 is shown in the upper position, and contains primarily the mechanical operating elements of the director; the amplifier unit 4 is shown in the lower position, and contains primarily electrical elements of the director. The only connections between the computer unit 2 and the amplifier unit 4 are electrical leads, so these units may be separately mounted.

The computer unit 2 is enclosed in a strong spray-tight housing 5, while the amplifier unit 4 is housed in a sturdy drip-proof case 6. The enclosures are arranged for shock mounting on suitable brackets on the deck or a bulkhead of the ship, and the various components are so disposed that each section may be individually removed for assembly or servicing. The computer unit 2 is mounted within housing 5 on a suspension, shown in detail in FIGURE 51. This suspension permits the entire unit to be swung forward out of the case into a horizontal position for ease of access.

Computer unit 2 presents to the operator a transparently masked instrument face 8 on which are visible nineteen dials and a range counter, all showing factors pertinent to the solution of the attack problems. Along the sides of instrument face 8 are disposed two input hand cranks and eight manual adjustment knobs, by means of which values are entered in the computer. The values so entered may be read on corresponding dials within the instrument face. Beneath face 8 is disposed a time motor control knob 9 on a switch panel 10. A range selector switch knob 11 and an operational control switch knob 12, are also disposed on switch panel 10.

Figure 6:
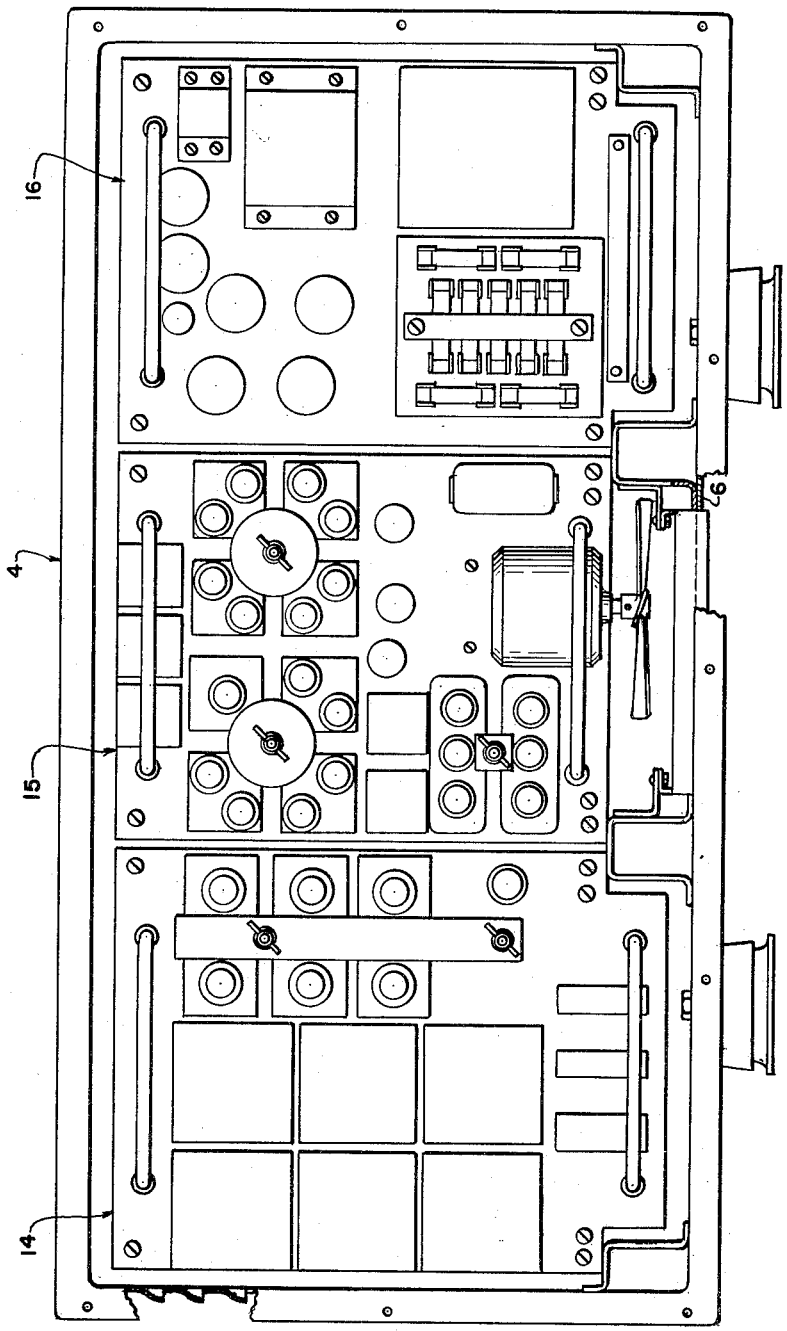
FIG. 6 is a front elevational view of the amplifier unit, with the cover plate removed to reveal the components therein.

Amplifier case 6 has a transparent fuse cover plate 13, thru which the protective fuses may be seen by the operator. Cover plate 13 is quickly removable to allow replacement if a fuse should blow out. Within case 6 as seen in FIG. 6 are the damping unit 14, the amplifier assembly 15 and the power supply unit 16.

Computer case 5 and amplifier case 6 are arranged for the connection thereto of suitable electrical power supply leads from the ship's power supply circuits, not shown, as well as for electrical connection to each other and to the various inputs and outputs.

The attack director is arranged to perform its functions in part on the basis of input data automatically received from elements of the individual sections which will be described in detail hereafter:

(1) Relative sonar bearing $Brq$ data is received from the ship's bearing console by Section V synchro control transformers 519 and 520 at 360° and 10° per revolution.

(2) Sonar range $Rq$ is furnished by the range recorder of the ship's sonar gear to Section I synchro control transformers 106 at 2,000 yards, and 107 at 72,000 yards per revolution between 0 and 3000 yards.

(3) Own ship's course $Co$ is transmitted from the ships' gyrocompass to Section V synchro control transformers 525 and 526 at 360° and 10° per revolution.

(4) Own ship's speed $So$ is received from own ship's pitometer log by Section IV synchro control transformer 401 at 40 knots per revolution between zero and 30 knots and registers on own ship's speed dial 67.

(5) Sonar range correction $Rqj$ is supplied from the sound range recorder to Section II synchro differential transmitter 250 at 111.1 yards per revolution.

In addition to the automatically entered input data specified above, the computer unit 2 receives 10 quantities which are entered manually by means of knobs and handcranks:

(1) Target angle correction $jA$ is set into Section III by target angle correction handcrank 17. The correction registers in target angle dial group 19 on 10° target angle dial 18, and 360° target angle dial group 61, where it is read on inner dial 62 against the fixed index 65.

(2) Target speed correction $jS$ is inserted thru target speed correction handcrank 20 between 0 and 20 knots, registering on target speed dial 21.

(3) A correction for sharp target turns is entered thru the target knob 22, registering on target turn dial 24 between 150° left turn and 150° right turn.

(4) Target depth $Hq$ is set in by target depth knob 25 between zero and 1200 feet, registering on target depth dial 26.

(5) The quantity $Tf + Tg$, time of flight plus dead time (fixed), is entered for stern-dropped or fixed ahead-thrown attacks thru the $Tf + Tg$ (fixed) knob 27, registering on $Tf + Tg$ (fixed) dial 29.

(6) The quantity $Tf + Tg$ for trainable-thrown attacks is set in by the $Tf + Tg$ (trainable) knob 30, registering on $Tf + Tg$ (trainable) dial 31 between limits of zero and 25 seconds.

(7) The parallax quantity for fixed ahead-thrown attacks, $P + Re$, parallax plus effective range, or for stern-dropped attacks P1, is entered by fixed parallax knob 32, registering between 320 yards forward and 150 yards aft on fixed parallax dial 34.

(8) Parallax P for trainable-thrown attacks is inserted thru trainable parallax knob 35, and registers on trainable parallax dial 36 between 50 yards forward and 100 yards aft.

(9) Sinking rate $Sd$ for stern-dropped and fixed ahead-thrown attacks is inserted thru sinking rate (fixed) knob 37 and registers on sinking rate (fixed) dial 39 between 8 and 35 feet per second.

(10) Sinking rate $Sd$ for trainable-thrown attacks is entered thru sinking rate (trainable) knob 40 between limits of 20 and 50 feet per second, registering on sinking rate (trainable) dial 41.

Figure 20:
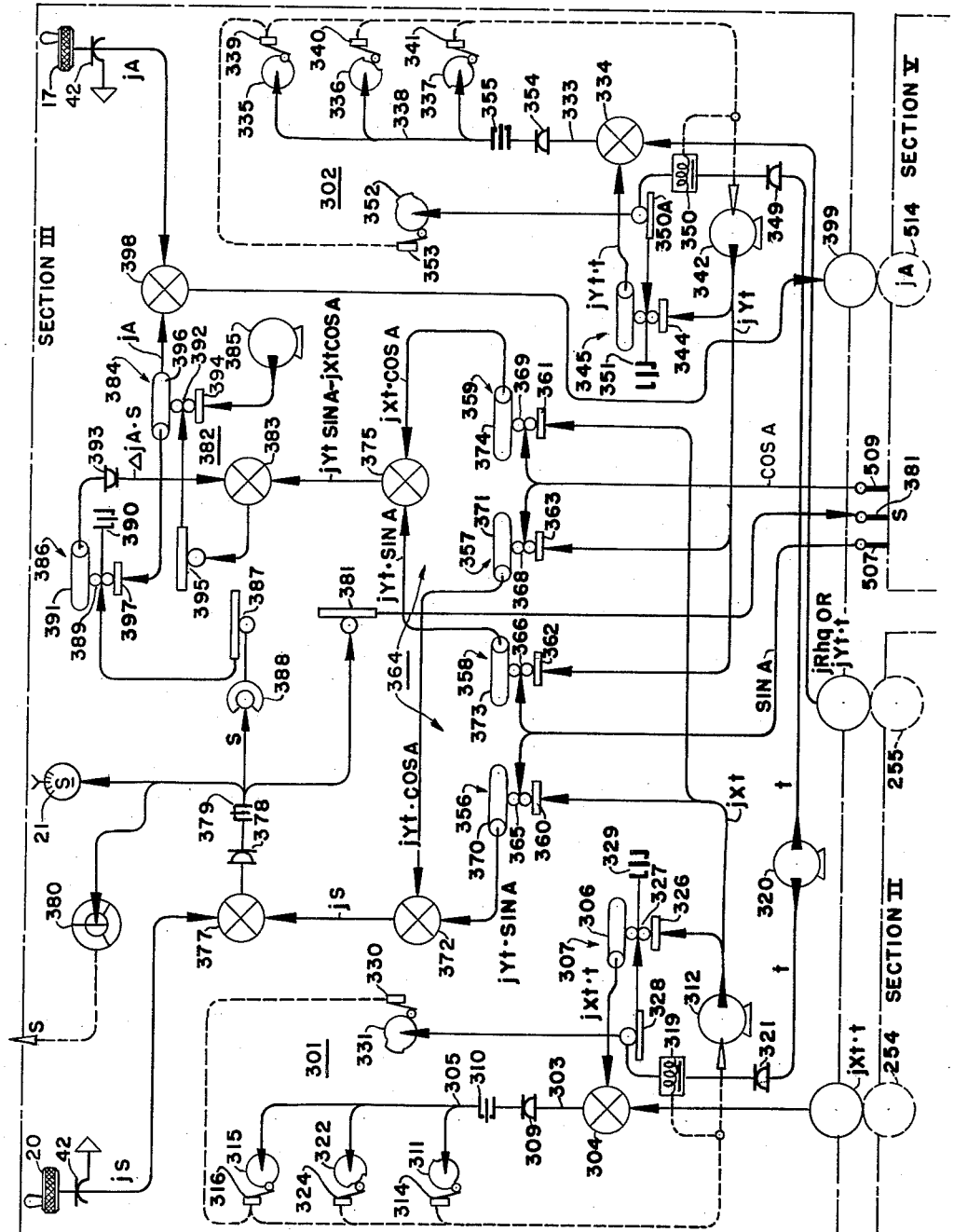
FIG. 20 is a functional schematic diagram of the Section III elements for computing target speed and change in target course.
Figure 21:
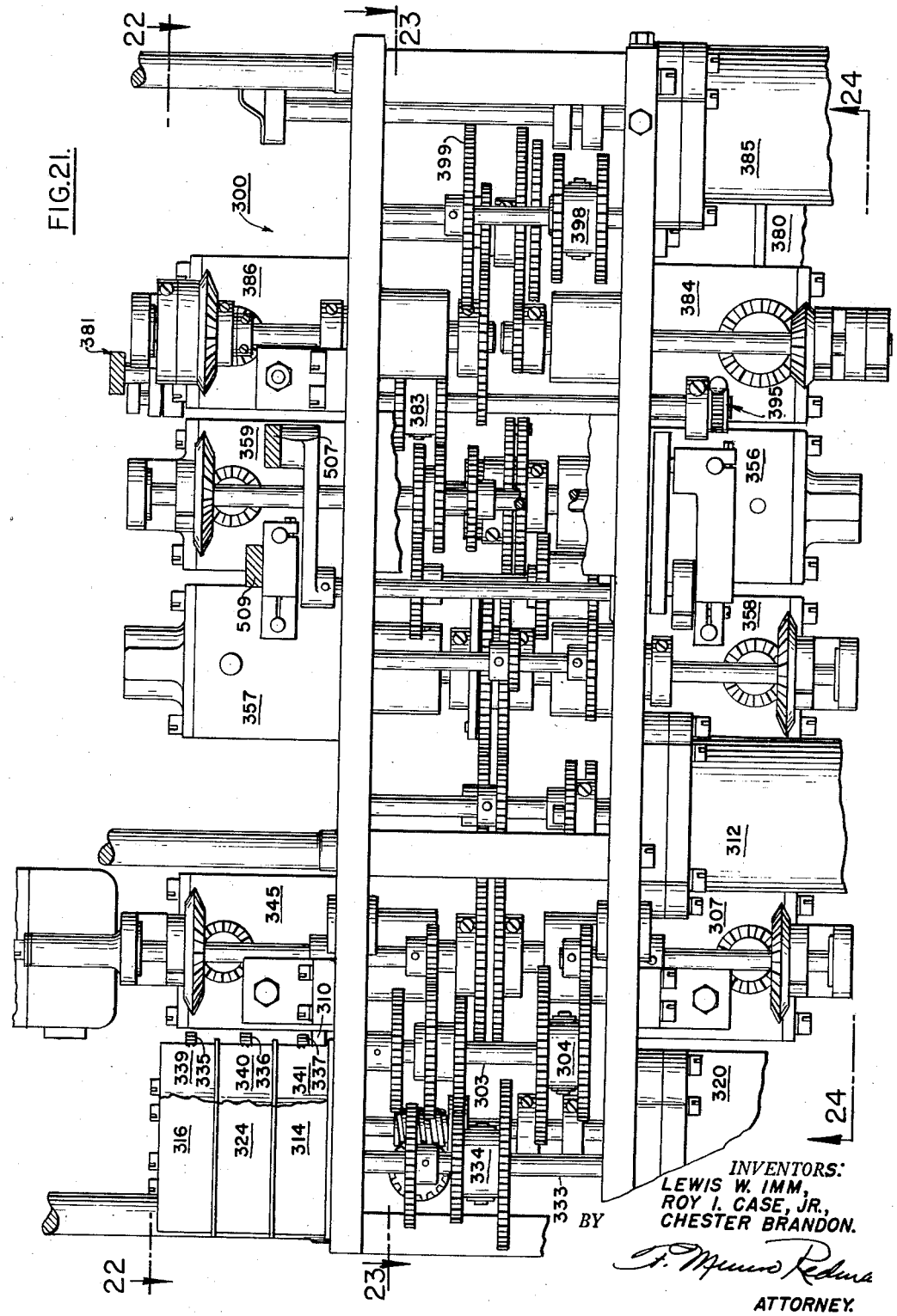
FIG. 21 is a bottom plan view of Section III of the computer.
Figure 22:
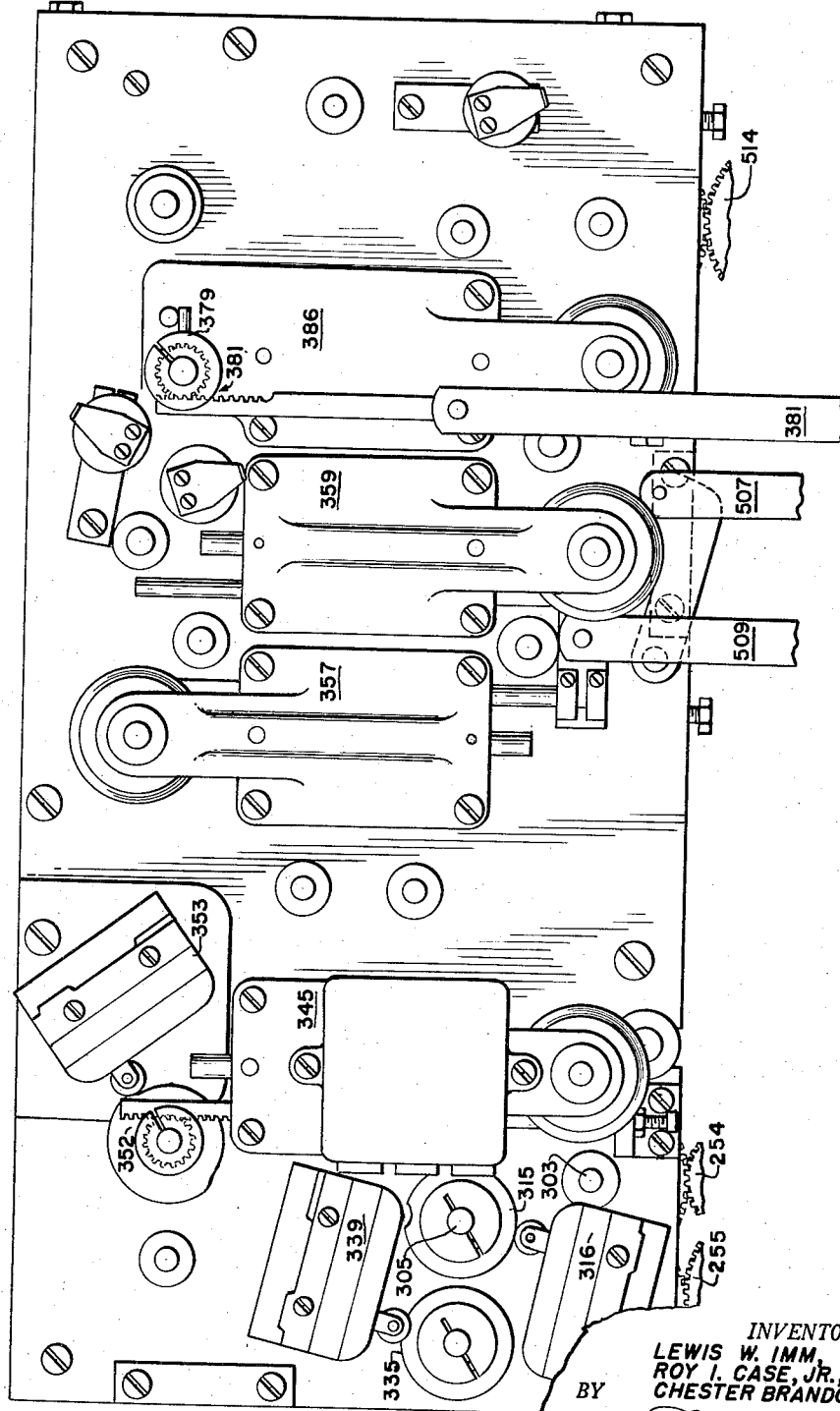
FIG. 22 is a front elevational view of Section III in the plane indicated by line 22—22 in FIG. 21.
Figure 23:
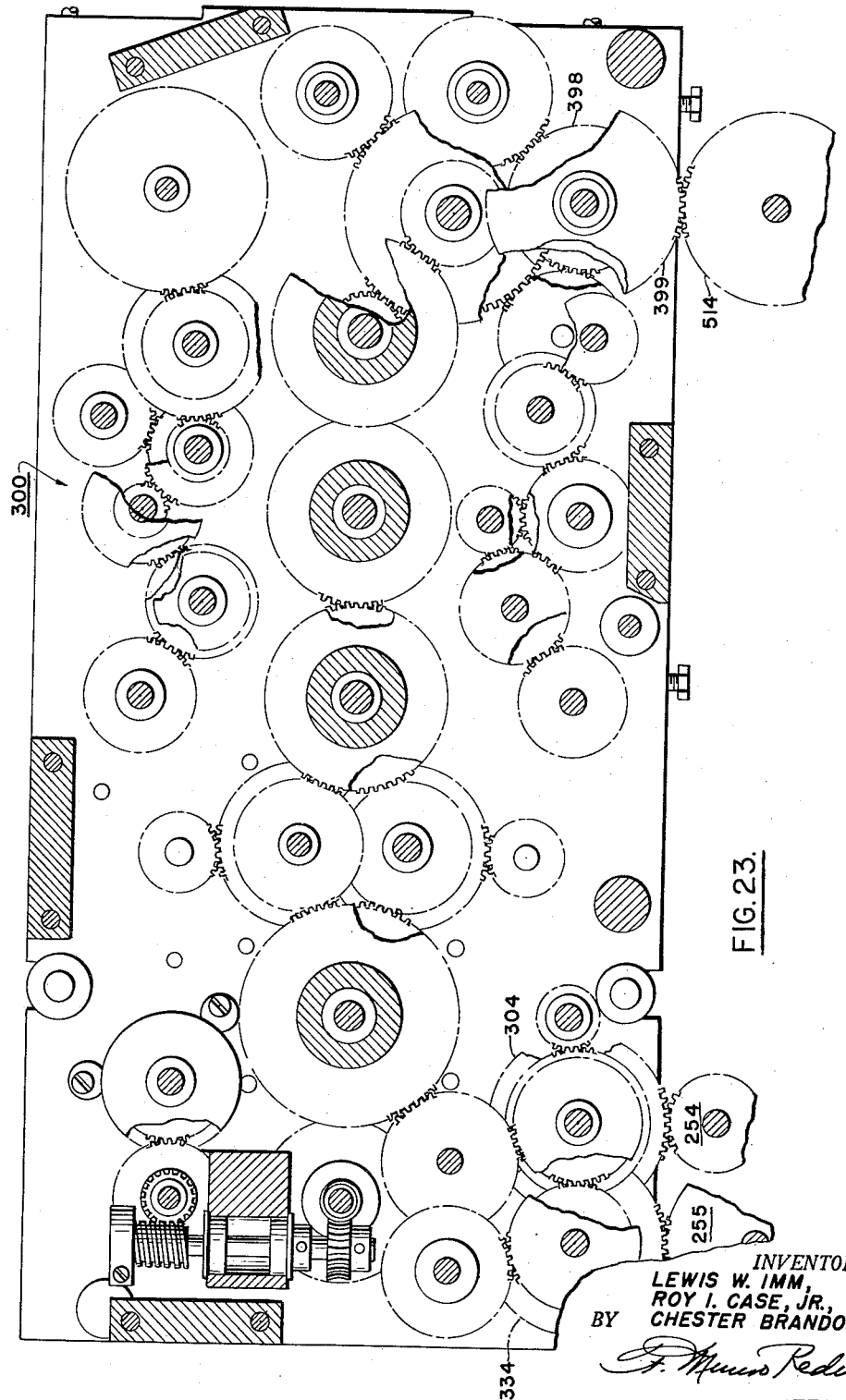
FIG. 23 is a front elevational view of elements of Section III taken as indicated by line 23—23 of FIG. 21.
Figure 24:
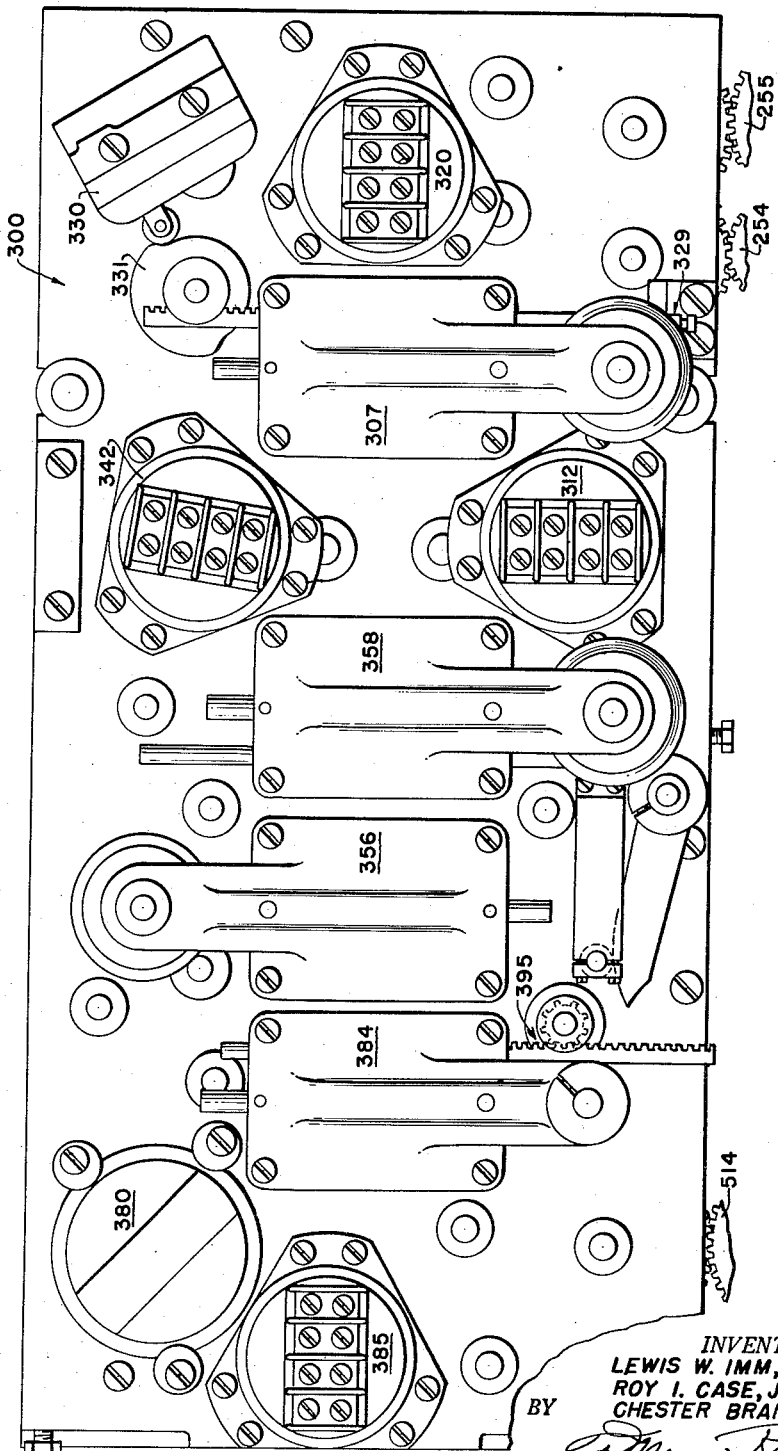
FIG. 24 is a rear elevational view of the assembly of Section III taken as indicated by line 24—24 in FIG. 21.

Each of these knobs has associated therewith a simple and conventional frictional holding device 42 which prevents the knob from rotating except when turned by the operator. These devices have been indicated thruout the specification in the same fashion as shown in FIG. 20, but have not been mentioned specifically elsewhere.

During the operation of the director, nine quantities are generated and transmitted by synchros to other fire-control equipment.

(1) Time to fire $Tud$ is transmitted from Section VII by synchrotransmitter 712 at 120 seconds per revolution between limits of 120 and zero seconds, registering on the $Tud$ dial 45 against index 44.

(2) Own ship's course correction $jCo$ is transmitted from Section IV by synchrotransmitter 421 at 360° per revolution, and may be found from Own Ship dial group 46, as the difference between $cCo$ and $Co$.

(3) Advance range R2, transmitted from Section VII by synchrotransmitter 757 at 2000 yards per revolution between 0 and 1500 yards, registers on advance range dial 47.

(4) Projector bearing order $cBgr$ is transmitted from Section VII by low-speed synchrotransmitter 740 and high-speed synchrotransmitter 744 at 360° and 10° per revolution, registering on the low-speed projector bearing order dial 49 and the high-speed projector bearing order dial 50.

(5) Target angle A, as set in by handcrank 17 or as found in Section V, is transmitted by synchrotransmitter 515 at 360° per revolution, and registers on the high-speed target angle dial 18 and the low-speed target angle dial group 61.

(6) Target speed S computed in Section III or set in by handcrank 20 is transmitted by synchrotransmitter 380 at 100 knots per revolution between 0 and 20 knots, and registers on the target speed dial 21.

(7) Increments of generated sonar range plus sonar range correction, $Rqj + \Delta cRq$, are computed in Section II and transmitted by synchro differential transmitter 250 at 111.1 yards per revolution to the Range Recorder, where they are converted to slant range $Rq$. This slant range is returned to Section I of the computer, which computes horizontal range, displayed on horizontal range counter dials 51.

(8) Horizontal sonar range rate $dRhq$ computed in Section II is transmitted by synchrotransmitter 248 at 50 knots per 270 degrees from zero to 50 knots, either increasing or decreasing, and registered in knots on horizontal range rate dial 52.

(9) Increments of relative sonar bearing $\Delta cBrq$ in Section II are transmitted by synchrotransmitter 246 at 10° per revolution.

These electrical inputs and outputs are shown together in a tabular arrangement for ready reference in FIG. 3, and as the broken lines in the flow chart of FIG. 4 of the drawings.

*Dials and Counters*

The nineteen dials and range counter on the face of the instrument in FIG. 1 register the magnitudes of the factors involved in the attack problem. The whole progress of an attack may be visualized from these dial indications alone, as the relative positions and headings of target and own ship are continually displayed on the dial groups 61 and 46 described hereafter.

The Advance Range dial 47 indicates the advance range for trainable-thrown attacks in 10-yard increments.

The two Projector Bearing Order dials 49 and 50, indicate the projector bearing order generated for trainable-thrown attacks; the lower, or low-speed dial 49, is graduated in 10-yard increments from zero to 360 degrees; the upper or high-sped dial 50 is graduated in 1-degree increments from zero to 10 degrees.

The Time To Fire dial 45, graduated in 1-second increments, indicate $Tud$, the time remaining to fire, from 120 to zero seconds. A range rate scale 53 is provided on this dial for use in releasing depth charges in a pattern. Dial 45 and scale 53 are read against the fixed index 44.

The Own Ship dial group 46 consists of a fixed index 54 and three concentrically mounted dials: an inner dial 55, an inner ring dial 56, and an outer ring dial 57, which register relative target bearing, true sonar bearing, own ship's course, and own ship's course order. Inner dial 55 bears a symbol 58 representing own ship in its relative heading at any instant. The inner dial 55 and the inner ring dial 56 are graduated in 5-degree increments from zero to 360°. The outer ring dial 57 has only an index 59 and the legend Course Order. Relative target bearing $Brq$ is read on the inner dial against the fixed index 54. True sonar bearing $Bq$ is read on the inner ring dial 56 against the fixed index 54, and own ship's course $Co$ is read on the inner ring dial 56 against the zero of the inner dial 55. Own ship's course order $cCo$ is read on the inner ring dial 56 against the diamond index 59 of the outer ring dial 57.

The Target dial group 19 consists of a high-speed target dial 18 and a low-speed dial group 61 having two concentrically mounted dials 62 and 64 graduated in 5-degree increments from zero to 360°. Inner dial 62 bears a symbol 63 representing the target.

The high-speed Target Angle dial 18, graduated in 1-degree increments between zero and 10°, provides fine indications of target angle to supplement course indications furnished by the low-speed Target dial group 61.

Target Angle A is read on the inner dial 62 of the low-speed dial group 61 against the fixed index 65, and target course C is read on the outer dial 64 against the zero of the inner dial 62. The target symbol 63 will be heading in the direction of the target course.

The Depth Charge Attack Error dial 66, graduated in 50-yard increments from zero to 200 yards starboard or port indicates the distance to right or left of point E, the intersection of the $Rhu$ line with the target track, at which the charges will be dropped if own ship continues on its present course $Co$.

The Horizontal Range Rate dial 52, graduated in 2-knot increments from zero to ±50 knots indicates $dRhq$, the rate at which the horizontal sonar range is increasing or decreasing.

The Target Turn dial 24, graduated in 5-degree increments from zero to 20 knots, registers S, the value of target speed.

The Target Turn dial 24, graduated in 5-degree increments from zero to 150° right and left, registers the estimated target turn to right or left of the original target course.

The Own Ship Speed dial 67, graduated in 1-knot increments from zero to 30 knots, registers $So$, the automatic input of own ship's speed.

The Time Of Flight Plus Dead Time Fixed dial 29, graduated in 1-second increments from zero to 15 seconds, registers the quantity $Tf + Tg$ for stern-dropped and fixed ahead-thrown attacks.

The Time of Flight Plus Dead Time Trainable dial 31, graduated in 1-second increments from zero to 25 seconds registers the quantity $Tf + Tg$ for trainable-thrown attacks.

The Parallax Plus Effective Range Fixed dial 34, graduated in 1-yard increments from zero to 320 yards forward and zero to 150 yards aft, registers the quantity P1 for stern-dropped or $P + Re$ for fixed ahead-thrown attacks.

The Parallax Trainable dial 36, graduated in 5-yard increments from zero to 50 yards forward and zero to 100 yards aft, registers the parallax, P, for trainable-thrown attacks.

The Depth dial 26, graduated in 50-foot increments from zero to 1200 feet, registers target depth, $Hq$.

The Sinking Rate Fixed dial 39, graduated in 1-foot increments from 8 to 35 feet per second, registers sinking rate, $Sd$, for fixed ahead-thrown and stern-dropped charges.

The Sinking Rate Trainable dial 41, graduated in 1-foot increments from 20 to 50 feet per second, registers the sinking rate for trainable-thrown charges.

The Horizontal Range counter 51 registers horizontal sonar range $cRhq$ in yards.

Indicator Lamps

During operation of the attack director, one of the signal lamps shown in FIGS. 1 and 2 lights to show the particular function.

If the attack director is receiving bearing and range inputs from the bearing console and sound range recorder, the On Target indicator lamp 69 lights.

If the attack director is operating without inputs of bearing and range, the Position Keeping indicator lamp 70 lights.

Whenever the computed sinking time for stern-dropped charges exceeds the 60-second limit for which the instrument is designed, the No Solution For Stern Dropped Charges indicator lamp 71 lights. Although a value of sinking time greater than 60 seconds might be computed when a slow sinking rate and a large target depth are entered, a limit stop permits the attack director to use values between zero and 60 seconds only.

Preparation for Operation

Before the attack director is to be used, all circuits are energized and amplifiers warmed up. This is done by turning the three knobs 11, 12 and 9 on the switch panel 10 to the proper positions. Operational switch knob 12 is set to the Standby position; the Time Motor Knob 9 is turned to the Off position; and the Range Selector Switch Knob 11 is set in the On position. Except when the attack director is to be used for generating solutions to attack problems, it is operated in the standby condition at all times, to keep it in readiness for immediate use.

Operating Procedure

When contact has been established with the target, and it has been determined what type or types of attack should be conducted, appropriate inputs are entered for the following quantities:

Target depth.
Time of flight plus dead time.
Parallax.
Sinking speed.

*On-target operation.*—The On and Position Keeping positions of the operational switch 12 provide means for operating the attack director in either the on-target or position-keeping condition at will. So long as sonar contact is being made with the target by the operators of the sonar gear, the operational switch of the attack director is left in the On position. The On Target indicator lamp will meanwhile remain lighted, indicating that relative target bearing and sonar range are being received by the attack director.

*Position-keeping operation.*—When sonar contact with the target is lost or the sonar operators are preparing to conduct a search, operational switch 12 is turned from the On to the Position Keeping position. Bearing and range inputs from the sonar gear will no longer be accepted by the attack director, which will use instead its own computed values based on the bearing and range inputs it received at the last instant of on-target operation. The instrument may be restored to on-target operation by returning operational switch 12 to the On position.

Application of Generated Solutions

A brief summary of the use made of certain quantities generated within the director will assist in understanding the relations of the several sections.

$jCo$.—In fixed head-thrown or stern-dropped attacks, own ship's course, $Co$, as read on inner ring dial 56 against the zero on inner dial 55 in own ship's dial group 46 is corrected continuously by the helmsman to keep own ship on an intercept course to the advance position of the target.

$Tud$.—In fixed ahead-thrown attacks, the projector is fired when the Time To Fire dial 45 registers zero seconds. In a stern-dropped attack the first charge in the pattern is dropped before zero time; how long before zero time is determined by using the range rate scale 53 on Time To Fire dial 45. This scale is so calibrated that for any particular rate of closure, the time for firing the first charge of a pattern is indicated in seconds before a zero $Tud$, the firing time for the center charge of the pattern. Usually it is desired to release the depth charges at intervals of 40 relative yards. When the range rate opposite the index 44 on Time To Fire dial 45 agrees with the range rate indicated by Range Rate dial 52, the first group is released. A stop watch is started at this time, and the time remaining to fire, $Tud$, is noted and divided in two. The second group of charges is released when $Tud$ has half the value indicated at the time of the first firing. The third group of charges, released at zero time, is at the center of the pattern. The two groups of charges in the pattern following zero time are released with the same time intervals as were the first three. The release of all of the successive groups of charges is usually timed by stop watch.

For example, assume that during a stern-dropped attack a range rate of 8 knots is indicated simultaneously on the Range Rate and Time To Fire dial 52 and 45. On Time To Fire dial 45, 8 knots is opposite 18 seconds. To drop charges in a pattern, the first group of charges should be released at 18 seconds before zero time to fire, the second group at 9 seconds before time to fire, the third at zero time, and the fourth and fifth at 9 and 18 seconds after zero time. The charges would be spaced 40 relative yards apart. Were the range rate 6 knots, the first charges would be fired at 24 seconds before time to fire, and the time interval between the release of each of the next four charges would be 12 seconds.

$cBgr$.—In a trainable-thrown attack, the projector is trained in the direction indicated on the Projector Bearing Order dial 50.

$R2$.—The projector, trained as above to $cBgr$, is fired when the Advance Range dial 47 registers the rated range of the projector.

Manual Inputs of Target Angle and Speed

Corrections to target angle and speed may be introduced through the two handcranks 17 and 20, registering on the Target Speed dial 21 and Target Angle dials 18 and 61. Since these corrections are generated automatically by the attack director, the handcranks are normally used only for test purposes.

Matching Bearing and Range

Since the accuracy of the attack director's solutions to the attack problem is determined by the accuracy of its computations of target angle and speed, it is important that the operators keep the generated and observed values of bearing and range in agreement as long as contact with the target is maintained. Once the generated values have agreed with the observed values for an interval of tracking time, any maneuver of the target is immediately detected by the discrepancy that develops between the generated and observed values.

Mechanical Suspension System

The computer unit 2 is arranged so that the computer assembly 75 may be swung forward out of the case for ease of access when the front cover 7 of housing 5 is removed. The suspension system utilizes a shifting pivot arrangement seen in FIG. 50. Computer assembly 75 is connected by a shifting pivot 76 to a short support arm 77, in turn connected to housing 5 at pivot point 78; the upper end of the assembly 75 is also connected pivotally at 79 to a folding arm 80, hinged at 81 and supported pivotally at 82 by housing 5. A detailed view of hinge 81 is shown in FIG. 51.

After the front cover 7 is removed, the switch panel 10 is dropped forward out of the way on its hinges 83. Handles 84 may then be pulled forward: assembly 75 first rocks about pivot 78 until the support arm 77 encounters stop 85; it then continues to rock about pivot 76, moving forward out of the case 7, until arms 80 stop it in the horizontal position. Folding arms 80 have heavy springs 86 to cushion the movements of the assembly 75.

*Electrical Circuitry*

The electrical circuits involved are, except where specified otherwise, conventional and have not been illustrated in detail, as their exact arrangement is a matter of choice well within the understanding of those skilled in the art from the functional schematic diagrams.

*Motion Transmission*

It will be appreciated that the exact arrangement of shafts, linkages and gearing to transmit data from one portion of the instrument to another is a matter within the skill of the designer. The number of parts involved is so great that a detailed description of these paths would introduce unnecessary confusion, and it is believed that a fuller understanding will be had from the practice of keeping the description to a minimum consistent with explaining the operation in functional terms.

INDIVIDUAL SECTIONS OF THE COMPUTER

*Section I. Computation of Horizontal Range*

The derivation of Equations 1 and 2, from which horizontal range $cRhq$ is computed, was explained supra in connection with FIG. 56. How the mechanism of Section I solves these equations will next be considered.

Briefly, sonar range signals are received continuously by high-speed and low-speed control transformers. The $Rq$ error signal output of these control transformers is amplified and applied to a servomotor. The motor in turn puts $Rq$ values into a lever multiplier, where it is multiplied by sin $Eq-\frac{1}{2}$. The motor also enters $\frac{1}{2} Rq$ in an additive lever differential where it is combined with the output of the lever multiplier to give $Rq$ sin $Eq$. At the same time, the motor enters $Rq$ values in a gear differential, where $$Hq \tan \frac{Eq}{2}$$

is subtracted from it to get $cRhq$.

The assembly of Section I occupies the lower left section of the computer as shown in FIG. 4. The section inputs and outputs are indicated in FIG. 4. Part of the linkage connections to other sections may be seen in FIG. 5, and will be described in detail hereafter.

Figure 7:
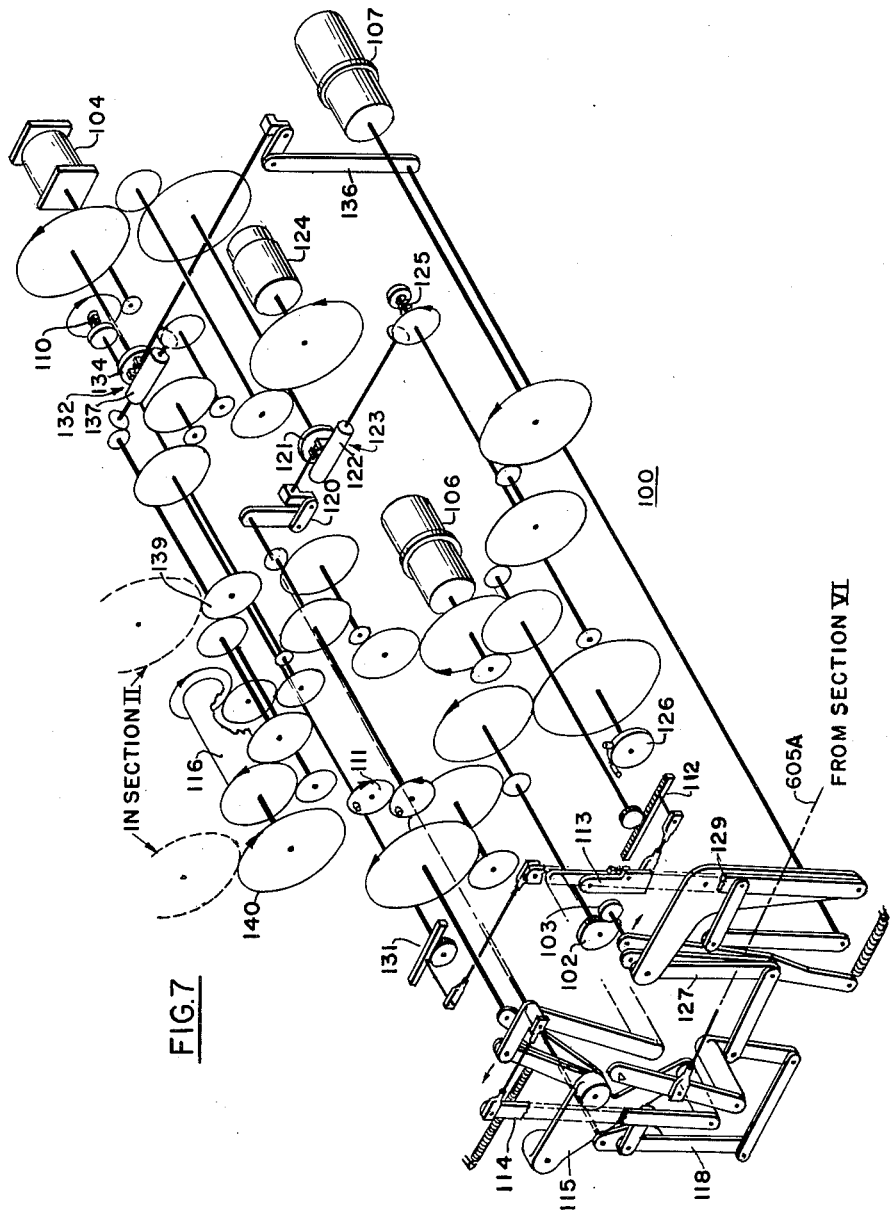
FIG. 7 is an exploded schematic perspective view of the component elements of Section I of the computer.
Figure 8:
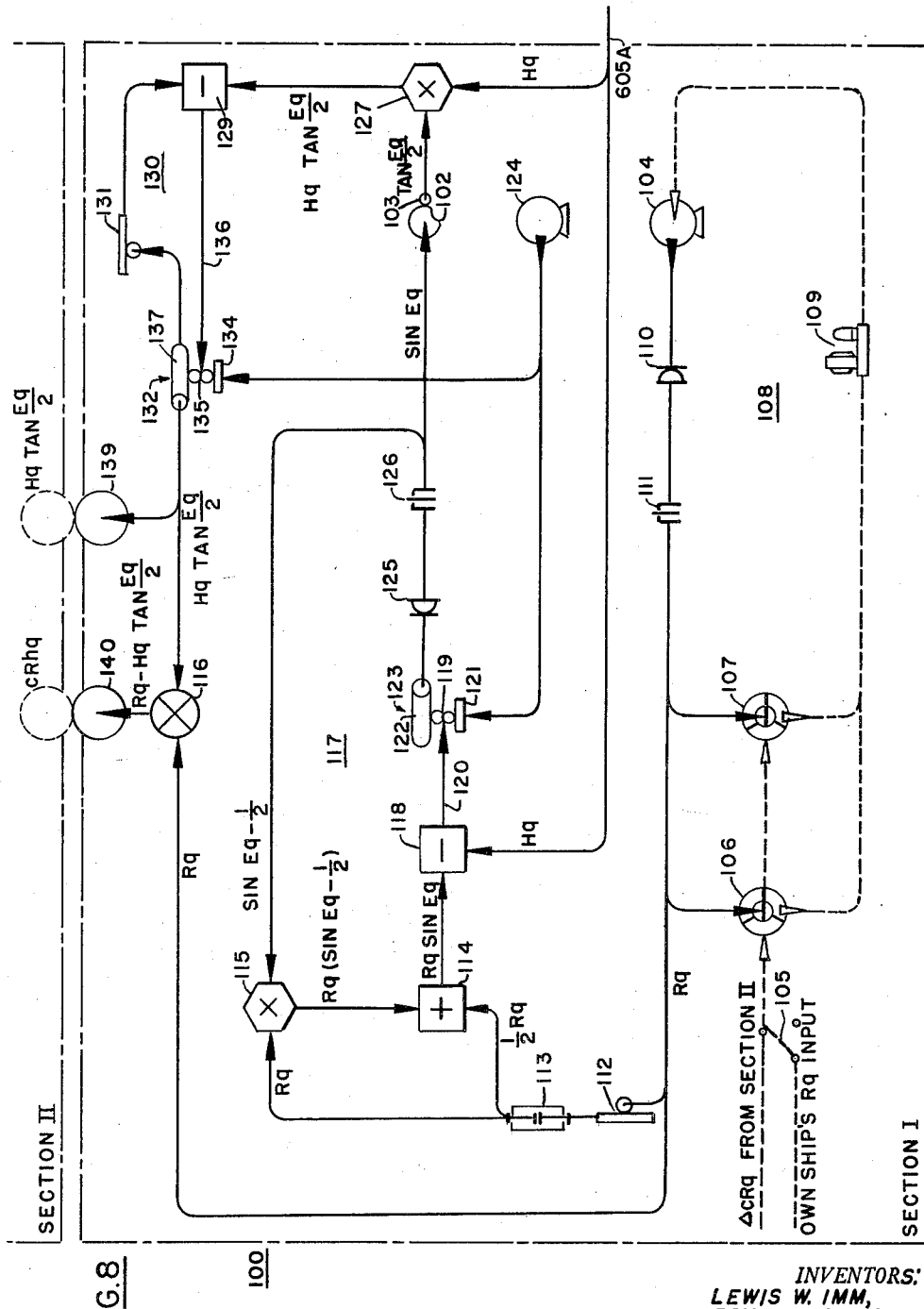
FIG. 8 is a functional schematic diagram of Section I of the computer.
Figure 9:
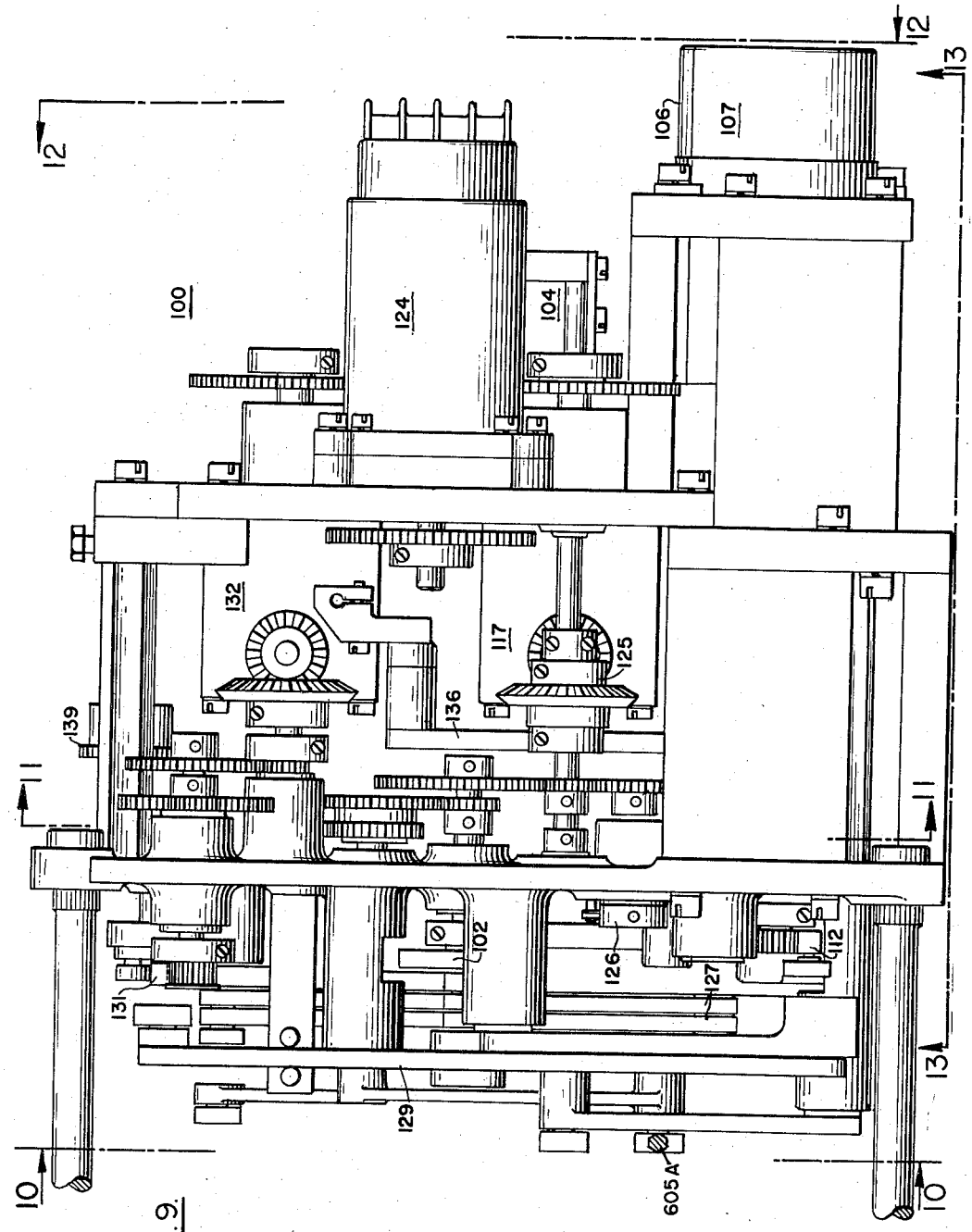
FIG. 9 is a side elevational view of Section I of the computer taken from the right of the computer as shown in FIG. 5.
Figure 10:
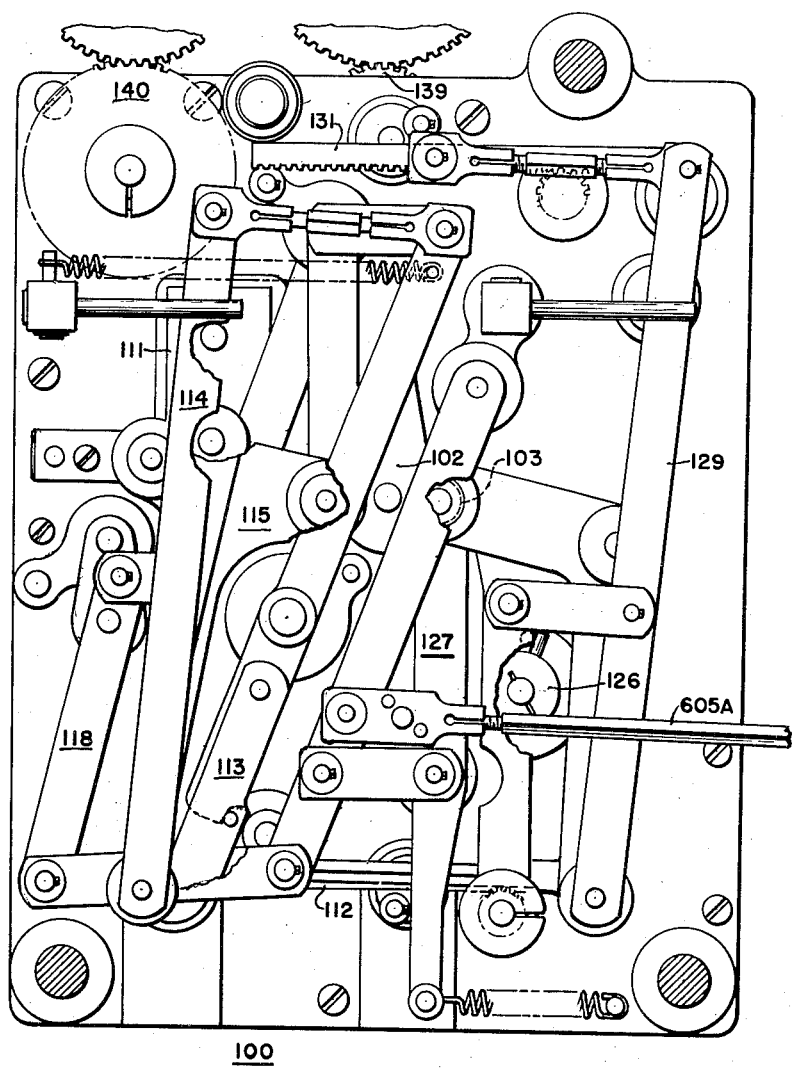
FIG. 10 is a front elevational view of Section I taken as indicated by line 10—10 of FIG. 9.
Figure 11:
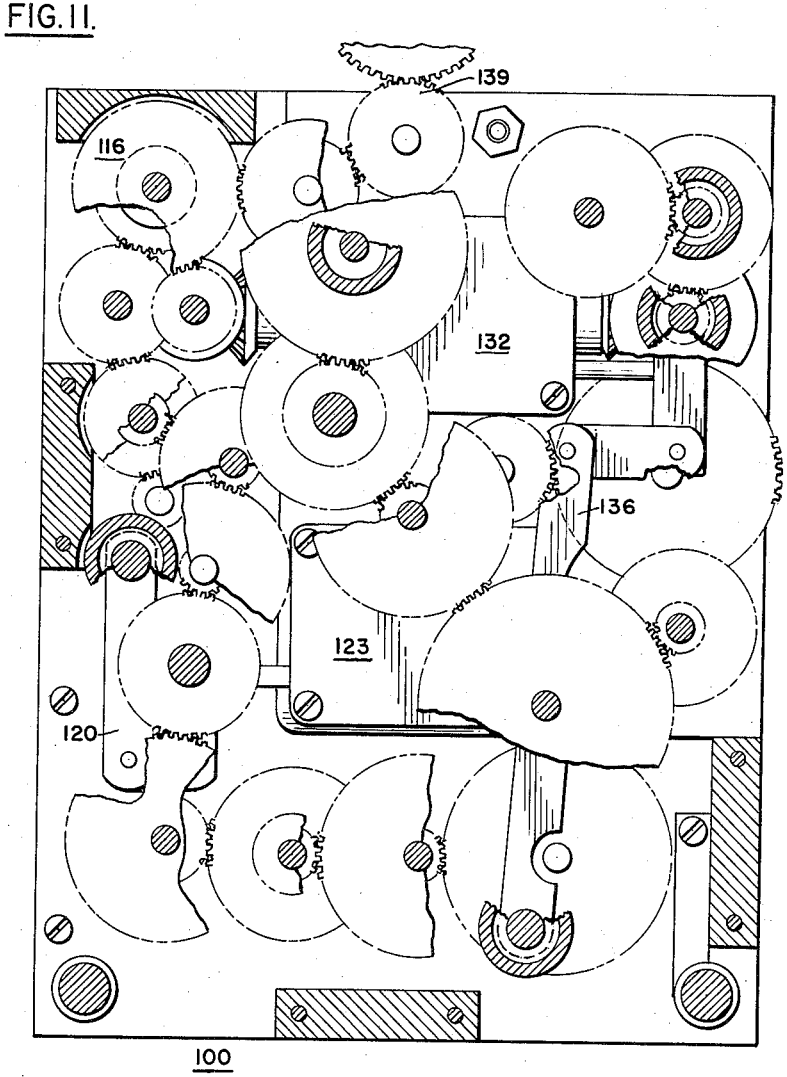
FIG. 11 is a sectional view of Section I of the computer taken as indicated by line 11—11 in FIG. 9.

The mechanism of Section I, indicated generally as 100, is shown from the upper left in exploded schematic perspective in FIG. 7, and in functional schematic form in FIG. 8. Section I computes the horizontal range $cRhq$ of the target from sonar range $Rq$ data, automatically received from the ship's sonar gear, and from manually set in target depth data $Hq$ received as an axial displacement of target depth input rod 605A from Section VI. This displacement is determined by the position of target depth knob 25, physically located near Section VI and seen in FIG. 1 of the drawings. The value of target depth estimated by experience or furnished by the operator of own ship's depth plotting equipment is set in manually.

The first step in the solution is obtaining a value representing the target depression angle $Eq$ in the Equation 1 relation $Hq=Rq$ sin $Eq$. For convenience in the construction of the computer, this equation is rewritten as $$Hq = \frac{1}{2}Rq + Rq(\sin Eq - \frac{1}{2}) \qquad (39)$$

Once the sine function of $Eq$ is found, it is used to make a simple transference into the tangent value of the half angle, $Eq/2$. The $Eq/2$ value is used to satisfy the Equation 2 relation $$cRhq = Rq - Hq \tan \frac{Eq}{2}$$

and the computed horizontal range $cRhq$ determined. In FIGS. 7 and 8, this transference is shown as being accomplished thru the use of a cam 102 and follower 103, to be described hereafter. The value of $Rq$ furnished by the ship's sonar equipment positions servomotor 104 to correspond with the reading on the ship's sonar slant range dial. The latter is not shown and forms no part of the present invention. The servomotor 104 supplies $Rq$ at a higher power level to computing equipment of Section I. Normally $Rq$ data is inserted continuously during solution of an attack problem, own ship's sonar range input switch 105 being closed. When the equipment is operating in the position-keeping mode, as when contact with the target has been lost, switch 105 is opened under the control of the operational switch knob 12 shown in FIG. 1, and computed sonar range correction $\Delta cRq$ is supplied from a 2000 yard synchro receiver 252 in Section II, to be described later. In normal operation, the sonar range input is applied to both the 2000 yard or high-speed synchro control transformer 106 and the 72,000 yard or low-speed synchro control transformer 107. In position-keeping, the sonar range input correction $\Delta cRq$ is applied to the 2000 yard control transformer 106 only. In both cases the electrical outputs of control transformers 106 and 107 are fed into a servo loop 108 which has an amplifier 109.

The amplifier 109 operates the servo motor 104, and includes a mixing circuit which determines whether signals from the high-speed or the low-speed control transformer shall be effective in positioning the servo motor 104 at any instant. The details of this circuit form no part of the present invention, and may be of the type set forth in the pending U.S. patent application of Charles Krill and Thomas D. Bryant, entitled "Mixing Circuit for Multiple Speed Servo Systems," filed October 15, 1941, with Serial Number 251,314.

The amplifier servo loop 108 is completed by connecting the output of servo motor 104 back thru a slip clutch 110 and limit stop 111 to control transformers 106 and 107. The slip clutch 110 and limit stop 111 prevent introduction of range values in excess of 3000 yards to other computing means, without interfering with the rotation of motor 104. The controlled output of motor 104 then furnishes $Rq$ values, with adequate power for subsequent operations, thru a rack and pinion 112 and a linkage overdrive 113 to a linkage differential 114, where it is utilized as $\frac{1}{2}Rq$; and to multiplier 115, where the product of $Rq$ and sin $Eq-\frac{1}{2}$ is found. $Rq$ is also furnished to gear differential 116, where the difference between $$Rq \text{ and } Hq \tan \frac{Eq}{2}$$

that is, $cRhq$, is found and transmitted to Section II as described hereafter. Linkage overdrive 113 limits $Rq$ values supplied to multiplier 115 to 2000 yards.

In solving equations thruout the director, use is made, particularly in closed computer loops, of improved ball and disk integrators to match values. Instruments of this type are described in the U.S. Patent 2,602,338, of Willard John Opocensky and Lewis William Imm, issued July 8, 1952 and entitled "Integrator."

In solving Equation 1, the value of $Hq$ is to be matched against that of $Rq$ sin $Eq$ in integrator loop 117 to solve Equation 1, transposed for convenience, to the form:

$$Rq \sin Eq - Hq = 0 \qquad (40)$$

In linkage differential 114, $\frac{1}{2}Rq$ is added to $Rq$ (sin $Eq-\frac{1}{2}$) from multiplier 115 to find $Rq$ sin $Eq$. $Hq$ is mechanically subtracted from $Rq$ sin $Eq$ by the linkage differential 118, and the difference used to position the integrator balls 119. When the difference between $Hq$ and $Rq \sin Eq$ is zero, connecting elements 120 from linkage differential differential 118 will center the balls 119 relative to the disk 121 of the integrator 123. It is a characteristic of this type of integrator that when the balls 119 are centered, no motion is transmitted between the disk 121 and the cylinder 122. Thus no output is transmitted if the equation is satisfied, but if it is not, rotational motion will be fed back into the system by motor 124 thru cylinder 122 to multiplier 115 within the range permitted by limit stop 126, and thence thru linkage differentials 114 and 118, to restore the balls to zero position. When Equation 1 is satisfied, since the values $Rq$ and $Hq$ were known, the value of the third element, $\sin Eq$, must be that generated by the integrator to balance the equation.

For convenience, the value of $Hq$ is taken from that of $Rq \sin Eq$ by the subtractive linkage 118, into which $Rq \sin Eq$ is inserted by the linkage differential 114. This differential 114 adds back the value $\frac{1}{2} Rq$ to the output expression $Rq (\sin Eq - \frac{1}{2})$ which had been obtained from multiplier 115 as the product of $Rq$ and the quantity $(\sin Eq - \frac{1}{2})$. This latter quantity is fed back into multiplier 115 from the integrator cylinder 122 thru the friction clutch 125 and a limit stop 126 which permits transmitting values outside the range between zero and one. The constant $\frac{1}{2}$ is subtracted by conventional means before the $\sin Eq$ value is introduced to multiplier 115.

The $Hq$ input from Section VI is also fed into multiplier 127 where it is combined with the output of the cam 102. As mentioned above, cam 102 converts the $\sin Eq$ information furnished from integrator cylinder 122 directly to $$\tan \frac{Eq}{2}$$

The shaping of this cam is a matter within the skill of those familiar with the art, and is not claimed as part of the present invention.

$$Hq \tan \frac{Eq}{2}$$

is then supplied by multiplier 127 to linkage differential 129, which forms part of a motion-conversion loop 130. Loop 130 converts linear $$Hq \tan \frac{Eq}{2}$$

motion received from multiplier 127 to rotary motion proportional to $$Hq \tan \frac{Eq}{2}$$

for use in the computations carried out in Section II of the director. This rotary $$Hq \tan \frac{Eq}{2}$$

motion is also subtracted from $Rq$ in differential 116 in accordance with Equation 2 to produce the value $cRhq$, for use in Section II.

The conversion loop 130 includes, in addition to linkage differential 129, a rack and pinion 131 and a ball and disk integrator 132. The disk 134 of the integrator may be turned at constant speed by the same time motor 124 which drives the disk of integrator 123. The balls 135 are positioned by an output link 136 from the linkage differential 129, into one side of which $$Hq \tan \frac{Eq}{2}$$

was inserted as linear motion by multiplier 127. A linear input to the other side of linkage differential 129 is applied by the rack and pinion 131, into which rotary motion is inserted by a connection to the cylinder 137 of integrator 132. As long as the linear values inserted by rack and pinion 131 are equal to those inserted by multiplier 127, the output or control link 136 will effect no displacement of the balls 135 of integrator 132. If the rack and pinion value does not match the output value from multiplier 127, link 136 will be displaced, correspondingly displacing the balls 135 from their zero position and causing the motor 124 to transmit a movement thru cylinder 137 tending to restore the rack and pinion input to linkage differential 129 to a matching position. The amount of restoring movement thus transmitted will represent the insertion of a rotary motion proportional to $$Hq \tan \frac{Eq}{2}$$

into Section II thru output gearing 139. It will also represent the insertion of this value in differential 116 for the production of $cRhq$, to be transmitted to Section II thru output gearing 140, and to be there used and displayed.

The continuous correction of $Rq$ by $\Delta cRq$ from Section II makes it possible for Section I to compute continuously horizontal sonar range values even if sonar contact is lost, as when operating in the position-keeping mode. These values will be correct unless the target changes its speed.

Section II. Computation of Bearing and Range Corrections

The sonar bearing and range of the target must be continuously corrected during the progress of an attack to obtain the most accurate information on its development and on any necessary changes. These corrections are obtained in Section II, which occupies the central position at the left of the instrument as seen in FIG. 1. Inputs, outputs, and the flow of information between sections are shown in FIG. 4, and a portion of the linkage connections to other sections may be seen in FIG. 5.

Figure 12:
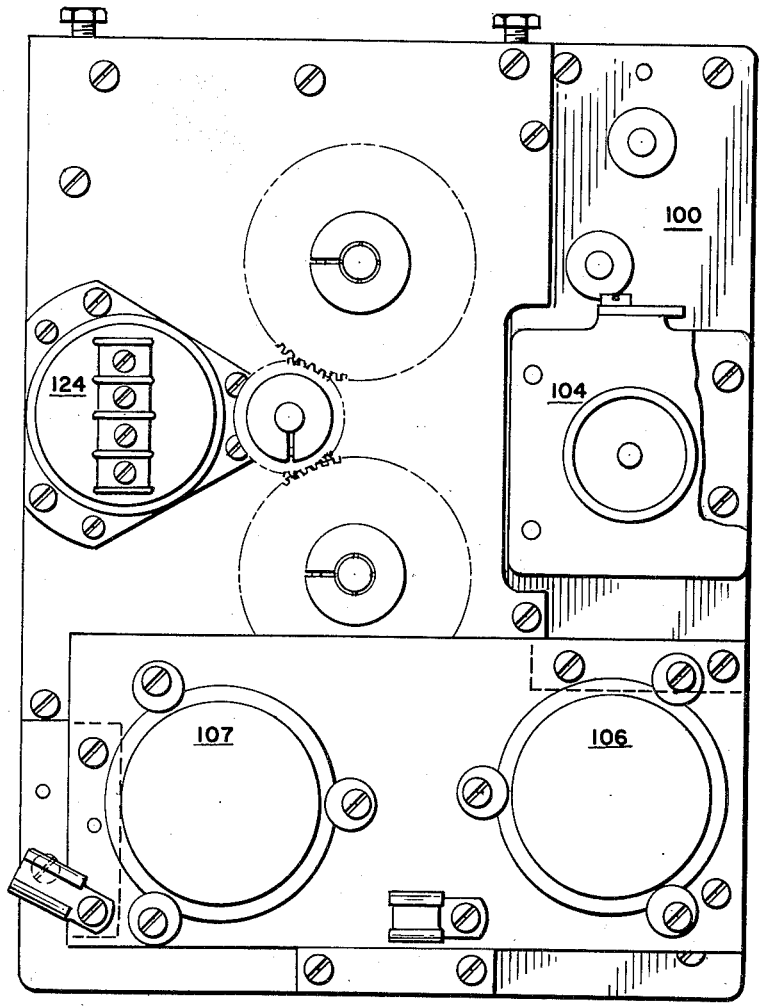
FIG. 12 is a rear elevational view of Section I of the computer taken as indicated by line 12—12 of FIG. 9.
Figure 13:
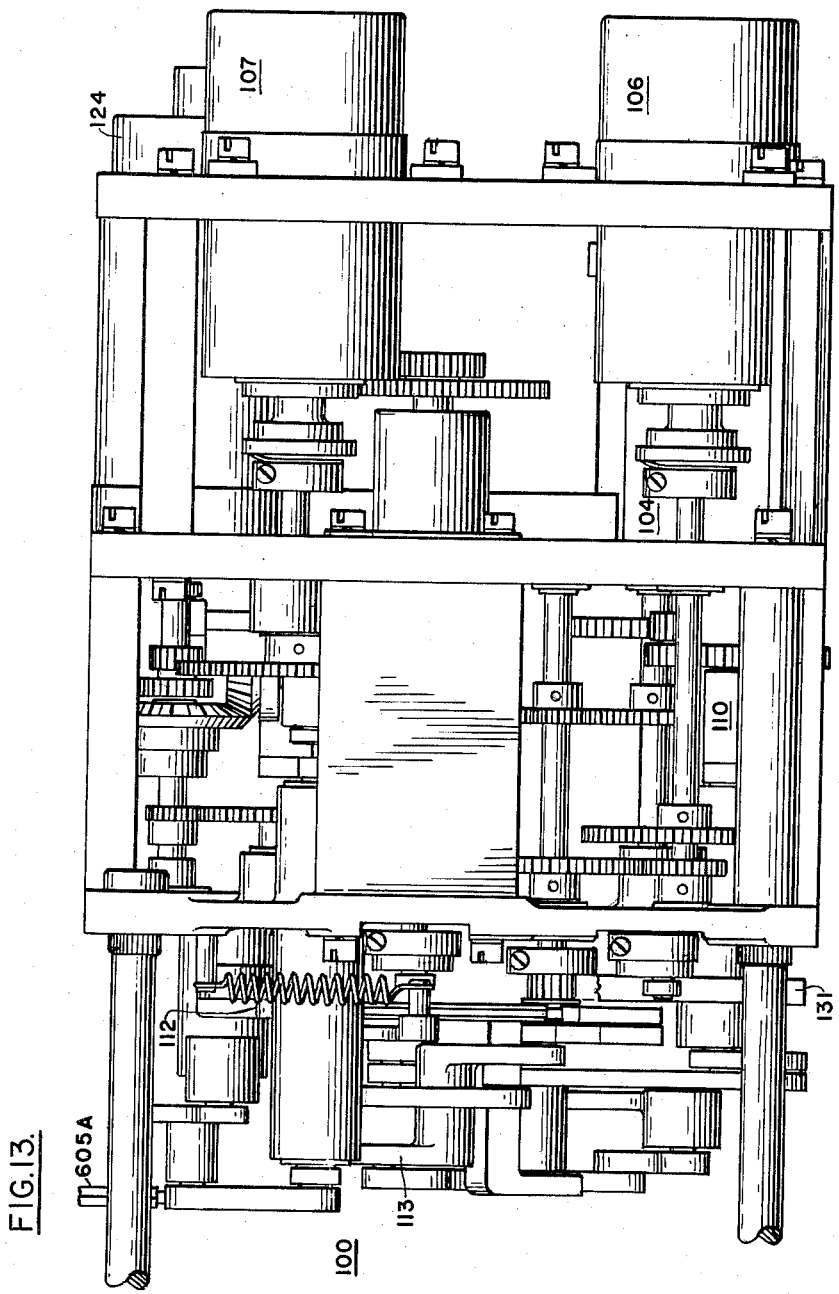
FIG. 13 is a bottom plan view of Section I taken as indicated by line 13—13 in FIG. 9.
Figure 14:
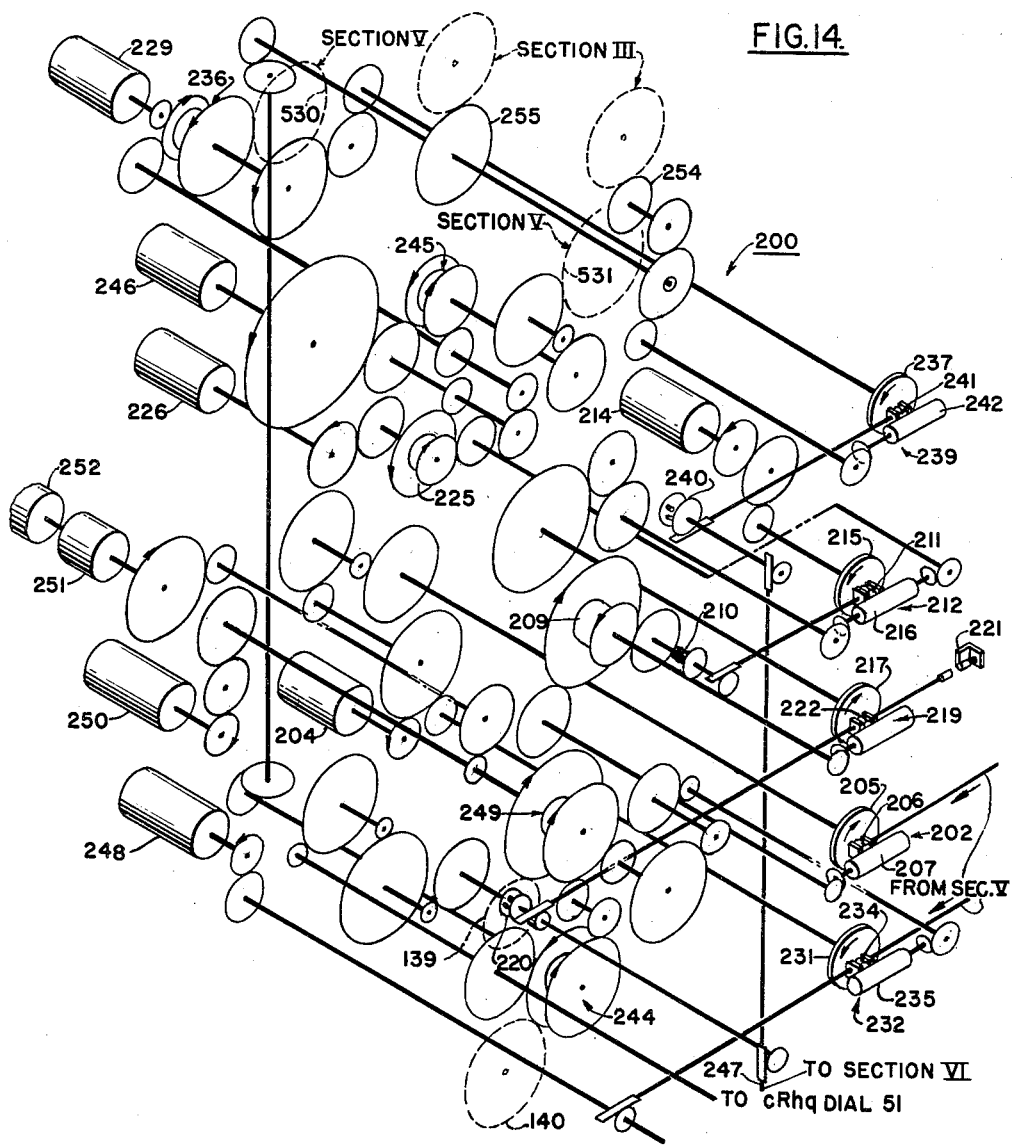
FIG. 14 is an exploded schematic perspective view of the elements of Section II which compute the correction components $\Delta Brq$ and $\Delta Rq$.
Figure 15:
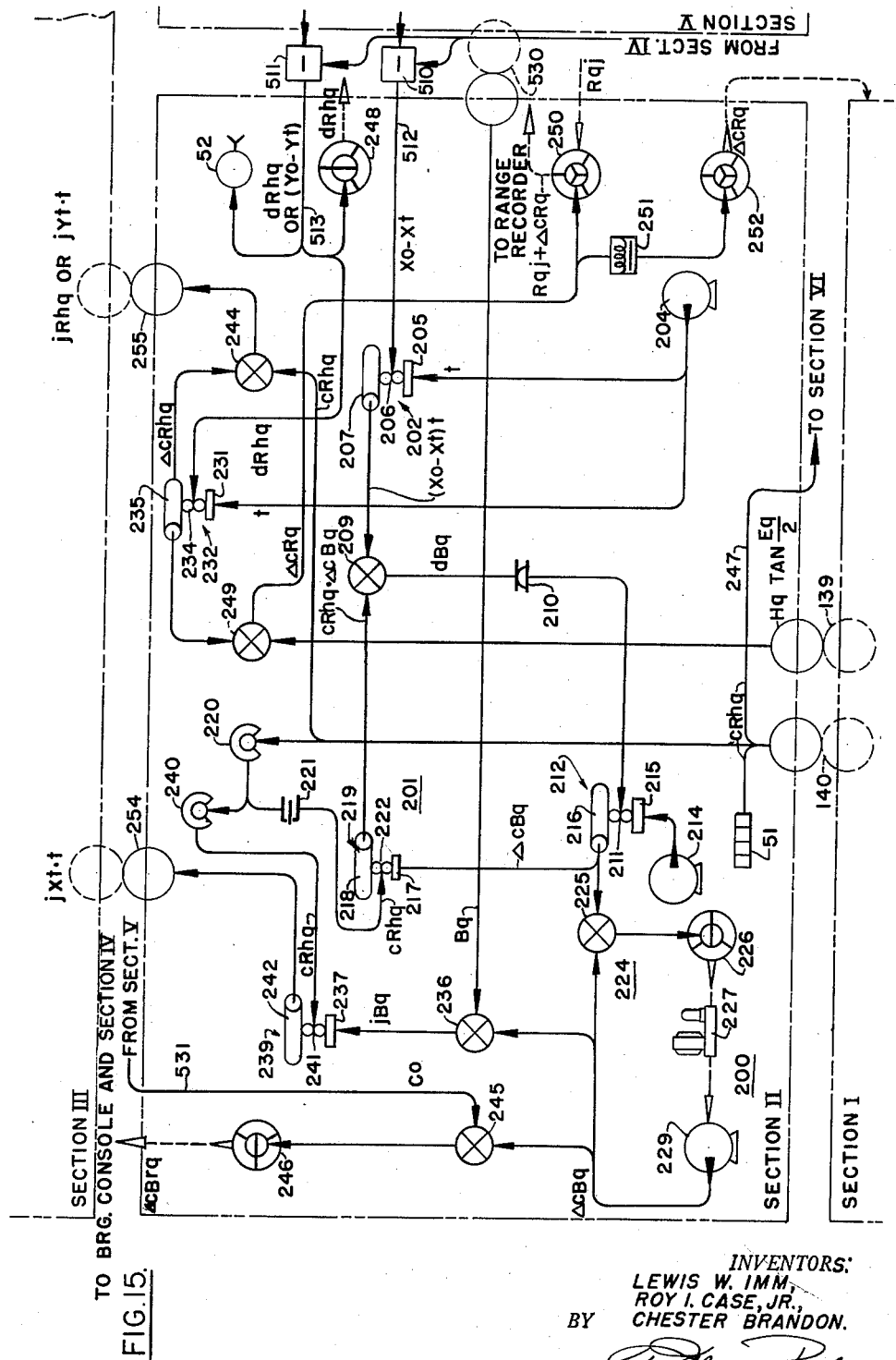
FIG. 15 is a functional schematic drawing of Section II of the computer.
Figure 16:
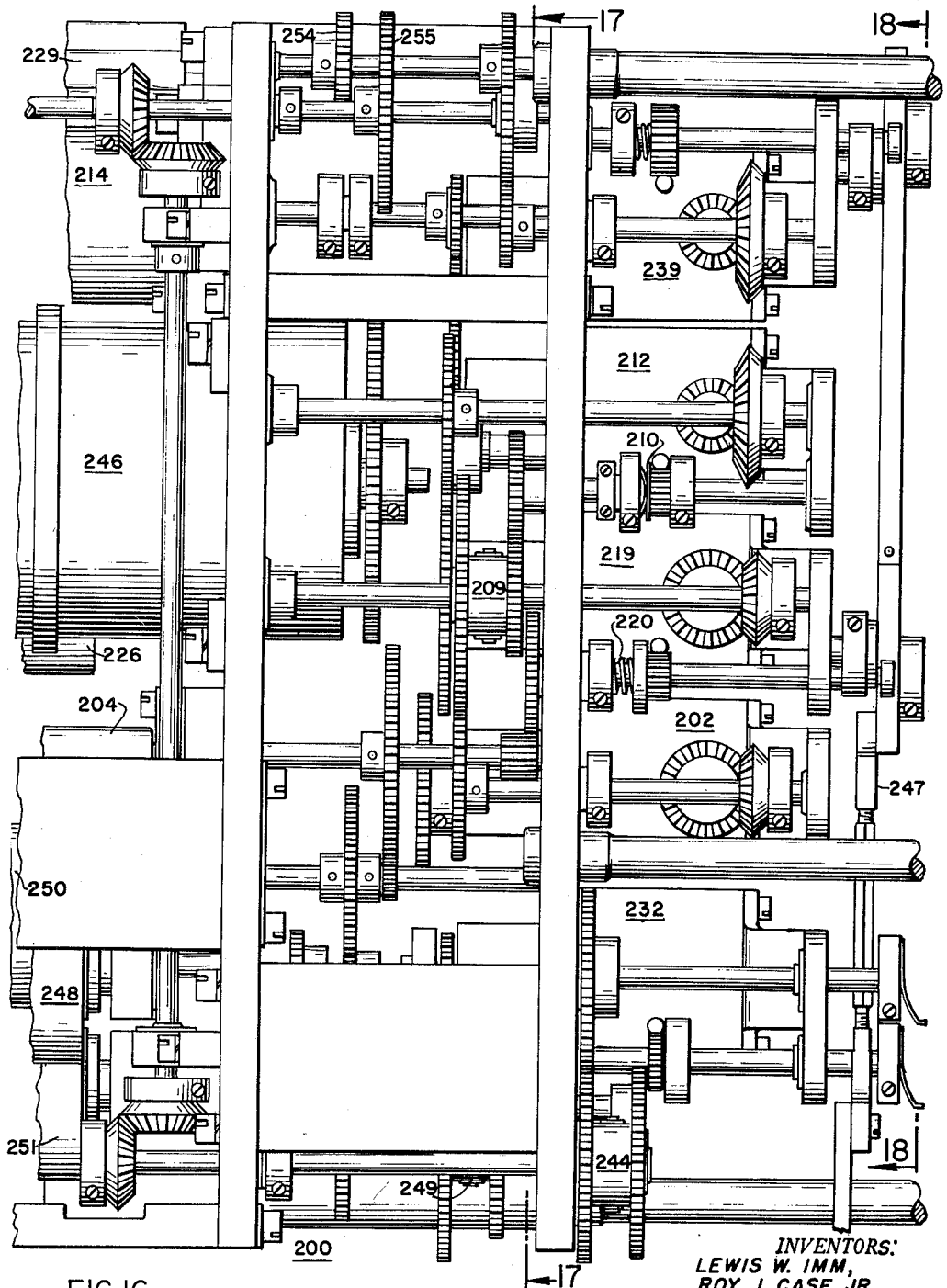
FIG. 16 is an elevational view taken from the left side of Section II as seen in FIG. 5.
Figure 17:
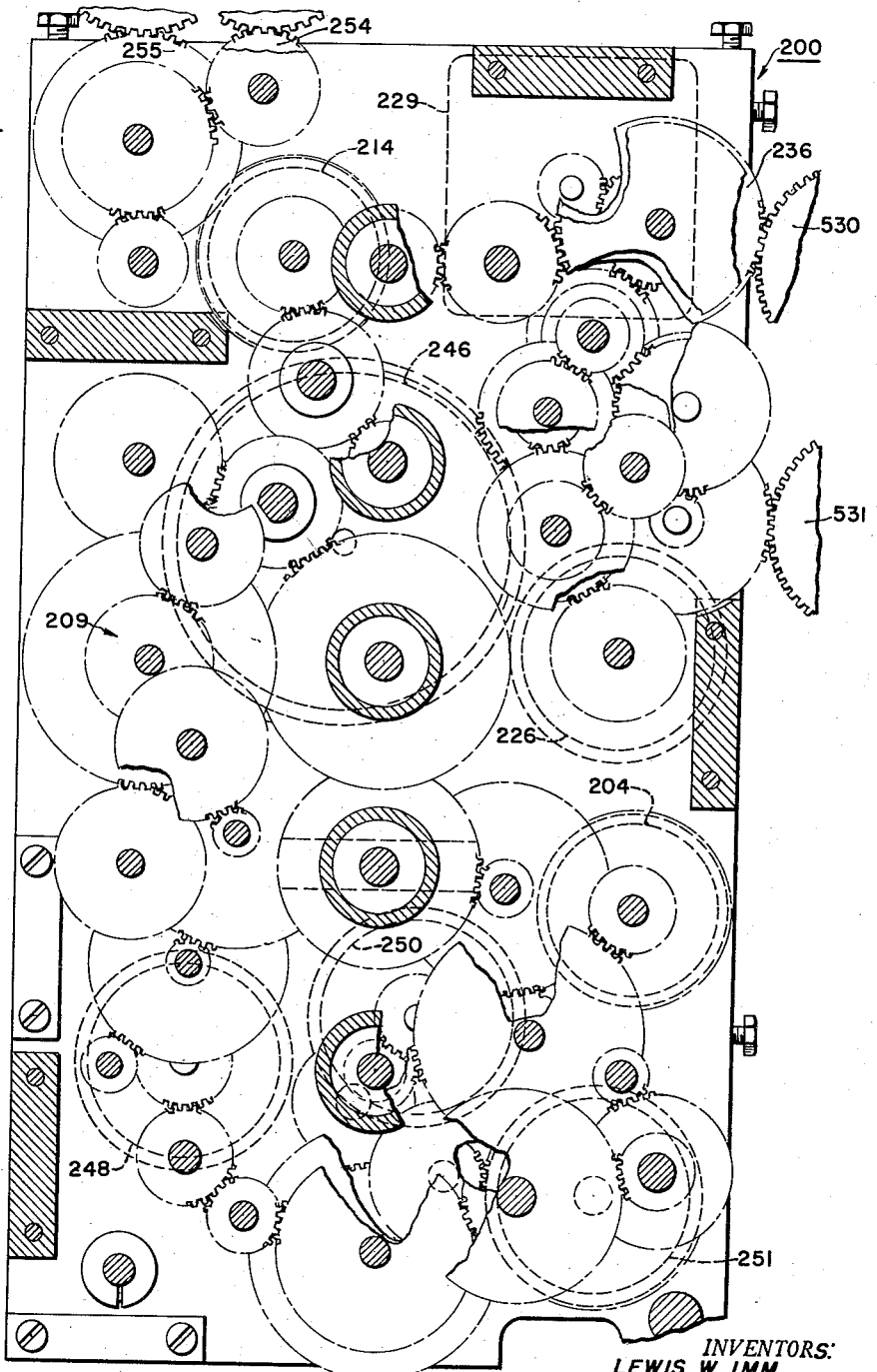
FIG. 17 is a sectional view of the elements of Section II of the computer taken as indicated by line 17—17 of FIG. 16.
Figure 18:
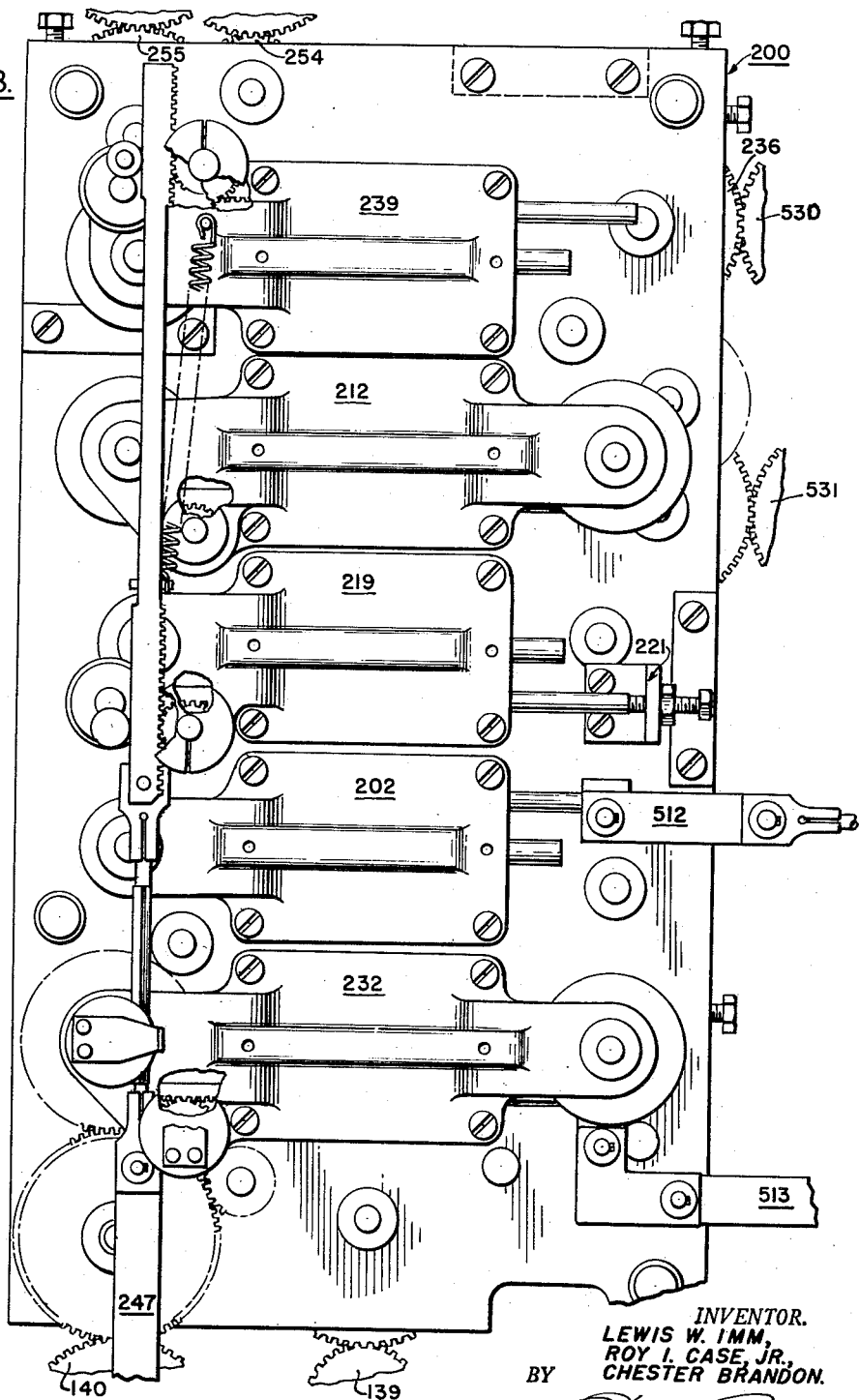
FIG. 18 is a front elevational view of Section II taken as indicated by line 18—18 of FIG. 16.

The mechanism of Section II, indicated generally as 200, is shown from the upper left in exploded schematic perspective in FIG. 12 and in functional schematic form in FIG. 15.

Section II computes $jXt \cdot t$ and $jRhq$, the corrections to target velocity across and along the line of sound from own ship to target. To do this, it uses $cRhq$ and $$Hq \tan \left( \frac{Eq}{2} \right)$$

values from Section I, together with $Xo - Xt$, $Co$, $Bq$ and $dRhq$ from Section V and $Rqj$ from the Range Recorder. It then forwards $jXt \cdot t$ and $jRhq$ to Section III. It also forwards $cRhq$ from Section I to Section VI, and computes and forwards $\Delta cRq + Rqj$ to the range recorder, $\Delta cRq$ to Section I, $\Delta cBrq$ to Section IV, and $\Delta cRq$ and $dRhq$ to other equipment.

The relation set forth in Equation 11 above is transposed to the form $$cRhq \cdot \Delta cBq = (Xo - Xt)t \quad (41)$$

for the Section II computations. Section I supplies the value $cRhq$ thru gearing 140 to one side of a balancing integrator servo loop 201 which includes integrator 219, the balancing differential 209, slip clutch 210, and integrator 212. Section V supplies $Xo - Xt$ from a subtractive differential 510 to ball and disk integrator 202, where it is integrated with respect to time supplied by a constant speed motor 204. The integral $(Xo - Xt)t$ is then applied to the other side of loop 201 thru the balancing differential 209. The loop 201 is balanced when Equation 41 is satisfied. It will be seen that the value of $\Delta cBq$ must have been inserted into multiplier disk 217 by multiplier 212 to arrive at the balanced condition, since $\Delta cBq$ was the only unknown factor in Equation 41.

The integration of $Xo - Xt$ with respect to time is accomplished by applying a constant speed drive from motor 204 to the disk 205 of integrator 202, and using the $Xo-Xt$ input from Section V linkage differential 510 to position the balls 206. The output from cylinder 207 is applied to the loop 201 by feeding it to one side of a gear differential 209.

Assuming for a moment that no other input were applied to differential 209, the $(Xo-Xt)t$ value would pass as an output thru friction drive 210 and would position the balls 211 of an integrator 212. A time motor 214 drives the disk 215 of integrator 212, so the output from cylinder 216 will be the integral of the output of gear differential 209. The cylinder 216 output drives the disk 217 of integrator 219, and is there multiplied by $cRhq$.

The $cRhq$ value from gearing 140 is fed thru a rotary overdrive 220 and a limit stop 221, which permits passage only of $cRhq$ values between 32 and 3000 yards, to position the balls 222 of integrator 219. The output from cylinder 218 of integrator 219, the product of horizontal range by the incremental quantity transferred from integrator 212, is applied as the second input to gear differential 209.

Motion continues through this integrator servo loop until the two inputs to gear differential 209 are balanced. When the inputs to differential 209 from integrator 219 and integrator 202 are equal, motion through the loop ceases. For this state of equilibrium to be reached, integrator 219 must, according to Equation 41, have had an output $cRhq \cdot \Delta cBq$ equal to the $Xo-Xt(t)$ output of integrator 202. At the same time, the output of differential 209 must have had the correct value of $dBq$, true sonar bearing rate, since integration with respect to time in integrator 212 produced the correct value of the increment $\Delta cBq$. Finally, the output of integrator 212 must have had the correct value of $\Delta cBq$, incremental change of true sonar bearing.

When either $cRhq$ or $Xo-Xt$ changes, the balance in gear differential 209 is disturbed, giving it an output, which causes new values of $dBq$ and $\Delta cBq$ to be generated to restore the balance.

The limit stop 221 prevents the application of $cRhq$ values of less than 32 yards or more than 3000 yards to position the ball carriage of integrator 219. Rotary overdrive 220 is provided so that, if a value of $cRhq$ less than 32 yards is supplied thru gearing 140, the gear can continue to turn without transferring this motion to the ball carriage of integrator 219. If the $dBq$ output of gear differential 209 causes the ball carriage of integrator 212 to reach the limit of its travel at the edge of the disk, friction drive 210 slips to permit gear differential 209 to continue rotating without transmitting this excess motion to integrator 212.

The $\Delta cBq$ output of integrator 212 is furnished at a higher power level by means of a servo loop 224 consisting of gear differential 225, synchro control transformer 226, amplifier 227, and servomotor 229. The $\Delta cBq$ output of integrator cylinder 216 is applied to gear differential 225 to position the rotor of the synchro control transformer 226. The voltage signals produced by control transformer 226 and amplified by amplifier 227 cause servomotor 229 to drive out a value of $\Delta cBq$ to balance, in differential 225, the value of $\Delta cBq$ received from integrator 212, but with greatly increased power as compared to that which integrator 212 could itself furnish. This more powerful motion representing $\Delta cBq$ is used in differentials 236 and 245 as described below.

The value of $cRhq$ introduced thru overdrive 220 is also limited by a rotary overdrive 240 to 2000 yards before it is introduced to integrator 239 for use in computing $jXt \cdot t$. Normally $\Delta cBq$ from loop 224 changes as the $Bq$ value from Section V changes. When both values change equally, there is no $jBq$. If the operator of the Bearing Console makes a bearing correction, $Bq$ from Section V will differ from the $\Delta cBq$ value from loop 224, and there will be a $jBq$ output from differential 236 which will appear as $jXt \cdot t$ from integrator 239.

Time motor 204 also drives the disk 231 of an integrator 232, the balls 234 of which are positioned by a subtractive lever differential 511 introducing values of $dRhq$, or $Yo-Yt$, from Section V. The output of integrator cylinder 235 thus represents the integral of $dRhq$ against time, or the incremental values $\Delta cRhq$.

Section II is now ready to compute the distances traveled by the target relative to own ship across and along the line of sound in accord with Equations 15 and 16 derived above.

The distance across the line of sound was given above as being, by Equation 15:

$$jXt \cdot t = jBq \cdot cRhq$$

Gear differential 236 adds $\Delta cBq$, received from servo loop 224, to $Bq$ received from Section V thru gearing 530, thus producing $jBq$ as defined by Equation 14. The $jBq$ output of gear differential 236 drives the disk 237 of integrator 239. The $cRhq$ value introduced thru output gearing 140 from Section I thru rotary overdrive 240 is used to position the balls 241 of integrator 239, and the output product from integrator cylinder 242 is the $jXt \cdot t$ value as defined in Equation 15.

The distance along the line of sound was given above as being, by Equation 16:

$$jRhq = cRhq - \Delta cRhq$$

This is now obtained simply by adding the $cRhq$ value, obtained from Section I thru gearing 140 and inserted into one side of a differential 244, to the value of $\Delta cRhq$ from cylinder 235 of integrator 232, which is inserted into the other side of the differential. The output of differential 244 is then $jRhq$, or $jYt \cdot t$.

The values $jXt \cdot t$ and $jYt \cdot t$ are forwarded to Section III for computation of target speed and change in target angle thru gearing 254 and 255, respectively.

Certain additional computations are also performed in Section II. The $\Delta cBq$ output of loop 224 is added in gear differential 245 to $Co$ obtained from Section V, and the output applied to a synchro transmitter 246. Transmitter 246 sends 36-speed $\Delta cBrq$ signals at 10° per revolution to the Bearing Console and to Section IV.

The $cRhq$ values from Section I are displayed on the horizontal range counter dials 51, and forwarded by $cRhq$ output rod 247 thru Sections I and IV to Section VI for ballistic computations.

The $dRhq$ value received from lever differential 511 in Section V is supplied to the Horizontal Range Rate dial 52 for display, and to a synchro transmitter 248 which converts it to electrical signals for use in other fire control equipment in the ship.

The $\Delta cRhq$ value from integrator 232 is entered in gear differential 249, where it is combined with $$Hq \tan \frac{Eq}{2}$$

to give rotary $\Delta cRq$, and fed into synchro differential transmitter 250. Electrical signals representing $Rqj$ are also applied to synchro differential transmitter 250 from the Range Recorder, returning electrical output signals, representing $\Delta cRq + Rqj$ at 111.1 yards per revolution to the Range Recorder.

From gear differential 249, the $\Delta cRq$ values are also supplied, thru a magnetic clutch 251, to a synchro receiver 252. Synchro receiver 250 returns these values as electrical signals to the synchro control transformers 106 and 107, described in Section I, during position keeping.

Clutch 251 is not energized in normal operation, so that the rotor of synchro receiver 252, which is energized by the same $Rq$ input as are the synchro control transformers 106 and 107 in Section I, is free to follow the input and stay in synchronism with these control transformers. This permits the transfer between position keeping and normal modes of operation without any loss of accuracy at any time.

Section III. Computation of Target Speed and Change in Target Angle

Figure 19:
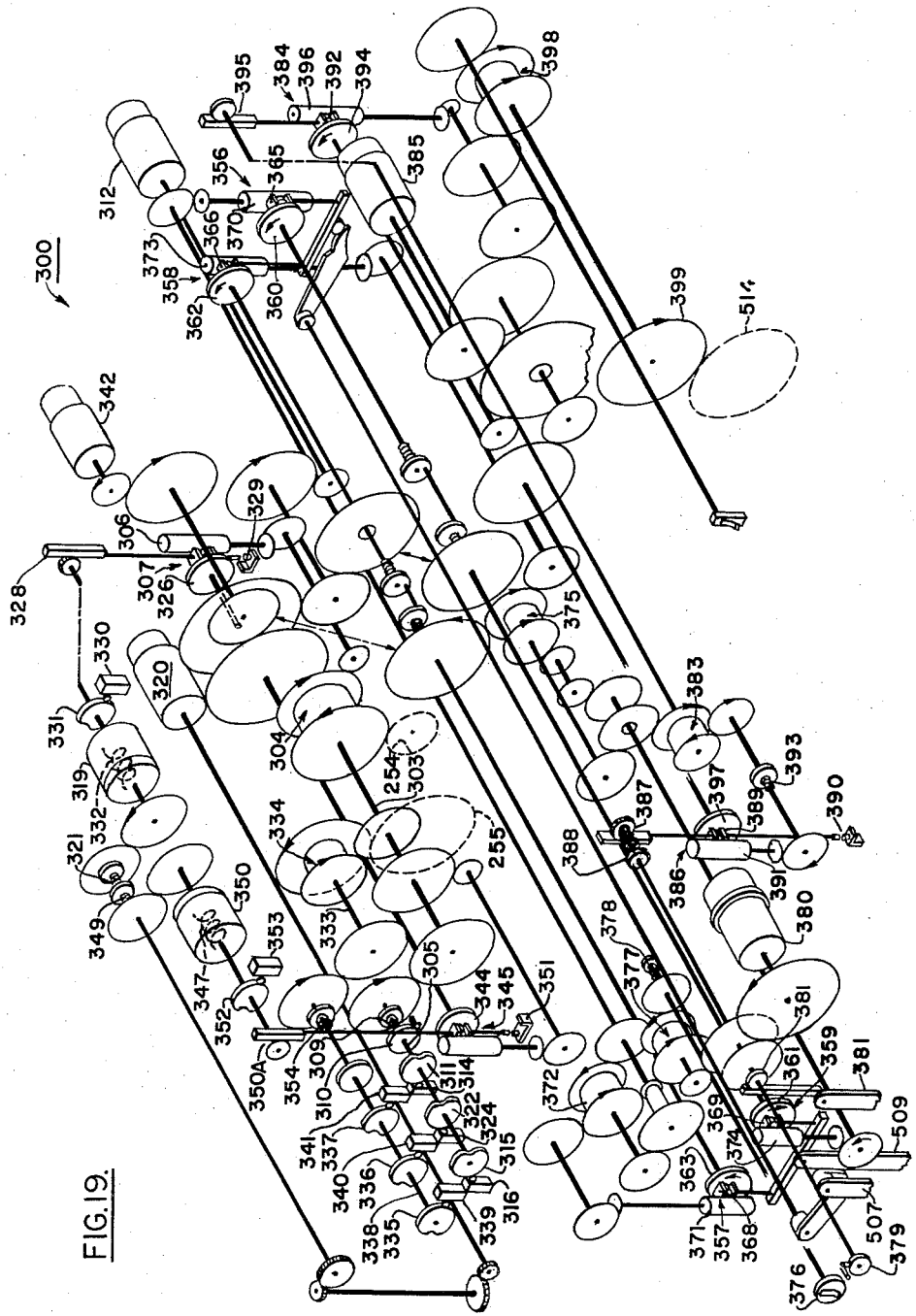
FIG. 19 is an exploded schematic perspective view of the elements of Section III, which corrects the computed target angle and speed.

The computation of target speed and change in target angle is carried on in Section III of the computer. Section III, indicated generally as 300, is located physically in the upper left portion of the instrument as seen from the front in FIG. 1, in the flow and block diagram of FIG. 4, and in the linkage diagram of FIG. 5. The flow chart, FIG. 4, shows the section inputs and outputs, while the physical embodiment may be seen in the exploded perspective diagram, FIG. 19, and may be understood more easily by reference to the functional schematic diagram of FIG. 20.

Information as to the target speed and change in target angle is needed continuously in order to correct the planned attack for any evasive maneuvers the target may make during its progress and to obtain increasingly accurate solutions as the range closes. These results are obtained by calculations based primarily on the $jXt \cdot t$ and $jYt \cdot t$ values received from Section II thru gearing 254 and 255.

Since these values represent distances in yards traveled across and along the line of sound to the target, Section III first divides them by time to obtain the corresponding vector components of target velocity in yards per second. This is accomplished by the cyclically repeated operation of two integrator servo loops, a $jXt$ loop 301 and a $jYt$ loop 302. In each the cycle begins when a correction is applied to the loop: this starts a motor which runs until the correct rate has been found; the motor is then de-energized and the loop prepared for the next cycle.

Each of the loops 301 and 302 has a motor, a ball and disk integrator functioning as a multiplier, a differential, a cam shaft with three cams and associated switches, together with an additional cam and switch acting thru a magnetic clutch to control the insertion of values from a time motor. These elements effect the divisions required to convert the $jYt \cdot t$ and the $jXt \cdot t$ displacements received from Section II to rates of travel of the target along and across the line of sound. These corrected target velocity components were defined in Equations 17 and 18 above as:

$$jXt = \frac{jXt \cdot t}{t}$$

$$jYt = \frac{jYt \cdot t}{t} = \frac{jRhq}{t}$$

THE jXt TIMING CYCLE

Consider first the $jXt$ loop 301: a new $jXt \cdot t$ value received as rotary motion from Section II thru gearing 254 is applied as an input to differential 304. The other input to differential 304 is the last previous value of $jXt \cdot t$, as obtained from integrator 307. The position of output shaft 303 of differential 304 thus represents a new target displacement component increment. This increment causes rotation of cam shaft 305, initiating a new timing cycle. As a result of starting a new timing cycle, motor 312 drives the disk 326 of integrator 307, until loop 301 is balanced, which means that the new $jXt \cdot t$ value has also been inserted into differential 304 by the integrator. The initial displacement of the integrator balls is determined by time motor 320, and is proportional to the time $t$ since the last correction. The rotation of motor 312 must hence be proportional to $jXt$, the new velocity component.

Figure 25:
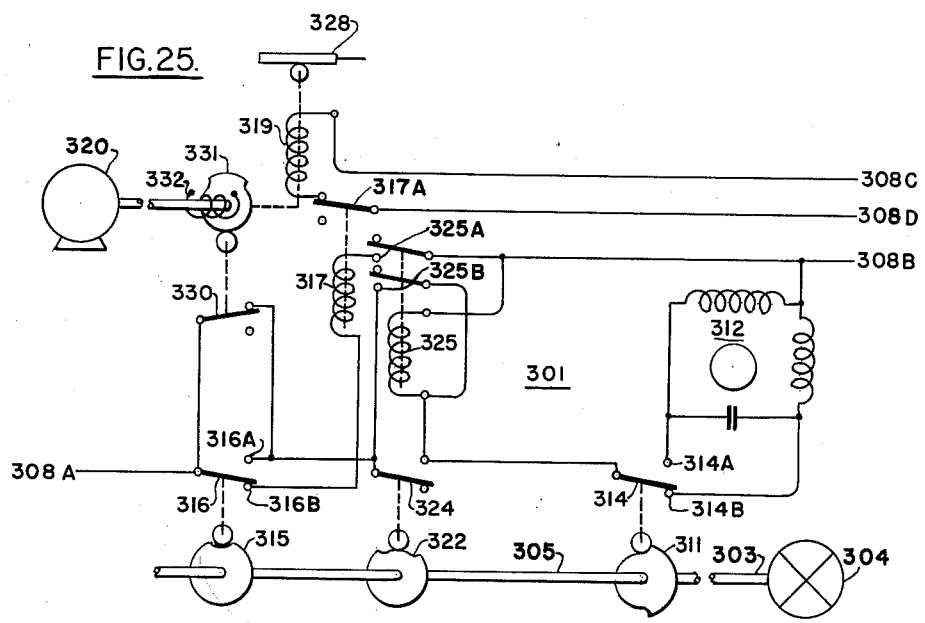
FIG. 25 is a functional schematic diagram showing the arrangement of elements concerned with the bearing-time gating cycle of Section III in greater detail.
Figure 26:
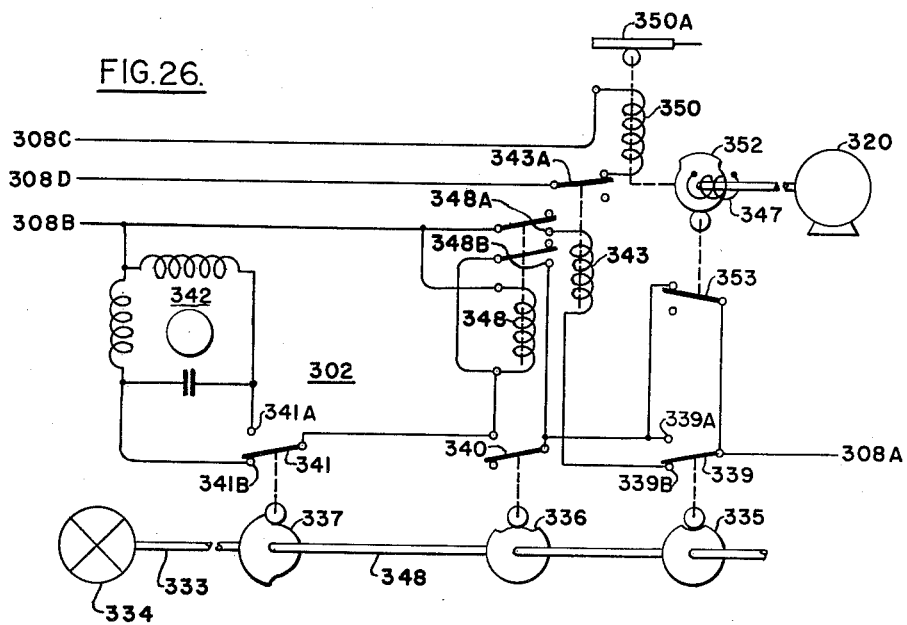
FIG. 26 is a functional schematic diagram showing the relations between the elements forming the range-time gating cycle in Section III in greater detail.

Successive stages in the operation of the timing cycle may be traced in greater detail with the aid of FIGURES 25 and 26, which apply to loops 301 and 302, respectively. In FIGURE 25, the elements controlling the timing cycle are shown in their initial position. Power is supplied for motor 312 thru lines 308A and 308B, for magnetic clutch 319 thru lines 308C and 308D, and for motor 320 from a suitable source, not shown.

When the cycle begins, potential from line 308A is available thru closed switch 330 at switch 324 and at relay contact 325B, but motor 312 is not yet energized. Magnetic clutch 319 is energized, so constant speed motor 320 begins to insert time as a factor by displacing balls 327 of integrator 307 radially from an initial position four seconds off center thru a rack and pinion 328. This initial displacement is to minimize wear at the center of the disk when no significant data is being fed to the integrator.

If now a new $jXt \cdot t$ value is received from Section II, there will be an incremental output from differential 304, thru shaft 303, friction drive 309, and thus, as far as permitted by the limit stop 310 producing rotation of cam shaft 305 proportional to the change.

The timing means are arranged to return shaft 305 to its original position at the end of the cycle. First, cam 311 selects the proper direction of rotation of motor 312, by engaging switch 314 with either contact 314A or 314B.

Cam 315 at the same time is shifting switch 316 into engagement with contact 316A, opening the connection from line 308A to relay 317. It also provides a second path for potential from line 308A to switch 324, and a parallel path to contact 325B which is part of an arrangement for setting up a holding circuit thru relay 325, but accomplishes no other result at this time.

Cam 322 next closes switch 324. Motor 312 now begins to drive integrator disk 326 in the direction selected by cam 311 to return shaft 305 to its initial position. At the same time, the closing of switch 324 energizes relay 325, completing the circuits thru relay switch contacts 325A and 325B associated therewith. Closing the circuit thru contact 325B sets up a holding connection from lines 308A thru the relay 325, parallel to that thru switch 324, so relay 325 will remain energized when switch 324 is subsequently opened. Making the connection thru relay contact 325A partially completes the circuit thru relay 317, but cannot open switch 317A, since there is no path thru switch contact 316B. When the output of the integrator 307 has balanced the new $jXt \cdot t$ input from Section II, the output of differential 304 will have returned the cams to their original position.

Cam 322 approaches its original position first, and opens switch 324. Time motor 312 continues to drive, however, since relay 324 still maintains the holding circuit for itself and for time motor 312 thru contact 325B.

Cam 315 returns to its original position next, opening one of the two paths from line 308A to time motor 312, and energizing relay 317. This opens switch 317A, de-energizing magnetic clutch 319. When clutch 319 is de-energized, cam 331 is released from its driven engagement with the constant speed motor 320. Spring means 332, mounted within the housing which encloses clutch 319, immediately returns cam 331 to its initial position, offset four seconds from zero time. On its return, cam 331 also opens switch 330. The second of the parallel paths thru which relay 325 and motor 312 were energized is now open: relay 325 releases, cutting off motor 312, and allowing switch 317A to again close the circuit thru the magnetic clutch 319. Motor 320 immediately starts to drive balls 327 away from the four second offset position for a new timing cycle, to be multiplied by the output of motor 312 as soon as a change in the $jXt \cdot t$ value is received from Section II.

By means of the servo loop just described, a corrected value is obtained of the component of target motion across the line of sound during the interval of time since the last previous correction.

THE jYt TIMING CYCLE

The same operation is performed on the generated values of the components of target motion along the line of sound in a similar integrator loop 302 illustrated in FIGS. 20 and 26. In loop 302, the $jYt \cdot t$ or $jRhq$ quantity received from Section II thru gear 255 is inserted in gear differential 334. The last computed $jRhq$ or jYt·t value is applied to the the opposite side of differential 334, so that rotation of the output shaft 333 of gear differential 334 represents the difference between the new jRhq quantity from Section II and the last jYt·t value computed in Section III. Differential 334 positions cams 335, 336 and 337, which actuate switches 339, 340 and 341, respectively. As in loop 301, these cams control the motion of a time motor 342 which drives the disk 344 of integrator 345. The ball carriage of integrator 345 is displaced proportionally to the time that has elapsed since the last positional correction inserted by time motor 320 acting thru the friction drive 349, magnetic clutch 350, rack and pinion 350A, and a limit stop 351. Integrator 345 drives out a jYt·t correction until its output equals the jYt·t input to gear differential 334 from the section II gear 255. A cam 352 actuates a switch 353, the function of which corresponds to that of switch 330 and cam 331 in loop 301. An appropriate friction drive 354 and limit stop 355 are disposed between the output of differential 334 and the cams 335, 336 and 337, which are mounted on a cam shaft 338. This friction drive and limit stop act in the same way as did corresponding elements 309 and 310 in loop 301.

The elements in the loops 301 and 302 which do not perform computing functions act as follows: the limit stops 310 and 355 restrict the corrections that gear differentials 304 and 334 may apply to the three cams respectively associated therewith to a maximum of 65 yards in any single correction cycle. The friction drives 309 and 354 are adjusted to slip when the differential outputs exceed 65 yards, so that the gear differentials 304 and 334 may continue to rotate without transmitting the excessive quantity to the cams 315, 322 and 311, and 335, 336 and 337. Limit stops 329 and 351 limit the time-bearing and time-range cycles to intervals of four to eight seconds. Friction drives 321 and 349 permit time motor 320 to continue driving without transferring excessive motion to the time racks and pinions 328 and 350A during the period that magnetic clutches 319 and 350 are de-energized.

It will be seen that the time motors 312 and 342 drive until the outputs of integrators 307 and 345 balance, in gear differentials 304 and 334 respectively, the Section II inputs thru 254 and 255 of jXt·t and jYt·t, respectively. In so doing, the time motor in effect performs the operations of dividing jXt·t and jYt·t by time to produce the rates of target motion along and across the line of sound. These rates jXt and jYt are then analyzed to compute target angle and target speed.

COMPUTING TARGET ANGLE AND SPEED

As explained above, the angular rotations of the time motors 312 and 342 in driving loops 301 and 302 to balance represent the component corrections to the target velocity vectors in yards per second, or jXt and jYt, respectively. These values are used in computing the target speed correction, derived above and repeated here for convenience:

$$jS = jYt \cos A + jXt \sin A \qquad (19)$$

and the product of speed and the generated increments of target angle correction:

$$\Delta jA \cdot S = jYt \sin A - jXt \cos A \qquad (20)$$

The sine and cosine values are obtained in Section V, as will be described in detail later, and are used in Section III to obtain the products necessary in solving Equations 19 and 20.

Target speed correction jS is found with the aid of integrators 356 and 357, and $\Delta jA \cdot S$ is obtained thru integrators 358 and 359.

Time motor 312, in addition to driving the disk 326, rotates the disks 360 and 361 of integrators 356 and 359 to insert the jXt values; while time motor 342, in addition to driving the disk 344, rotates the disks 362 and 363 of integrators 358 and 357 to insert jYt values in the resolving section indicated generally by 364.

Sine A values obtained from Section V thru linkage 507 are used to position the ball carriages 365 and 366 of integrators 356 and 358, respectively. Cosine A values obtained from Section V thru linkage 509 are used to position ball carriages 368 and 369 of integrators 357 and 359, respectively.

The output from cylinder 370 of integrator 356 is thus the product of jXt and sine A, and that from cylinder 371 of integrator 357 is the product of jYt and cosine A. These two outputs are added in a gear differential 372, and provide jS, the solution to Equation 19 above.

In similar fashion, the output from cylinder 373 of integrator 358 represents jYt sin A, and that of cylinder 374 of integrator 359 represents jXt cos A. When these values are applied subtractively to gear differential 375, they provide the solution to Equation 20 above.

Target speed S is then simply obtained by applying jS from differential 372, and any jS values inserted by the operator thru handcrank 20 and the handcrank coupling 376, to a gear differential 377, where they are added to obtain S. The target speed S is forwarded thru a friction drive 378, within the range defined by a limit stop 379. Limit stop 379 restricts the forwarded value of S to 20 knots, while friction drive 378 slips to permit differential 377 to continue to turn without damage if its output is actually at a rate of speed higher than 20 knots.

The S value is displayed on target speed dial 21 and transmitted electrically to other fire control equipment thru a synchrotransmitter 380. It is also converted to a displacement and returned to Sections V and VI by a rack, pinion and associated linkage 381 for use in further computations; this displacement is also utilized in the instant Section III in obtaining the target angle A.

How target angle A is found will next be considered: its value is obtained as being the only unknown factor in Equation 20 above when that equation is solved by bringing an integrator servo loop 382 into balance.

Loop 382 consists basically of a balancing gear differential 383, and integrator 384, a constant speed motor 385, and a second integrator 386.

The right side of Equation 20, or jYt sin A − jXt cos A, the output which was computed by differential 375, is applied to one side of the balancing differential 383. The left side of Equation 20, or $\Delta jA \cdot S$, is applied to the other side of differential 383, and is obtained from the combined actions of integrators 384 and 386. When loop 382 is balanced, it may be seen that the output of integrator 386 must be the product of the computed value S and the correct value of the unknown $\Delta jA$.

S, obtained as a rotation from differential 377 thru friction clutch 378 within the range permitted by limit stop 379, is converted to a displacement by a rack and pinion 387 within a range limited by a rotary over-ride 388 and applied to integrator 386, where it positions the ball carriage 389.

A limit stop 390 prevents traversing ball carriage 389 to a position which represents the insertion of a value of S below three knots. Speeds above twenty knots are not presented, due to the action of limit stop 379. The ball carriage 389 of integrator 386 will always be displaced at least a minimum amount representing three knots; this insures that the ball carriage 392 of integrator 384 will be returned to zero at the proper time by the biasing loop action.

THE BIASING LOOP ACTION

Assume first that a value for the component corrections is being inserted on one side of differential 383 from differential 375. There will then be a rotational output from differential 383 acting thru a rack and pinion 395 to control the ball carriage 392 of integrator 384. Clutch 393 slips, when ball carriage 392 reaches the limit of its travel at the edge of disk 394, to permit the differential to continue to rotate freely. Constant speed motor 385 then produces an output from cylinder 396 of integrator 384, which is used to drive disk 397 of integrator 386.

As long as S is of a finite value, the ball carriage 389 of integrator 386 will be displaced, resulting in an output from cylinder 391 which will be fed into differential 383 thru friction clutch 393, tending to return the balls of integrator 384 to zero.

If entry of a zero value for S were permitted in integrator 386, however, there would be zero output from cylinder 391. Cylinder 396 would then continue to deliver an output indefinitely, since there would be no input to differential 383 tending to zero the ball carriage 392 in integrator 384.

By biasing integrator 386 in this way, however, a positive value for jA is obtained as the output of cylinder 396. This correction value is fed to one side of a differential 398. Correction values for observed sonar angles may also be applied to the other side of differential 398 by the operator thru the target angle correction handcrank 17. The output of differential 398, the sum of the computed and observed corrections jA to the target angle A, is then forwarded thru jA output gearing 399, and combined in the Section V differential 506 with the true sonar bearing Bq to obtain a still more accurate value of A. Section V then recomputes the sine and cosine value for the target angle A and returns them to Section III so that a new computation cycle may be carried out. This is repeated several times if necessary to obtain an exact balance, and is accomplished in a second or two.

When the exact value of A has been found, it is displayed on low-speed target angle dial group 61, where it is read on the inner dial 62 against the fixed index 65.

A is also displayed on the high-speed target angle dial 18, and it is used to produce electrical signals in synchro transmitter 515 in Section V.

Target angle and speed have now been found. To carry out the solutions to the attack problems requires additional values, to be obtained in Sections IV and V.

*Section IV. Computation of Own Ship's Speed*

Figure 27:
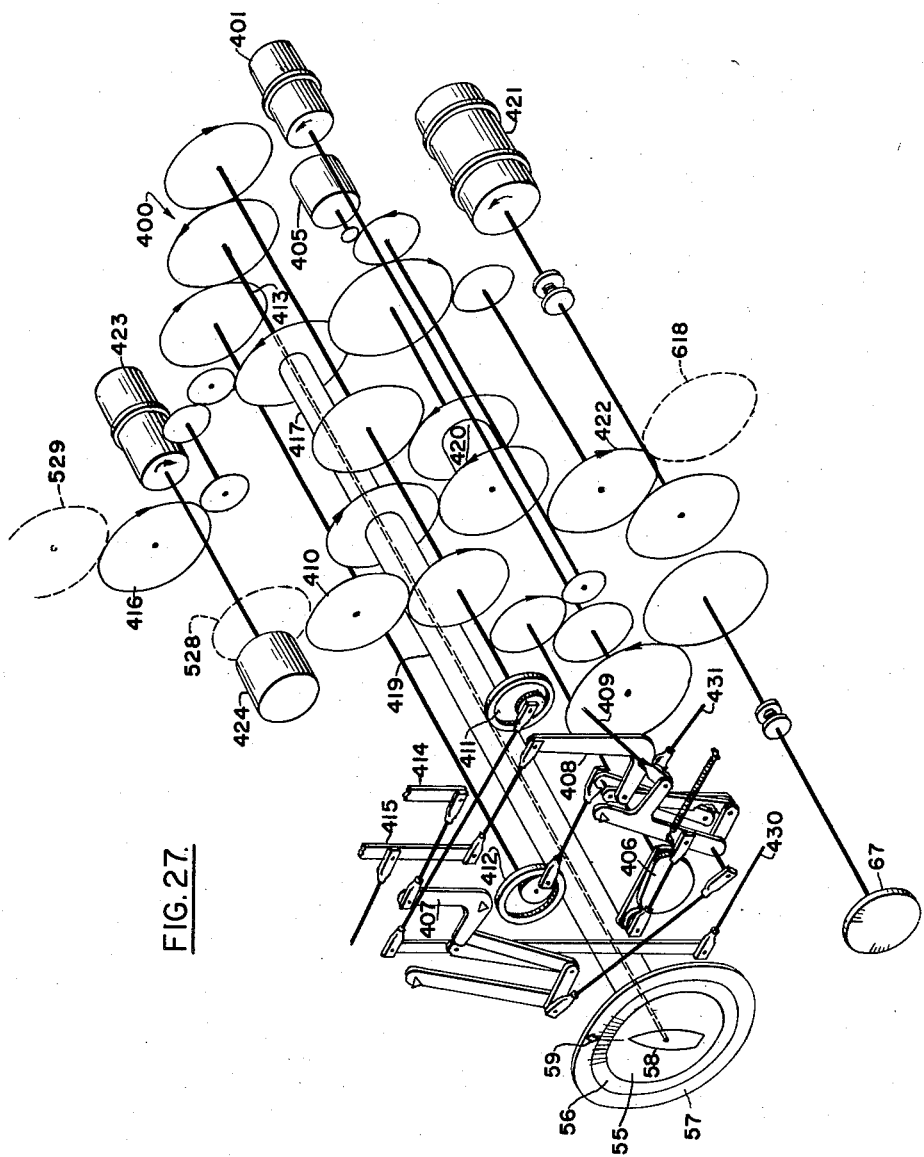
FIG. 27 is an exploded schematic perspective view of the components of Section IV dealing primarily with the speed of own ship.
Figure 28:
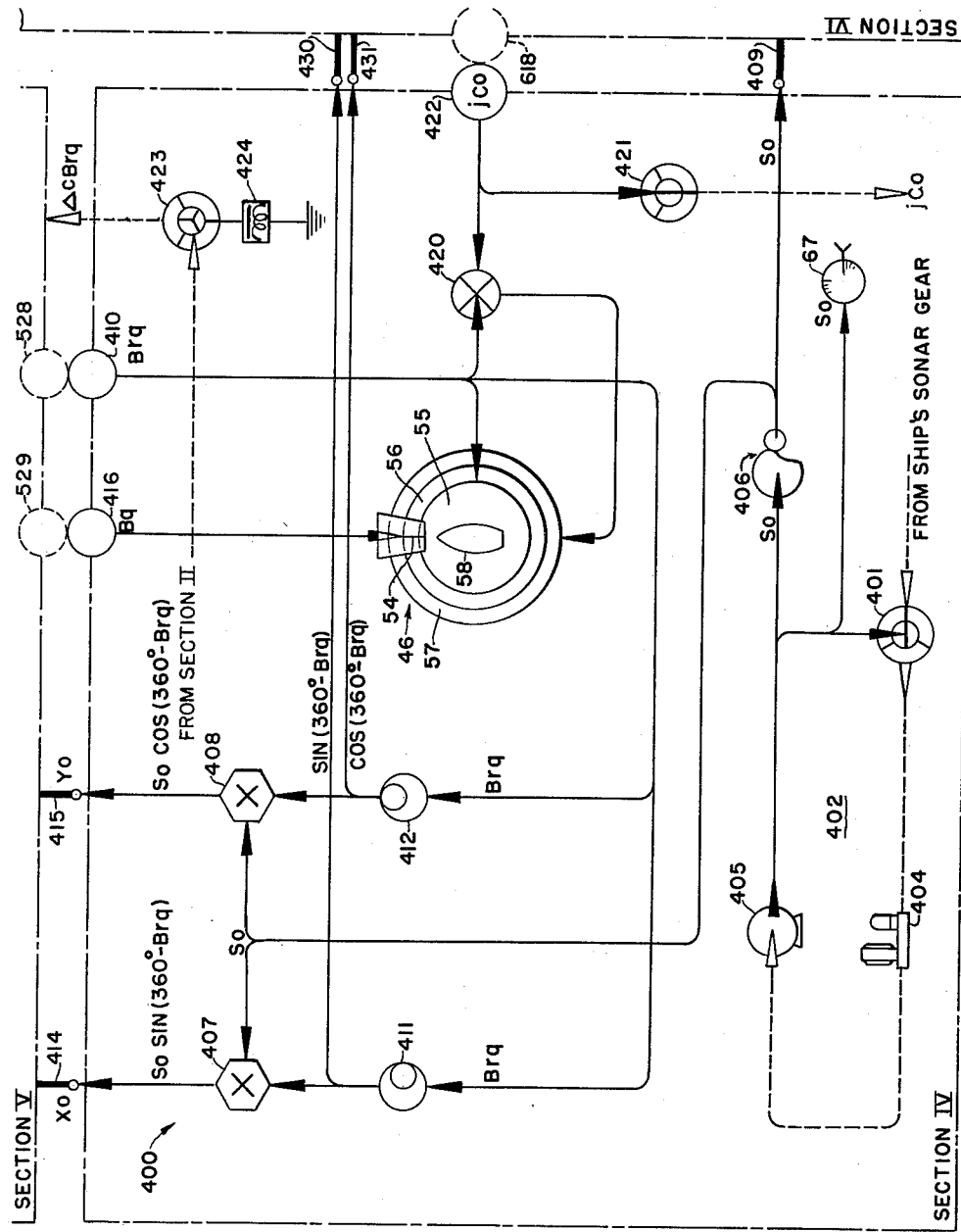
FIG. 28 is a functional schematic diagram of the Section IV components for computing own ship's speed shown in FIG. 27.
Figure 29:
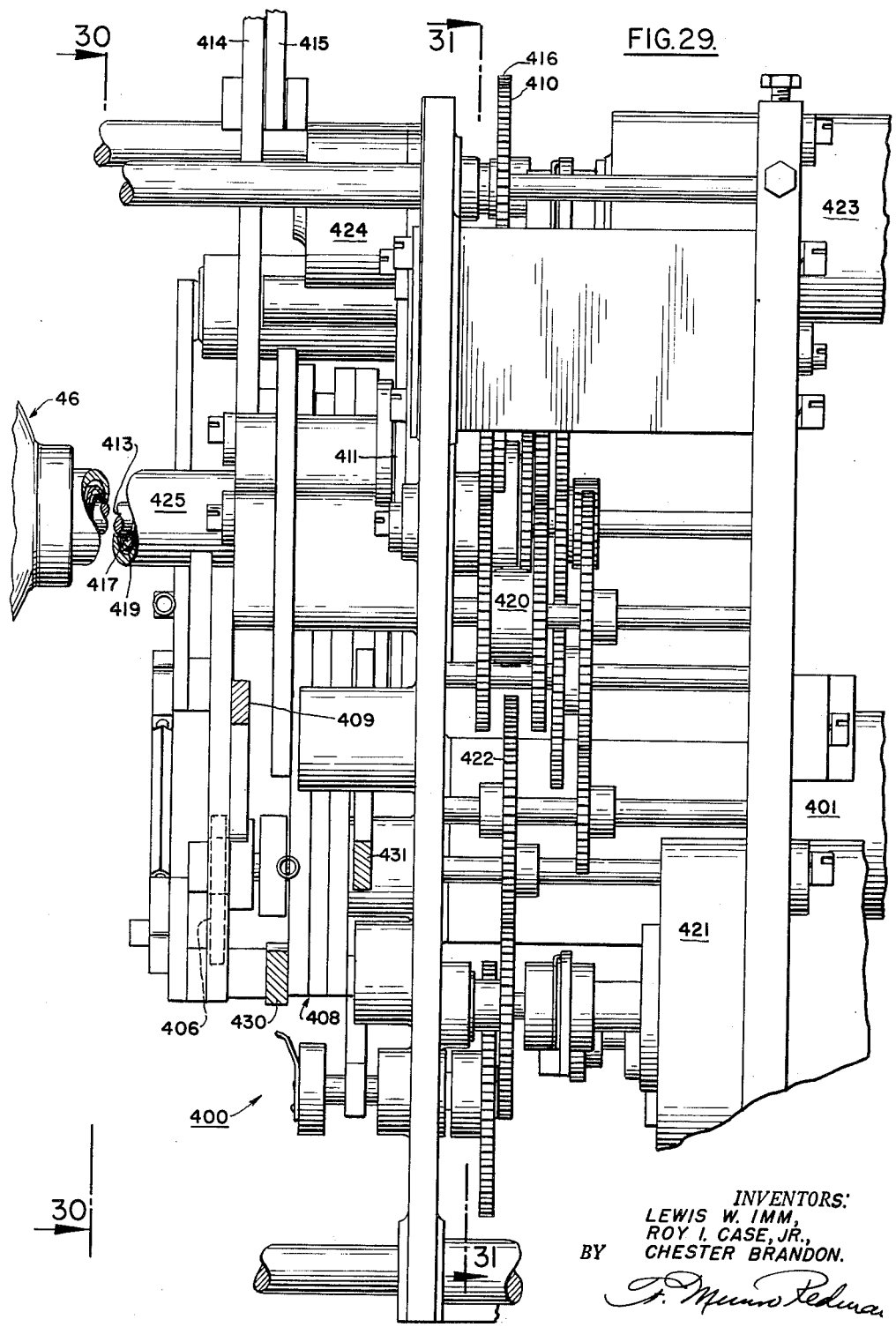
FIG. 29 is an elevational view taken from the right side of Section IV as seen in FIG. 5.
Figure 30:
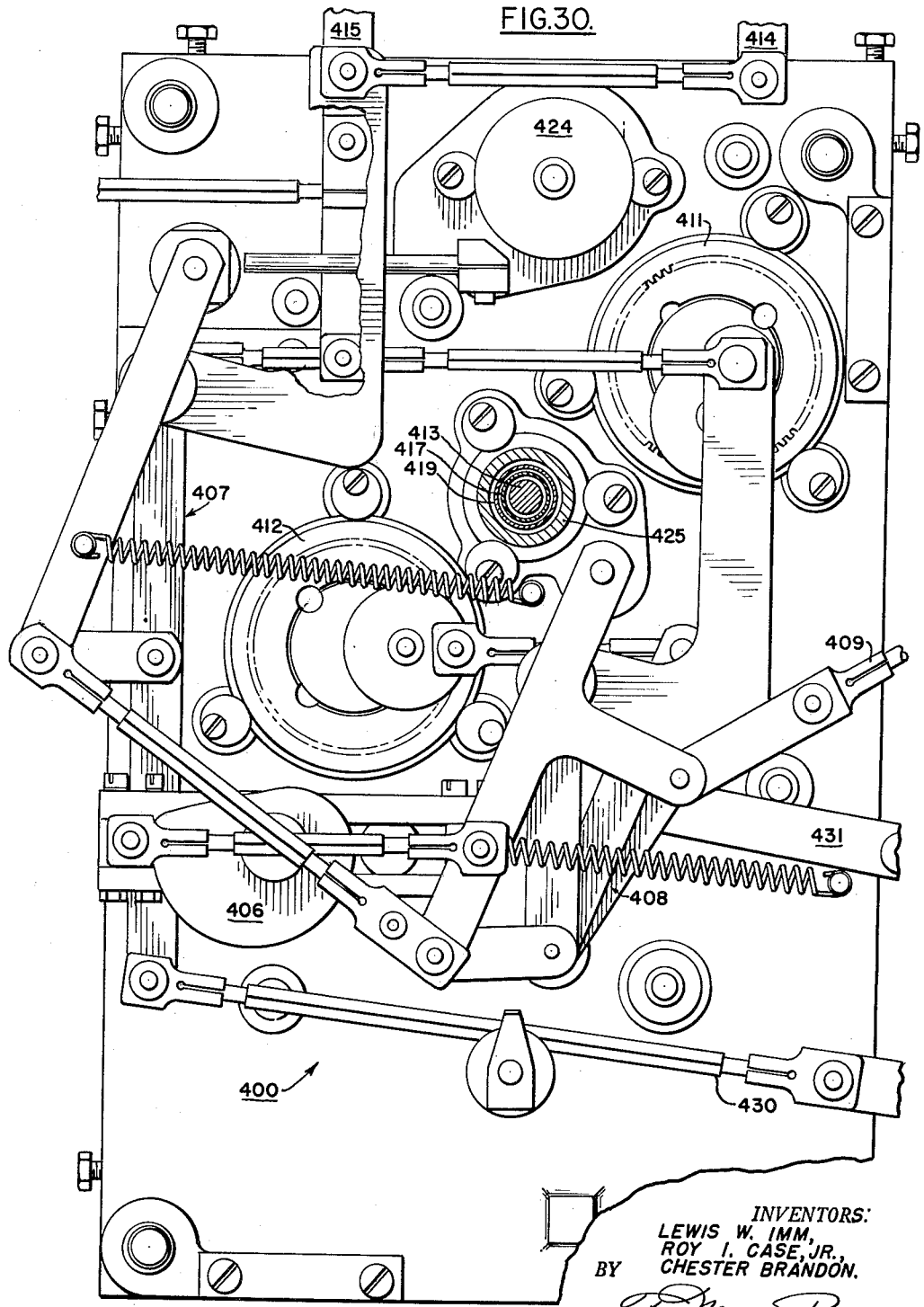
FIG. 30 is a front view of Section IV taken as indicated by line 30—30 of FIG. 29.
Figure 31:
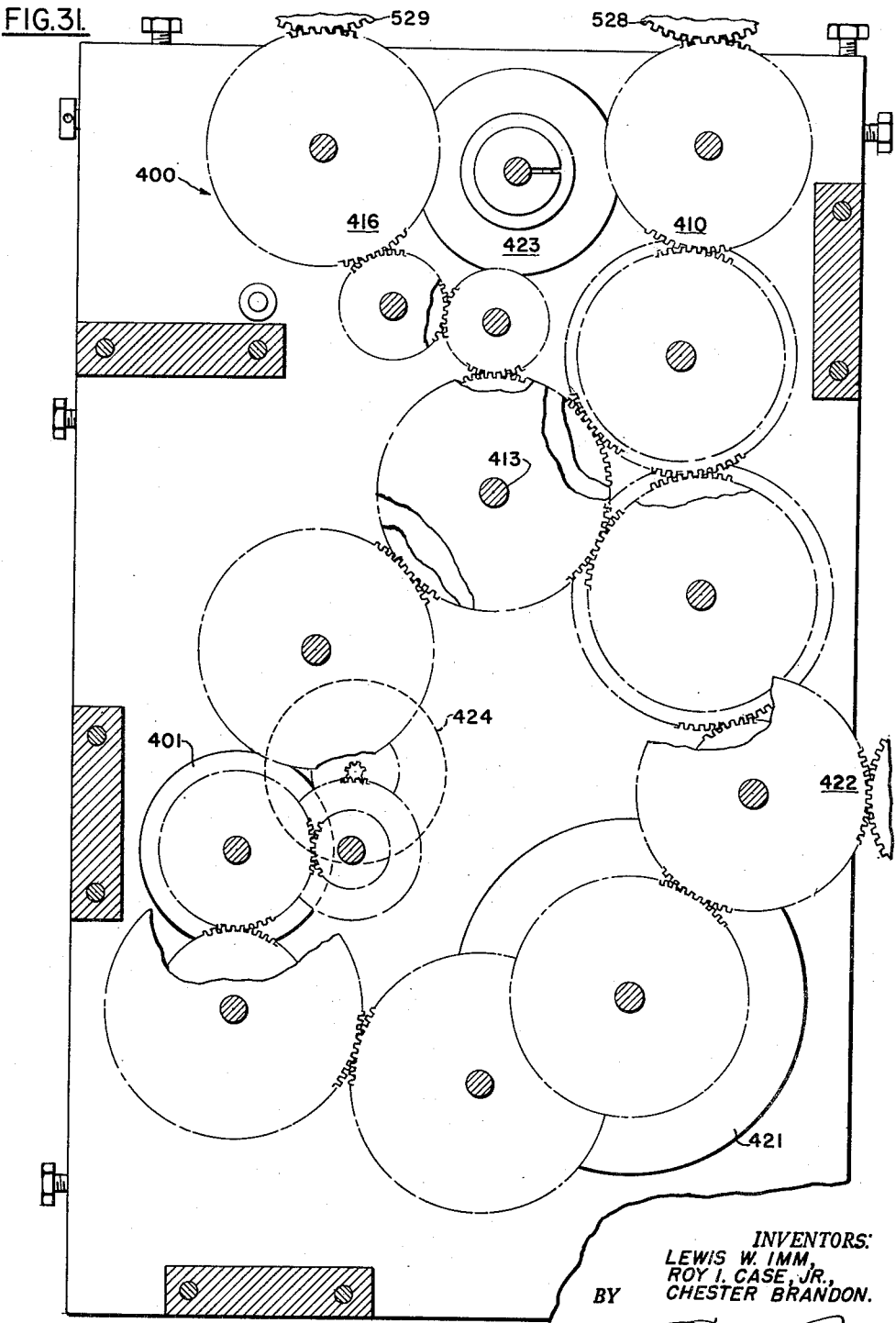
FIG. 31 is a front sectional view of Section IV, taken as indicated by line 31—31 of FIG. 29.

The computation of the components of the speed of own ship is carried on in Section IV of the computer. Section IV, generally indicated as 400, is located physically in the lower center of the computer as seen from the front in FIG. 1, in the block and flow diagram of FIG. 4, and in the linkage diagram of FIG. 5. Inputs and outputs may be seen in the flow chart of FIG. 4, while the physical embodiment is shown in exploded perspective in FIG. 27, and may be understood more readily with the assistance of the functional schematic shown in FIG. 28.

It is necessary to furnish the vector components of the speed of own ship and of the target across and along the line of sound for use in computing the correction components of bearing and range. For this purpose, as described above, Section II was supplied with the subtractive values, $Xo-Xt$, and $Yo-Yt$, from linkage differentials 510 and 511 located physically in Section V.

Section IV computes the $Xo$ and $Yo$ components from which the corresponding target speed components may be subtracted to furnish these difference values. Expressions for the components of own ship's speed were found in Equations 3 and 5 above as:

$$Xo = So \sin(360° - Brq)$$
$$Yo = So \cos(360° - Brq)$$

The value of $So$, obtained as an electrical input from the ship's sonar gear is applied to the synchro control transformer 401 which constitutes one element of a servo loop 402. Loop 402 amplifies the input signal and converts it to a mechanical rotation, which in turn is converted to a displacement for use in satisfying Equations 3 and 5.

In loop 402, the electrical output of synchro control transformer 401 is raised to a higher power level by amplifier 404 to drive a servo motor 405. Part of the rotational output of the motor 405 is fed back to synchro control transformer 401 to complete the servo loop; another part of the motor output turns dial 67 to display $So$, the speed of own ship, on the instrument panel; the rest of the rotational output is converted by a cam and roller combination 406 into a linear displacement. The higher power level linear displacement representing $So$ is then introduced into multipliers 407 and 408 for use in satisfying Equations 3 and 5. Values representing $So$ are also furnished as a displacement for use in computations to be performed in Section VI thru a rod 409 physically associated with the multiplier 408. $Brq$, received from output gearing 528 in Section V thru meshing input gearing 410, is applied to the sine mechanism 411 and the cosine mechanism 412.

Sine mechanism 411 converts $Brq$ to the sine of $(360° - Brq)$, while cosine mechanism 412 converts $Brq$ to $\cos(360° - Brq)$. The $\sin(360° - Brq)$ value is applied to one side of lever multiplier 407, and the $\cos(360° - Brq)$ value is applied to one side of lever multiplier 408.

The output of linkage multiplier 407 will then be $So \sin(360° - Brq)$, and that of linkage multiplier 408 will be $So \cos(360° - Brq)$. These represent, by Equations 3 and 5 above, the $Xo$ and $Yo$ quantities required, and are transmitted to Section V thru linkages 414 and 415, respectively. This is the primary function of Section IV.

In this section also are performed the operations necessary to display $Bq$, $Brq$, and $cCo$ on the Own Ship's dial group 46, which as described above, has a fixed index 54, and includes an inner dial 55, an inner ring dial 56, as an outer ring dial 57. The inner dial 55 and the inner ring dial 56 are graduated from zero to 360° in 10° increments; the outer ring dial 57 has only an index marker 59.

It will be recalled that the layout of Own Ship's dial group 46 and the Target dial group 61 was arranged to simulate the positions and directions of travel of own ship and target in solving the attack problems, such as that shown in FIGS. 52 and 63.

The inner dial 55 of Own Ship's dial group 46 bears a marking 58 representing own ship, and is pointed in a direction representing the heading of own ship relative to the line of sound to the target. This is the angle $Brq$, measured clockwise from the heading of own ship. The $Brq$ value is furnished continuously from Section V and positions dial 55 thru suitable gearing 410 to shaft 413.

True sonar bearing $Bq$, received thru gearing 416 from Section V continuously, is displayed on the inner ring dial 56. The zero graduation on this dial represents true north. The reading against the stationary index marker 54, which lies on the line of sound between own ship and target, to which the line between the centers of dial groups 46 and 61 corresponds, gives the angle $Bq$ between the line of sound and true north, or $Bq$. Gearing 416 operates to position a hollow shaft 417 on which the inner ring dial 56 is mounted, and which rotates freely about the $Brq$ dial drive shaft 413.

The outer ring dial 57, on which the course order marker 59 is fixed, is secured to an outer tubular shaft 419 freely rotatable about the hollow shaft 417. The marker 59 turns to the position representing the optimum course direction, or $Rhu$. This represents the difference between $Brq$, the true sonar bearing, and the course correction $jCo$. The $Brq$ value is applied to one side of the gear differential 420 from the $Brq$ input gearing 410. The $jCo$ value is also applied to differential 420 from $jCo$ input gearing 422, fed by Section VI. The output of differential 420 is then the sum of $Brq$ and $jCo$, or the true course order $cCo$. When the marker 59 coincides with own ship's course $Co$, the vessel is exactly on the proper course. The $jCo$ value fed in by gearing 422 also actuates a synchro transmitter 421 which serves to provide $jCo$ information in electrical form for use elsewhere about the ship as required. When marker 59 coincides exactly with the position of the zero on $Brq$ dial 55, the error will be zero, and the depth charges will register a direct hit.

In addition to the above, Section IV houses physically a synchro differential 423 and a magnetic clutch 424, functionally unrelated to the section. Synchro transmitter 246, located in Section II, delivers a signal representing $\Delta cBrq$. This signal is applied to synchro differential 423, the output of which is then furnished, under the control of clutch 424, to synchro control transformer 520 in Section V. A tubular housing 425 is provided to enclose the shafts 413, 417 and 419 as a mechanical support and protection.

Sine and cosine mechanisms 411 and 412 also forward their computed values thru sin $(360°-Brq)$ output rod 430 and cos $(360°-Brq)$ output rod 431 to Section VI for ballistic computations.

*Section V.—Computation of the Components of Target Speed*

Computations relating to the components of target speed are carried out in Section V, which is located physically in the center of the instrument as seen from the front in FIG. 1, the block diagram of FIG. 4, and the linkage diagram, FIG. 5.

Figure 32:
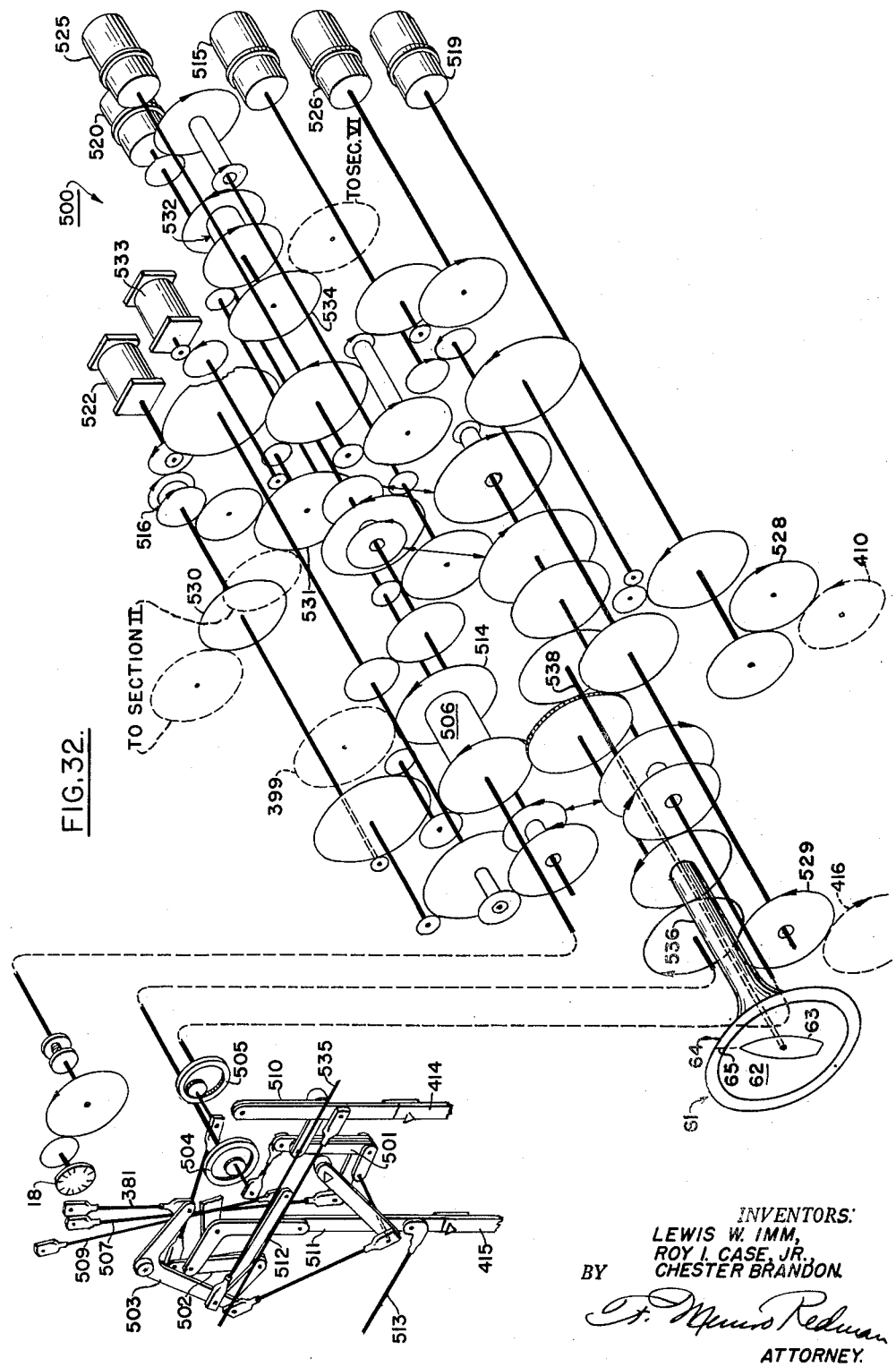
FIG. 32 is an exploded schematic perspective view of the elements of Section V.
Figure 34:
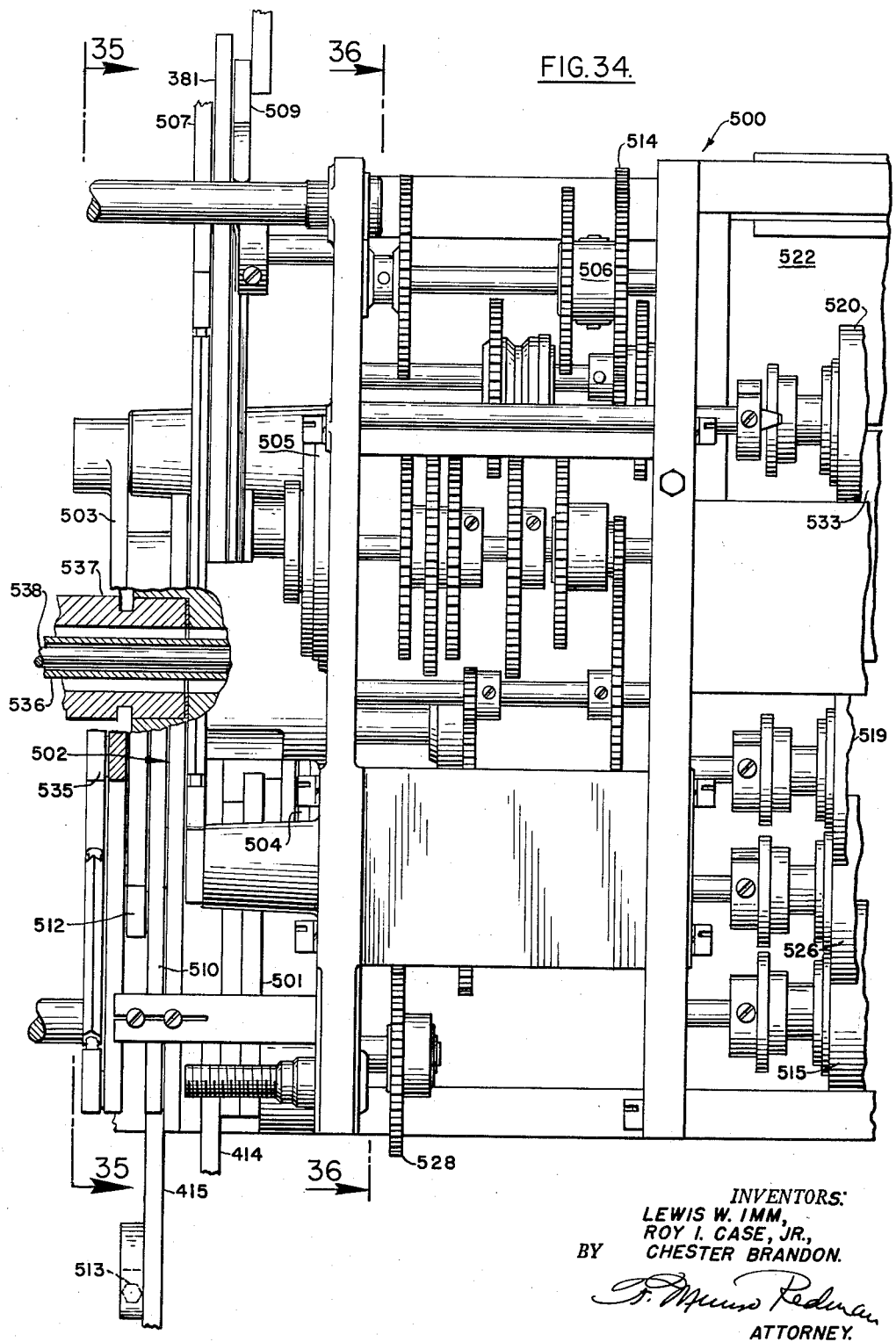
FIG. 34 is a side elevational view of the elements of Section V taken from the right side of the computer as shown in FIG. 5.
Figure 35:
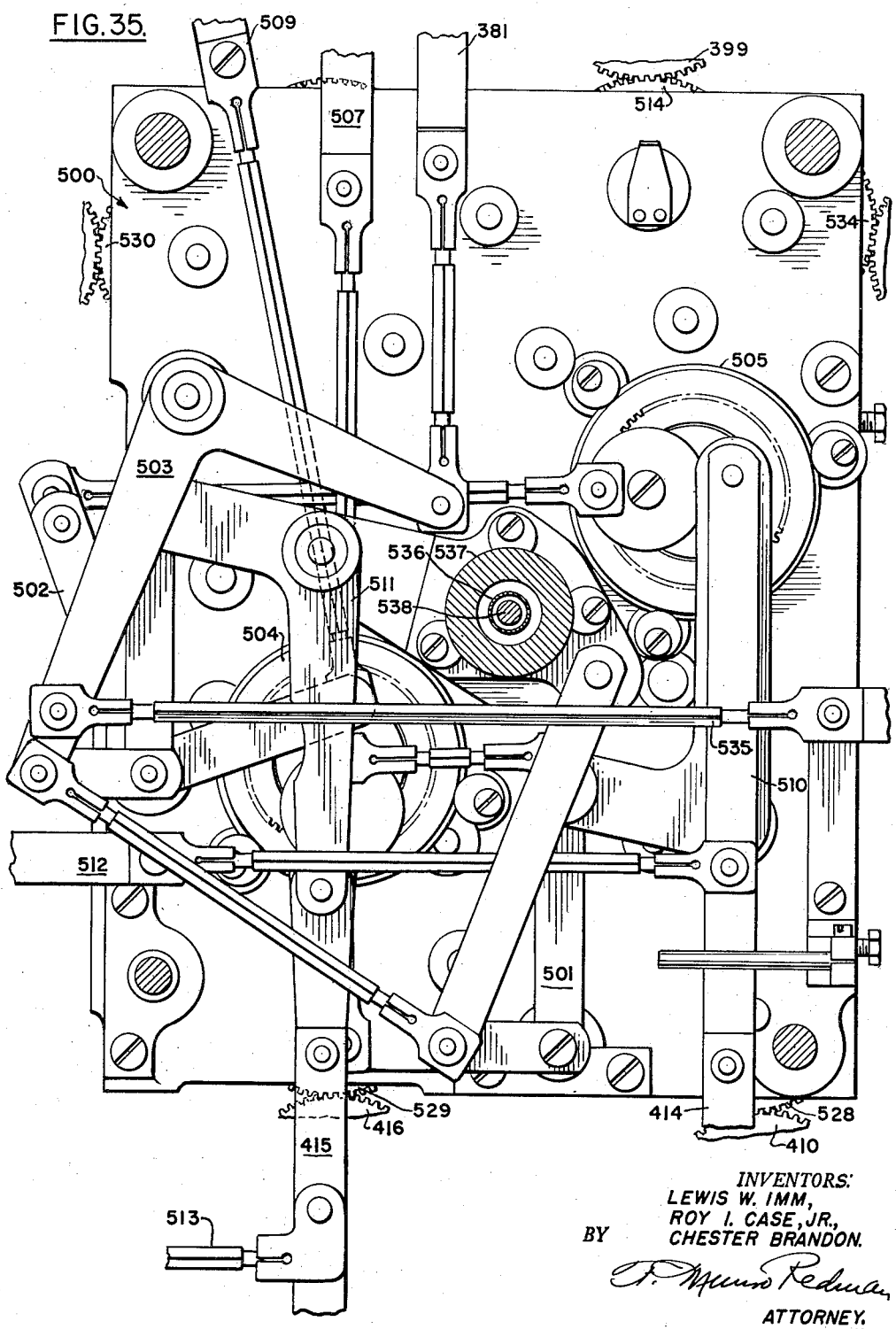
FIG. 35 is a front view partially in section of the elements of Section V taken as indicated by line 35—35 in FIG. 34.
Figure 36:
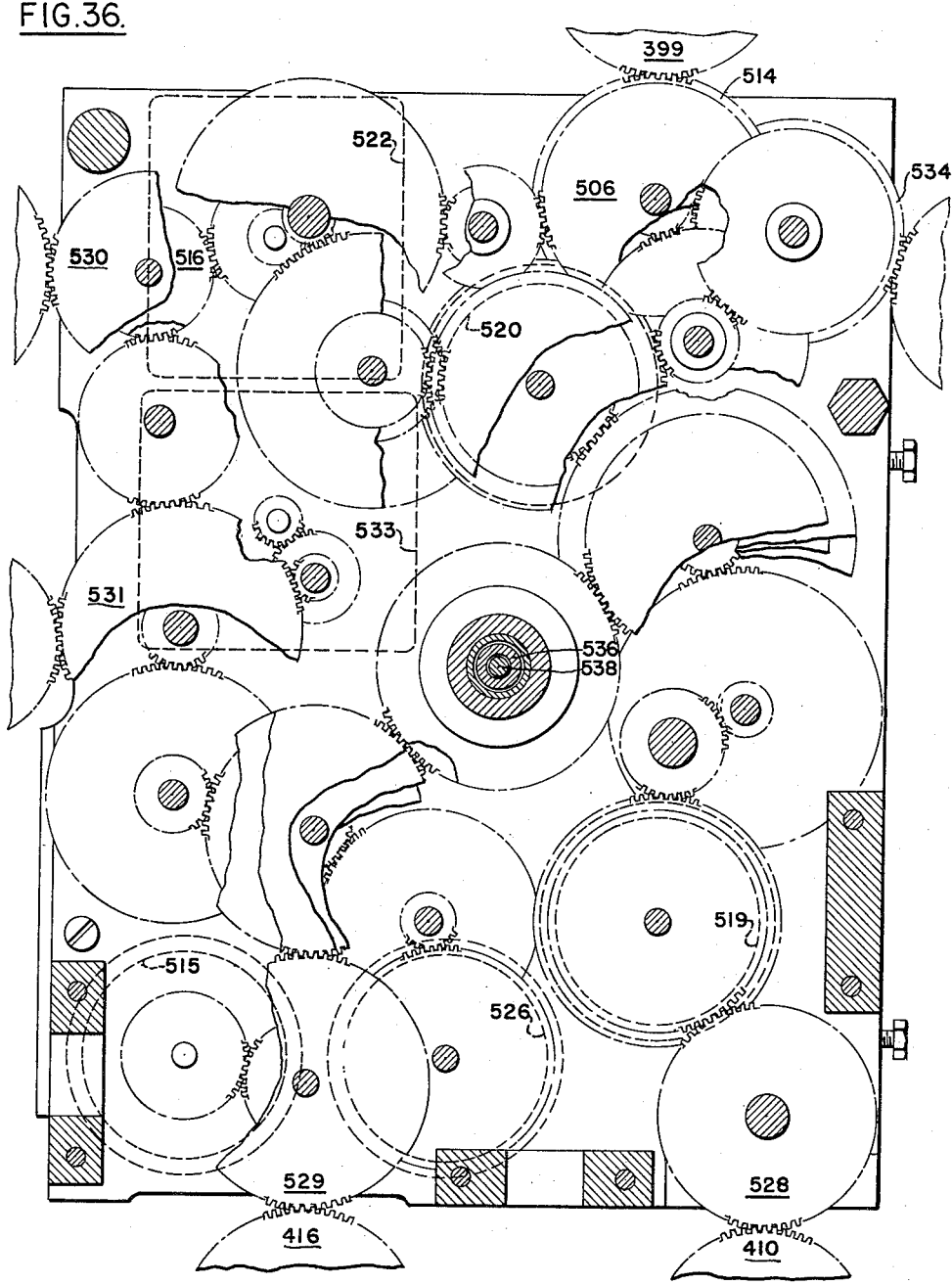
FIG. 36 is a front sectional view of the elements of Section V taken as indicated by line 36—36 in FIG. 34.

The physical structure of Section V, indicated generally as 500, is shown in exploded schematic perspective in FIG. 32, and the operations may be more readily understood with reference to the flow chart of FIG. 4.

Section V furnishes $Co$ to Section II, along with $Xo-Xt$, $Bq$ and $dRhq$ or $Yo-Yt$. It receives $S$ and $jA$ information from Section III and furnishes cosine $A$ and sine $A$ to it. It receives $Brq$ and $Co$ as electrical signals from the bearing console; receives $Xo$ and $Yo$, or $So$ sin $(360°-Brq)$ and $So$ cos $(360°-Brq)$, together with $\Delta cBrq$, from Section IV, and furnishes $Bq$ and $Brq$ to that section. Section V furnishes $S$ from Section III, and calculated $Brq-180°-A$, to Section VI; and furnishes $A$ as an electrical output from synchro generator 515 to other equipment on the ship.

From this information Section V completes the circle of computations needed for position keeping when sonar contact with the target is lost by continuing to return $Co$, $Xo-Xt$, $Bq$ and $Yo-Yt$ to Section II: all values necessary to compute the movements of ship and target on the basis of the information received up to any particular instant are thus available in the instrument, and it will continue to predict accurately as long as the target angle and speed do not change.

The target speed vector components across and along the line of sound were found above to be, by Equations 4 and 5:

$$Xt = S \sin A$$
$$Yt = S \cos A$$

These primary computations are performed by lever multipliers 501 and 502, which give the product of the functions of angle $A$ in this section and of $S$ from Section III.

The value of $S$ produced by differential 377 in Section III is introduced to Section V as a displacement thru a rack and pinion and associated linkage indicated generally as 381, which applies it thru a bell crank 503 to one side of each of multipliers 501 and 502 and forwards it thru rod 535 to Section VI.

The values of sine $A$ and sine $B$ are obtained by applying target angle $A$, found in this section as described below, to a sine $A$ mechanism 504 and a cosine $A$ mechanism 505. The sine and cosine mechanisms convert the rotational angle $A$ output of a gear differential 506 into displacements proportional to the sine and cosine functions of $A$. These displacements are introduced into multipliers 501 and 502 to obtain the desired products $S \sin A$, or $Xt$, and $S \cos A$, or $Yt$.

Sine $A$ and cosine $A$ are fed back for use in Section III thru linkages 507 and 509. The output products $S \sin A$ and $S \cos A$ from multipliers 501 and 502, or $Xt$ and $Yt$, respectively, are then applied to the subtractive linkage differentials 510 and 511. $Xo$ and $Yo$ values from Section IV are also fed into the linkage differentials 510 and 511, and the differences are returned to Section II thru $Xo-Xt$ return rod 412 and $Yo-Yt$ return rod 513.

Target angle $A$, on the basis of which these computations were made, is obtained in this section. It is computed in gear differential 506 as the sum of $Bq$, also calculated in this section, and $jA$, furnished by Section III. It is displayed on the high speed target angle dial 18 and on the low speed target dial group 61. Angle $A$ is also fed into synchro transmitter 515, where it produces electrical signals representing $A$ for use in other fire control equipment. The $jA$ value is entered at 10° per revolution thru gearing 399, which is actuated from differential 398 in the third section, and feeds into gear 514 of differential 506. How $Bq$ is obtained for use in finding $A$ will next be considered.

It will be recalled that it was shown above in connection with FIG. 54 that once the target angle $A$ has been found, any change in $A$ would be exactly equal to the change in true sonar bearing, provided that target speed does not change. Conversely, if $Bq$ is introduced into one side of differential 506 continuously, and changes in $A$ fed into the other side, the output product will always be equal to the correct value of $A$.

$Bq$ is found as the sum of $Co$ and $Brq$ in differential 516. It was shown in deriving Equation 8 that the true sonar bearing is equal to the sum of the course angle of own ship and the relative sonar bearing of the target, less 360°, or:

$$Bq = Co + Brq - 360°$$

Since 360° represents one complete revolution, it may be dropped out, and the angular relation then becomes simply:

$$Bq = Co + Brq \qquad (42)$$

$Brq$ signals are received continuously during position keeping operation from synchro transmitter 246 in Section II, acting thru synchro differential transmitter 423 in Section IV under the control of magnetic clutch 424.

$Brq$ signals from own ship's sonar gear are applied at other times thru input switch 517 to a $Brq$ servo loop 518 including low-speed synchro control transformer 519, high-speed synchro control transformer 520, amplifier 521 and servo motor 522. Within loop 518, the $Brq$ error signal output of the control transformers is made more powerful by amplifier 521 and applied to servo motor 522.

The loop 518 thus supplies higher torque rotation proportionally representative of $Brq$ to one side of differential 516. It also returns $Brq$ thru output gearing 528 to Section IV, where it meshes with $Brq$ input gearing 410 for display on dial 55.

The other input to differential 516, $Co$, is supplied from the ship's gyro compass electrically thru leads 523 to a $Co$ servo loop 524. Loop 524 consists of high and low speed synchro control transformers 525 and 526, amplifier 527 and servo motor 533. The $Co$ error signal from the control transformers results in a corrected rotational $Co$ output from loop 524 at a higher torque level, which is applied to differential 516, and also returned to Section II thru connection 531, where it is applied to differential 245 to aid in computing $\Delta cBrq$.

The differential 516 is now in position to feed $Bq$ into differential 506 to produce the target angle $A$. It also forwards $Bq$ to Section II thru gearing 530 to assist in computing $jXt \cdot t$, and to Section IV thru output gearing 529, meshing with gearing 416, for display in own ship dial group 46. $Bq$ is at the same time applied to target dial group 61, thru a hollow shaft 536 which drives the outer dial 64 and is carried in tubular support 537. Target angle $A$ is furnished by differential 506 to the shaft 538, driving inner dial 62. Shaft 538 rotates freely within hollow shaft 536 and housing 537.

How the value of true sonar bearing, $Bq$, is related to the target course C may be seen by referring to FIG. 63, and by recalling the similarity between the actual positions and headings of target and own ship and that of the target and own ship dial groups 61 and 46. $Bq$ represents the angle between true north and the line of sound from own ship to target, which may be thought of as the line between the centers of the corresponding dials. C represents the angle between true north and the actual heading of the target. The outer target dial 64 is so calibrated that when its zero graduation is directed at true north, the value of angle $Bq$ will be opposite marker 65, located on a line between the centers of the target and own ship dials. Symbol 63 on inner dial 62, representing the target, will then point at C, the proper target course reading, on the outer dial 64.

The target angle A output of differential 506 is also applied to a differential 532 where it is subtracted from $Brq$ supplied by the $Brq$ loop 518 to produce $Brq—180°—A$. This quantity, the angle between the target course and a line passing thru the target parallel to own ship's track, is furnished to Section VI for ballistic computations thru gearing 534. It may be seen on the diagram of FIG. 63.

The quantity S received from Section III is also passed on without change. An S output rod 535, pivotally connected to crank 503 but not otherwise involved in Section V operations, furnishes displacements representing S values calculated in Section III to Section VI for ballistics computations.

From the discussion of the first five sections, it may be seen that, once initial data as to the range, course and speed of the target and of own ship has been supplied to the computer, it will predict the position of the target at any time relative to that of own ship. If the target does not change its course or speed, the predictions will be accurate even though no further target information is received, since the solution is continuously corrected for any changes occurring in the course or speed of own ship. This position keeping operation enables a solution of significant accuracy to be supplied, even though contact with the target is lost, since ordinarily the speed of own ship is substantially greater than that of the target. This means that the range will be continuously closed, and the chances of re-establishing contact, for continued calculations of extremely high accuracy, are greatly enhanced.

How the attack is planned from the knowledge obtained in Sections I–V as to the relative positions and movements of the ship and target will be considered next.

*Sections VI and VII Solution of Attack Problems*

The solution to the various ballistics problems involved in solving the three types of attack problems is carried out in Sections VI and VII. Section VI is located physically in the lower two-thirds, while Section VII occupies the upper third, of the right side of the computer as seen in FIG. 1 and in the block diagram of FIG. 4. These two sections will be considered together, since Section VII contains primarily servo loops cooperating with computing elements of Section VI, and they operate functionally as a unit. The mechanism of Section VI has been shown in exploded schematic perspective in FIGS. 37 and 38, looking upward from the lower right to obtain the most instructive view. Because of the complexity of the linkages involved, those located in the front portion of the section have been shown in FIG. 37, and those lying in the rear portion have been shown separately therefrom in FIG. 38, but it will be understood that the structures in both figures are physically combined in Section VI of the instrument. Where shafts have been broken between the two views, the corresponding letters indicate the proper continuations. An exploded schematic perspective of Section VII is shown in FIG. 44.

To assist in understanding how the solutions are effected, the functional schematic of Section VI presented in FIGS. 39A, 39B and 39C, and that of Section VII shown in FIG. 45, should be considered together. Broken leads passing from one to the other of these figures are indicated by corresponding numerals enclosed in circles.

The three attack problem types: stern-dropped, fixed ahead-thrown and trainable thrown, were considered on a theoretical basis above. The solutions require certain quantities which are constants of own ship of the projectile, or which relate to the target. These values are set in manually. Provision has been made in the form of separate entry knobs and linkages to permit one group of these constants for a stern-dropped or fixed ahead-thrown attack, and another group for trainable attacks, to be set into the director and left semi-permanently, since they vary on a particular vessel only if the weapon is changed or moved.

STERN-DROPPED AND FIXED AHEAD-THROWN ATTACKS

For stern-dropped and fixed ahead-thrown attacks, the solutions are so similar that they will be treated together. In these cases, target depth, parallax, dead time, time of flight and sinking rate are set in by hand, using values known, or estimated by the operator on the basis of his past experience, as the case may be.

Values of target depth are entered thru target depth knob 25 on the basis of information received from the ship's sonar, or from the past experience of the operators. $Hq$ is fed to Section I by means of an $Hq$ output rod 605A, passing physically thru, but without connection to the mechanism of, Section IV.

Parallax plus effective range, a constant of the ship, $P+Re$ (fixed), is entered thru fixed parallax knob 32 as a positive quantity for fixed ahead-thrown attacks; for stern-dropped attacks, the effective range is zero and the entry becomes merely the parallax value P1, which is then a negative quantity.

Dead time plus time of flight, $Tg+Tf$, another constant of own ship, is entered thru $Tg+Tf$ (fixed) knob 27, with the value of $Tf$ zero for stern-dropped attacks.

Sinking speed $Sd$, a characteristic of the particular depth charges used, is entered thru the sinking rate (fixed) knob 37.

The situations involved in stern-dropped and fixed ahead-thrown attacks are shown schematically in three dimensions in FIGS. 52 and 53 and as a schematic two-dimensional projection on the surface of the water in FIGS. 63 and 64, respectively.

As set forth above, two quantities are of special significance in directing a stern-dropped attack: time to fire, $Tud$, and own ship's course correction, $jCo$.

In the stern-dropped attack, it may be recalled that parallax $P1$ is measured aft from the transducer to the stern, and hence represents an addition to range as computed by the ship's sonar gear, and a negative quantity in the equations; while advance range, $Re$, and time of flight, $Tf$, are zero. In FIG. 63 it may be seen that the distance traveled by own ship from the beginning of the attack until the explosion occurs is $SoTu$, the product of own ship's speed and the time remaining to explosion. During the latter part of this period, own ship has passed over the point at which the explosion will occur, and is moving out of range as rapidly as possible. Before the order to fire is transmitted, own ship has traveled toward the intended explosion point a distance equal to the product of own ship's speed and the time remaining to fire, or $SoTud$. After the order to fire is transmitted, it travels $SoTg$, own ship's speed multiplied by dead time, before actual firing. While the charge is sinking to the depth at which it is to explode, the vessel travels $SoTd$, the product of own ship's speed and sinking time. Since the beginning of the attack, the target has traveled $STu$, target speed multiplied by the time remaining until the explosion occurs.

COMPUTING TUD

As explained above, the time remaining to fire, $Tud$, is obtained by satisfying Equation 25:

$$Tu - Td = Tud + Tg + Tf$$

$Tg+Tf$ is entered thru knob 27, with the $Tf$ value for stern-dropped attacks being zero. The limit stop 601 does not permit entered values in excess of fifteen seconds to reach gear differential 602 thru broken shaft C; values up to fifteen seconds are there added to the quantity obtained from Section VII thru $Tud$ input gearing 604 to obtain the right side of Equation 25 as a rotary output from differential 602. This rotary output is returned to the front of the section thru broken shaft R, and is there converted by rack and pinion 603 to a displacement. This output will, of course, be equal also to the left side of the equation, $Tu-Td$.

$Td$ is computed by Equation 26 as the result of the multiplication of $Hq$ by the reciprocal of $Sd$ (fixed), entered by knobs 25 and 37. The entered values pass from knobs 25 and 37 thru broken shafts G and H, respectively, to the rear of the section, and are thence returned thru broken shafts T and V, respectively, to the front of the section for entry in multiplier 605. $Hq$ is also transmitted thru an $Hq$ output shaft 605A associated with the multiplier 605 to Section I. In FIGS. 39B and 39C the path from knob 25 to multiplier 605 is thru the broken leads to which the circled numerals 1 are applied. Dial 39, which displays the entered sinking speed, is calibrated in such a way that it actually represents the entry of the reciprocal value $$\frac{1}{Sd}$$

The product of multiplier 605 is then the desired $Td$, which is fed thru broken shaft U to an internal $Td$ dial 608 used for calibrating only. A cam 607 is mounted in the front of the section on broken shaft U, while an overdrive linkage 609 is pivotally connected at the rear of the section to a linkage differential.

When $Td$ is added in linkage differential 606 to the displacement representing $Tud+Tg+Tf$ supplied by rack and pinion 603, the output of differential 606 will be $Tu$, by Equation 25. This output is then applied to multipliers 610 and 611 for further computations, as will be explained later.

A limit stop 612 prevents entry of excessive $Sd$ values in multiplier 605, while cam 607 operates switch 613 to light the "No Solution" light 71 in the event the sinking time will be in excess of sixty seconds. The path for the transmission of data from rack and pinion 603 to linkage differential 606 is thru linkages 614 including a bell crank, a lever arm associated with multiplier 615, broken shaft P to the rear of the section, and additional linkages 614A.

The displacement from rack and pinion 603 is also used in multiplier 615 to obtain the product of $Tu-Td$ by $So$ received from Section IV thru input rod 409, as shown in FIG. 39A, and passed to FIGS. 39B and 39C by the broken lead indicated by circled numerals 2. $So(Tu-Td)$ will be forwarded from multiplier 615 to a linkage differential 616. Linkage differential 616 adds $So(Tu-Td)$ to the parallax, or parallax plus effective range, $Pl$ or $P+Re$, inserted thru knob 32 and converted to a displacement by rack and pinion 616A. It will be remembered that in stern-dropped attacks the effective range is zero. The limit stop 617 prevents parallax values in excess of 150 yards aft or 320 yards forward, applied thru knob 32, from entering the linkage differential 616. The output of differential 616, $P+Re+So(Tu-Td)$ or $Pl+So(Tu-Td)$, is fed into a subtractive linkage 619, which constitutes the control element in balancing the equations employed in finding $Tud$.

The balancing is effected by utilizing the output of linkage differential 619 to control the position of the ball carriage 701 of the integrator servo loop 704 in Section VII.

A balance solution is possible because expressions for equivalent physical quantities have been obtained based on data obtained from entirely different sources. One set of data is accurately measured by sonar as to the target: the other set is a combination of accurately measured data from ship's instrument for own ship, and assumed values for the movements of the target. Since only the assumed target data is not measured, the magnitude of the operation necessary to obtain the balance will be an accurate indication of the unknown values. Own ship's information was inserted in linkage 619 from the additive linkage 616, and target information is inserted from an additive linkage 620, its computation being described hereafter.

Remembering that the output of linkage differential 616 above may be written as $SoTu-SoTd+Pl$, and that the parallax is a negative quantity in a stern-dropped attack, it will be seen that this expression represents the position of the stern of own ship at the instant the charges are dropped. Inspection of FIG. 63 will show that this position is also represented by $cRhq \cos(360°-Brq)+STu \cos(Brq-180°-A)$. Hence as will be apparent from Equations 30 and 31, the subtraction of the output of differential 616 from that of differential 620 will give zero as the result when the correct solution to the unknown, $Tud$, has been inserted into differential 602.

The output of balancing linkage differential 619 is transmitted by output arm 619A thru overdrive linkages 621 and 622, and thru connecting means 624 to Section VII, where it positions the ball carriage 701 of a biased integrator 702 in a $Tud$ integrator servo loop 704. The disk 705 of integrator 702 is driven by a time motor 706, and any output from cylinder 707 is applied thru friction drive 709 to one side of a differential 710. The output of the differential 710 is introduced thru limit stop 711 to synchro generator 712, where it produces electrical $Tud$ signals for use in other fire control apparatus, and to dial 45 for display. It is also returned thru $Tud$ output gearing 714 to Section VI, where it feeds thru input gearing 604 to differential 602.

The integrator 702, friction drive 709, differential 710 and motor 706 together constitute a biasing loop which permits the ball carriage 701 to be displaced from the center of disk 705. The ball carriage is normally displaced about 1/32 of an inch from the center of the disk, which will give a certain rotation from the cylinder into the differential. The connection to the time motor is so arranged as to introduce an exactly equivalent rotation into the other side of the differential, so the output of differential 710 will be zero, and excessive wear at the center of the disk will be avoided when the balls are zeroed.

When any displacement other than the biasing value at which the balls are zeroed is inserted by the balancing linkage differential 619, the loop will drive out a $Tud$ value sufficient to restore that linkage to zero position. The amount so driven out will register on the appropriately calibrated $Tud$ dial 45 to tell the operator when to give the signal to fire.

COMPUTING jCo

The computation of the correction $jCo$ which should be made to own ship's course will next be considered: $jCo$ represents the angle between own ship's course $Co$ at any instant and the direct line $Rhu$ to the desired explosion point E. Reference to Equations 27-29 and FIGS. 63 and 64 will show that the sides of the right triangle including angle $jCo$ and having $Rhu$ and $So$ as legs may be based on sonar information, or independently on own ship's data plus an unknown, so that balancing the two sides of Equation 29 will necessarily involve the insertion of a measurable valve representing $jCo$.

It will be seen that Equation 29 may be rewritten as:

$$\sin jCo\ [cRhq \cos (360°-Brq) + STu \cos (Brq-180°-A)] - \cos jCo [cRhq \sin (360°-Brq) - STu \sin (Brq-180°-A)] = 0 \quad (43)$$

All of the quantities in Equation 43 are known, or may be found from calculations elsewhere in the computer, except $jCo$. An unknown representing $jCo$ is fed by a balancing integrator servo loop 720 to a sine mechanism 625 and a cosine mechanism 626. The products, representing unknowns sin $jCo$ and cos $jCo$, are then inserted into multipliers 627 and 629.

Quantities representing the bracketed elements in Equation 43 are then introduced into the corresponding multipliers 627 and 629, and the multiplier outputs applied to a balancing subtractive linkage differential 630. If there is an output from differential 630, it will act thru overdrive linkage 631 and connecting means 632 to move the ball carriage 721 of biased integrator 722 away from the zero position. The time motor 724 will then drive new $jCo$ values back to the sine and cosine mechanisms 625 and 626 thru $jCo$ output gearing 729, Section VI $jCo$ input gearing 628 and broken shaft Q until a balance is reached. At this point the subtractive lever differential 630 zeroes the integrator.

Integrator 722 is biased like integrator 702, and for the same reason. The ball carriage 721 is zeroed off center on disk 725, and the output of cylinder 726 to differential 727 is then exactly equalled by the rotation fed the differential 727 from motor 724, reducing wear at the center when the ball carriage is zeroed.

The values of $jCo$ supplied from Section VII to Section VI are also forwarded without change to Section IV, where they are used to compute $cCo$ for display on own ship's dial group and to produce electrical $jCo$ signals from synchro generator 421. Suitable connections for this purpose are provided from the Section VI $jCo$ input gearing 628 to Section VI $jCo$ return gearing 618, which meshes with Section IV $jCo$ input gearing 422.

To find the remaining quantities needed to solve for $jCo$, the bracketed quantities in Equation 42 will be developed for application to multipliers 627 and 629. It will be recalled that $cRhq$, the horizontal range generated from sonar data, was found in Section I, taken as a displacement output from a linkage in Section II by means of $cRhq$ output rod 247, and forward thru Section IV to Section VI without change. The $cRhq$ input is limited in Section VI by an overdrive linkage 634 to 1500 yards. Above 1500 yards, the computer is functioning as a position keeper, and no attack solution is being generated.

The quantity $cRhq$ is to be used in both bracketed quantities in Equation 43. It is applied to linkage multipliers 635 and 636.

The values of sin $(360°-Brq)$ and cos $(360°-Brq)$ are received from Section IV thus the displacements of linkages 430 and 431 connected respectively to the multipliers 635 and 636. The outputs of these multipliers will then be $cRhq$ sin $(360°-Brq)$ and $cRhq$ cos $(360°-Brq)$, and will be seen to be the factors on the left in each of the bracketed quantities in Equation 43.

It may be seen from FIGS. 63 and 64 that $cRhq$ sin $(360°-Brq)$ represents one coordinate of the initial position of the target, that along a line normal to own ship's track; while $cRhq$ cos $(360°-Brq)$ represents the other such coordinate, that along a line parallel to own ship's track.

The remaining quantities in each of the brackets in Equation 43 may be seen from FIGS. 63 and 64 to represent the distances the target must travel parallel to and across own ship's track to reach a position directly above the desired explosion point E.

The quantity $Brq-180°-A$, representing the angle between target course and a line drawn thru the target parallel to own ship's course, is received thru the output gearing 534 from Section V and inserted in one side of differential 637. The other input to differential 637 receives spot corrections from knob 22 thru broken shaft A, as described below. When no spot corrections are being entered, $Brq-180°-A$ passes unchanged to sine mechanism 639 and cosine mechanism 640 thru broken shafts N and J, respectively. The resultant sin $(Brq-180°-A)$ output of sine mechanism 639 is applied to a multiplier 641, and the cos $(Brq-180°-A)$ output of cosine mechanism 640 is applied to a multiplier 642, where their respective products by target speed S will be found.

Target speed S as computed in Section III is also passed thru Section V to Section VI without change. It is received thru the S output rod 535 and inserted in multiplier 643 and in a subtractive linkage differential 644.

At this point the spot correction discussed previously for curved course attacks is entered when the target is observed going into a hard turn during evasive maneuvers. The operator estimates the turn in which the target may be engaged, and allows for it by making entries thru the target course spot correction knob 22 in the manner previously described. Since a line thru the target parallel to own ship's track will serve as well as true North for a reference, the target course correction $jC$ may be made to $Brq-180°-A$ as well as to C.

The $jC$ value is inserted thru knob 22 and limit stop 645, which prevents introduction of turn values in excess of 150° in either direction. The inserted quantity is displayed on target turn dial 24 and is applied thru broken shaft A to gear differential 637. Thus the output of differential 637 will be $Brq-180°-A$ as modified by the estimated $jC$ value, and the newly estimated quantity will be returned thru broken shafts N and J, respectively, to the sine and cosine mechanisms 639 and 640 for further computations.

Knob 22 also controls the position of speed correction cam 646 thru broken shafts A and K. It will be recalled that the spot correction was designed to simulate the arrival of the target at a given point X in FIG. 60 on a course by the direct chord route instead of by the circular track it actually follows. The correction to course must hence be accompanied by a correction to speed, since the circular track is longer than the subtended chord. This correction is entered thru cam 646 which displaces a cam follower 647. The displacement is applied to the multiplier 643 into which S is fed from Section V.

S is also supplied to the subtractive linkage differential 644. The product of S and the cam correction factor obtained in multiplier 643 is subtracted from S in linkage differential 644 to give a corrected value of S. The cam 646 must hence be shaped to provide a correction factor which will result in compensation for the speed difference involved in following an arc instead of a chord to the given point. Cam 646 is so designed that if the course change introduced is slight, the value of target speed used in the attack director's computations will differ but slightly from the target speed computed from the range and bearing inputs. If the course change is greater, however, the difference between the target speed computed from the sonar inputs and the target speed used in the solutions to the attack problems will be significant. Thus the value of S furnished to multipliers 641 and 642 thru output linkages 644A and 644B may include significant spot corrections if the target is engaged in evasive maneuvers.

As the range closes, the spot correction is reduced. At 500 yards, the over-correction is reduced to twice the estimated actual turn, and at 300 yards it is reduced again, to the actual estimated turn. The initial approximations become successively more accurate, since at the same time the actual sonar data is being received.

Multipliers 641 and 642 are now able to produce the products $S$ sin $(Brq-180°-A)$ and $$S \cos (Brq-180°-A)$$

with such corrections as necessary for a curved target course.

$S \sin(Brq-180°-A)$ is taken from multiplier 641 to the multiplier 610 by a rod 648. This path is shown in FIGS. 39A, 39B and 39C by the broken line indicated by the circled numerals 3. $S \cos(Brq-180°-A)$ is carried from multiplier 642 to the multiplier 611 by a rod 649. This path is indicated in the same figures by circled numerals 4. It remains only to multiply these quantities by $Tu$ to be able to complete the bracketed factors in Equation 43.

How $Tu$ is conveyed from the linkage differential 606 to multipliers 610 and 611 will next be considered. A circuitous path is taken because of the space limitations. The $Tu$ output of additive linkage differential 606 at the rear of the section is passed as a $Tu$ displacement thru linkages 650 to cause rotation of a $Tu$ shaft 651. The broken $Tu$ shaft 651 returns it as a rotation to the front of the section, where it is applied thru a $Tu$ link 652 to multiplier 611. The value is also carried to multiplier 610 by a $Tu$ connecting rod 653.

When these factors have been entered, the output of multiplier 610 is $TuS \sin(Brq-180°-A)$, and that of multiplier 611 is $TuS \cos(Brq-180°-A)$. These quantities represent the components of distances traveled by the target to the desired explosion point, normal to own ship's track and parallel thereto, respectively, as seen in FIGS. 63 and 64.

A closer approach to the solution of the $jCo$ triangle is made by using the difference, obtained in linkage differential 654, between $TuS \sin(Brq-180°-A)$ just found in multiplier 610, and $cRhq \sin(360°-Brq)$ obtained in multiplier 635, to find the side opposite $jCo$, which constitutes the depth charge attack error EF. This value is also defined as being equal to $Rhu \sin jCo$. The $$cRhq \sin(360°-Brq)$$

value is forwarded from multiplier 635 to linkage differential 654 thru the broken line indicated in FIGS. 39A, 39B and 39C by the circled numerals 5. The operation is effected in the subtractive linkage differential 654, which has one end pivotally mounted on the multiplier 635 answer arm, inserting $cRhq \sin(360°-Brq)$. The other end receives $TuS \sin(Brq-180°-A)$ from multiplier 610 thru linkage 655. The difference found in linkage 654 is applied thru output rod 656 and bell crank 657 to multiplier 629, where its product by cosine $jCo$ will be found as described previously in solving the $jCo$ triangle. This operation represents the completion of the bracketed quantity which is to be multiplied by cosine $jCo$ in solving Equation 43. In addition, rotation of the bell crank shaft 658 is registered on the depth charge attack error dial 66 for the guidance of the operator. The reading is limited to 200 yards port or starboard by an overdrive linkage 659.

Next is obtained the side of the $jCo$ triangle along own ship's track, which is multiplied by sine $jCo$ in solving Equation 43. The output of multiplier 636, or $$cRhq \cos(360°-Brq)$$

is forwarded thru output rod 638 to linkage differential 620. This path is shown in FIGS. 39A, 39B and 39C by the broken line indicated by the circled numerals 6. Differential 620 also receives from the answer arm 661 of multiplier 611 the product $TuS \cos(Brq-180°-A)$. The sum of these quantities represents the component along own ship's track of the distance $Rhu$. It is also the bracketed quantity by which sine $jCo$ was multiplied in Equation 43.

The sum is fed from linkage differential 620 thru output rod 662, bell crank 663 and output linkages 664 and 665 to multiplier 627, where its product by sine $jCo$ will be found. Thru linkages 665 it is also transmitted to the linkage differential 619, where the balance is obtained to find $Tud$.

All quantities necessary to solve the $jCo$ triangle in terms of known and computed movements of target and own ship have now been found, and it was explained above how the servo loop 720 is used to find a value for $jCo$ which will satisfy the relations.

Stated in another way, expressions have been found for $Rhu$ in the $jCo$ triangle in terms of data accurately computed from sonar information as to the movements of the target, and again in terms of the known movements of own ship. At the same time, a solution has been found for $Rhu$ on the basis of the sine and cosine functions of $jCo$. Since the products of equal quantities are likewise equal, they have been applied to a balancing member so that the common quantity $Rhu$, to which each is equal, could be eliminated, leaving $jCo$ as the only unkown remaining. Since there can be only one angle for which the $jCo$ sine and cosine products are equal, the solution may be readily found by the use of the servo loop 720.

The solution for the fixed ahead-thrown attack differs from that for a stern-dropped attack only in the values for parallax, dead time plus time of flight and sinking time which are required. Parallax P1 will be a positive quantity in the fixed ahead-thrown attack, and there will be a known effective range value to be entered. Dead time $Tg$ will remain the same, but time of flight $Tf$ will be a positive quantity. A new sinking rate $Sd$ may be required, depending on the characteristics of the projectiles used. Using the proper values for these constants, the director may now find the significant factors $Tud$, time remaining to fire, and $jCo$, correction to own ship's course, necessary to carry out a successful attack with either stern-dropped or fixed ahead-thrown projectiles. It will be appreciated that only one of these may be computed at one time, in view of the different constants manually entered as above.

TRAINABLE-THROWN ATTACK

Just as a solution was obtained above by the use of equations relating to the functions of an unknown angle, so it may be found in the case of the trainable-thrown attack. Here the quantities of primary interest are projector bearing order $cBgr$ and advance range $R2$. Expressions for these quantities were found in Equations 32-37 by solving the triangle in FIGURE 65, shown in enlarged form in FIGURE 66, which has $R2$ for its hypotenuse, a length of own ship's track for its horizontal base line, and $360°-cBgr$ as the angle included between them. The velocity component imparted by own ship's motion to a projectile produces a component of travel of the projectile $SoTf$, or own ship's speed by the time of flight of the projectile, in a direction parallel to own ship's track, which must be taken into account in computing both advance range and projector bearing order. Advance range, $R2$, is shown in FIGS. 65 and 66 as a dotted line from the projector to a point separated from the position the target will occupy at the time of explosion by the distance $SoTf$. The projector bearing order computed by the attack director to train the projector upon this point is $cBgr$. When the projectile is so directed, its travel along $R2$, plus the displacement component $SoTf$ imparted by the motion of own ship, will cause the projectile to arrive at point E and sink to meet the target at the anticipated time of explosion.

COMPUTING PROJECTOR BEARING ORDER cBgr

The trigonometric relations involved in the advance range and projector bearing order triangle were developed above in deriving Equations 34 and 37. The method of solving the equations is similar to that used in the stern-dropped and fixed ahead-thrown attack solutions. The $R2$ triangle is solved on the basis of two sets of data. One expression for $R2$ is found from known accurate information supplied by the instruments of own ship as to its course and speed. A second expression for $R2$ is found in terms of components of target course and speed accurately measured by sonar observations, together with computations based on hypothetical values of target course and speed. The two expressions are equated and values are inserted in a servo loop to arrive at a balanced state. When balanced, the correct values must have been inserted for the projector bearing order and the advance range, and are registered on appropriate instruments.

MECHANISM FOR COMPUTING PROJECTOR BEARING ORDER

The Equation 34 which was derived above for the computation of $cBgr$ may be transposed and rewritten in a form which follows the method of solution actually used in the computer after the constants are inserted:

$$[cRhq \sin(360° - Brq) - S \sin(Brq - 180° - A)\\(Tg+Tf+Td)] \cos(360° - cBgr) - [S \cos(Brq\\-180° - A)(Tg+Tf+Td) + cRhq \cos(360° - Brq)\\-(So[Tg+Tf]+P)] \sin(360° - cBgr) = 0 \quad (44)$$

The quantity $Tg+Tf$ (trainable) is entered, together with $Hq$ and $Sd$ (trainable), from which $Td$ is found. Target depth, $Hq$, obtained from sonar gear or estimated by the operator, is set in thru the target depth knob 25, just as in the case of a stern-dropped attack, within the range permitted by a limit stop 666. Limit stop 666 prevents values in excess of 1200 feet from being applied thru broken shaft G and the rear portion of broken shaft T to multiplier 667, where it is combined with the sinking rate $Sd$ for trainable weapons. Sinking rate, $Sd$, is entered thru sinking rate (trainable) knob 40 between limits of 20 and 50 feet per second, as controlled by limit stop 668; it is displayed on the sinking rate (trainable) dial 41. Dial 41 is calibrated, as was said above, so that the value actually entered mechanically thru broken shaft I in multiplier 667 is the reciprocal of the sinking rate. Sinking time, or target depth divided by sinking rate, may thus be found by multiplier 667 as a product. This product may be read on an internal $Td$ dial 669, used for calibrating purposes only, against an index mark on the answer arm of multiplier 667. This answer arm is pivotally connected to linkage differential 670, where the sinking time is added to $Tg+Tf$.

Dead time plus time of flight for trainable projector attacks is inserted by means of knob 30 between zero and 25 seconds, as controlled by a limit stop 671, and is displayed on $Tg+Tf$ (trainable) dial 31. In the event that a weapon trainable in elevation as well as in azimuth is employed, a servo loop might be used at this point to introduce $Tf$ values proper for the different ranges resulting from the changes in the angle of elevation. The $Tg+Tf$ value is inserted thru broken shaft E in a multiplier 672 thru rack and pinion 672A. In multiplier 672 its product by own ship's speed $So$ from link 409 thru broken shaft M, is to be found. The value of $So$ is passed from FIG. 39A to FIG. 39B thru the broken line indicated by the circled numerals 2. The products $So(Tg+Tf)$ will be utilized as below. The $Tg+Tf$ value is also added to $Td$ in linkage differential 670 to give $Tg+Tf+Td$, dead time plus time of flight plus sinking time, which in turn is forwarded thru intermediate idler 670A and linkages 670B for use in multipliers 673 and 674.

Parallax $P$ is normally a positive factor in trainable-thrown attacks, since the projector is usually located in the bow of the ship. The parallax value is inserted as a rotation thru parallax (trainable) knob 35, between 50 yards forward and 100 yards aft, as determined by a limit stop 675, and is displayed on parallax trainable dial 36. The parallax value, passed as a rotation thru broken shaft F to the rear of the section, is converted to a displacement by means of rack and pinion 676A, and inserted in a linkage differential 676. In differential 676 it is added to $So(Tg+Tf)$ from multiplier 672, giving the factor $So(Tg+Tf)+P$ in Equation 44.

The remaining values necessary for the solution of the trainable-thrown attack problem are identical with those in the stern-dropped and fixed ahead-thrown attacks. The product $cRhq \cos(360° - Brq)$, the output of multiplier 636, is passed from FIG. 39A to FIG. 39B thru the broken lead indicated by the circled numerals 6. In FIGS. 37 and 38, it is shown as applied thru broken shaft W and intermediate linkage 633 to a subtractive linkage differential 677. The product of $cRhq$ and $\sin(360° - Brq)$ obtained in multiplier 635 is passed from FIG. 39A to FIG. 39B thru the broken lead indicated by circled numerals 5, and inserted in linkage differential 678 thru broken shaft X and intermediate linkage 683.

The product of target speed and $\sin(Brq - 180° - A)$ found in multiplier 641, is passed thru rod and crank 648 and shaft Y to the rear of the section where it is entered into multiplier 673. The path from FIG. 39A to FIG. 39B is thru the broken lead indicated by the circled numerals 3. The product of target speed and $\cos(Brq - 180° - A)$ found in multiplier 642 is passed thru rod and crank 649 and shaft O to the rear of the section where it is inserted in multiplier 674. The path from FIG. 39A to FIG. 39B is thru the broken lead indicated by the circled numerals 4. $So(Tg+Tf)$ from multiplier 672 is added to the parallax in linkage differential 676, and the sum is inserted thru a pivotal connection in the subtractive linkage differential 677. $So(Tg+Tf)+P$ is there subtracted from $cRhq \cos(360° - Brq)$, received thru broken shaft W and linkage 633, to give a value for entry thru output link 677A in the additive linkage differential 679.

In multiplier 674 the product of $S \cos(Brq - 180° - A)$ received from multiplier 642 thru linkage 649 and broken shaft O is multiplied by $Tg+Tf+Td$ from additive linkage differential 670, received thru linkages 670A and 670B and a cross link 673A. The output product of multiplier 674 will be seen to represent the component parallel to own ship's track of target travel to the explosion point E.

The difference is next found in linkage differential 677 between $cRhq \cos(360° - Brq)$ and $So(Tg+Tf)+P$. The value $cRhq \cos(360° - Brq)$ received thru linkage 633 represents the component parallel to ship's track of the initial position of own ship relative to the target. $So(Tg+Tf)+P$ from differential 676 is the algebraic sum of all components along ship's track except the base of the R2 triangle, $R2 \cos(360° - cBgr)$. The component found above in multiplier 674 is then forwarded thru answer arm linkage 674A to an additive linkage differential 679. At the same time, the component represented by the difference obtained in differential 677 is forwarded thru a link 677A to the differential 679.

The output of differential 679 is the sum of these components and is applied thru output linkages 679A and 679B and a member 679C to a multiplier 680. There its product by $\sin(360° - cBgr)$ received from sine mechanism 689 thru linkage 689A will be found to complete Equation 44. The output of multiplier 680 will then be applied thru arm 680A to the subtractive linkage differential 681 in which the $cBgr$ balance will be obtained at pivot point 681A. The output of differential 679 is also applied to multiplier 682 thru member 679C for use in solving for R2.

Simultaneously with the computations being performed above for the quantity bracketed on the right, the quantity bracketed on the left in Equation 44 is being found. Multiplier 635 supplies $cRhq \sin(360° - Brq)$ thru broken shaft X and intermediate linkage 683 to a subtractive linkage differential 678 as described above. The product of $S \sin(Brq - 180° - A)$ from multiplier 641 thru input rod 648 and broken shaft Y, and the quantity $Tg+Tf+Td$ from linkage differential 670 thru linkages 670A and 670B is obtained in multiplier 673. This product is then subtracted from $cRhq \sin(360° - Brq)$ in linkage differential 678. The output of multiplier 641 passes from FIG. 39A to FIG. 39B thru the broken lead indicated by circled numerals 3. It will be seen that the output of subtractive differential 678 thru rod 678A and cross-tie link 678B then represents the short side of the R2 triangle, or $R2 \sin(360° - cBgr)$. The product of the short side of the triangle, $R2 \sin (360° - cBgr)$, by $\cos (360° - cBgr)$ will be found in multiplier 684, and applied to the $cBgq$ balancing linkage differential 681. The output of differential 678 will also be applied thru the cross-tie link 678B to multiplier 685 for use in solving for R2.

Referring now to FIG. 65, it may be seen that the product last found in multiplier 684, or the short side of the R2 triangle times the cosine of the angle $(360° - cBgr)$, represents a perpendicular dropped from point "A," the 90° corner of the triangle, to the hypotenuse R2, the point of intersection being marked as "B." It will be seen that the output of multiplier 680, the product of the long leg of the R2 triangle times $\sin (360° - cBgr)$ is also equal to the same perpendicular AB to R2. Since both inputs to linkage differential 681 are equal to the same quantity, we may subtract one from the other, and when the output is zero, the proper value of the only remaining unknown $(360° - cBgr)$ or projector bearing order, will have been found. The proper relation between $cBgr$ and $(360° - cBgr)$ is obtained in the instrument by simple adjustments of the settings of the sine and cosine mechanisms 688 and 689.

The method used to find the unknown $cBgr$ is the same as that used above to get $jCo$. The output of balancing differential 681 to a $cBgr$ balancing integrator servo loop 730 is applied from the balance point pivot 681A thru $cBgr$ output linkage 686 fed by an idler lever 687. The $cBgr$ output positions the ball carriage 731 of the integrator 734. The integrator disk 732 may conveniently be driven by the same $Tud$ motor 706 used in loop 704. Integrator 735 is biased, as explained in connection with the $Tud$ integrator, so that when zeroed, the rotation of cylinder 735 is balanced out in differential 736, which will then return no rotational value thru $cBgr$ output gearing 737 to Section VI. When a state of unbalance exists at pivot point 681A, whatever additional output is produced due to the further displacement of the integrator ball carriage 731 will return a rotation thru gearing 737 to cosine mechanism 688 and sine mechanism 689. It is there converted to $\cos (360° - cBgr)$ and $\sin (360° - cBgr)$ for application to multipliers 684 and 680, respectively. Here it will correct the output products to restore the linkage differential balance point 681A to a condition of no output, in turn zeroing the integrator 734. The output of the differential 736, representing the value required to restore integrator 734 to zeroed position, will be $cBgr$, which is transmitted thru suitable gearing 739 to low-speed projector bearing order dial 49, and thru gearing 742 to high-speed dial 50, for display. It is also applied to low-speed synchro generator 740 and to high-speed synchro generator 744, where it will be converted to electrical signals for use in other fire control equipment.

COMPUTING ADVANCE RANGE R2

It remains to obtain the advance range R2, which is found as a displacement in additive linkage differential 690. It is converted to rotary motion in an R2 integrator servo loop 750 for convenience in display and in the production of electrical R2 signals. Integrator 751 has its disk 752 driven from the motor 724 of the $jCo$ servo balancing loop 720. This motor 724 also inserts time in differential 754. The biased output from cylinder 755 is fed thru friction drive 758 to the other side of the differential 754, the arrangement being similar to those described above. The output of differential 754 will be fed, within the range permitted by limit stop 759, to advance range dial 47 for display, and to synchro generator 757, where electrical signals for transmission to other fire control equipment will be produced. The limit stop 759 prevents data in excess of 1500 yards from being transmitted.

Equation 37 derived above for the computation of advance range R2 may be transposed and rewritten to parallel the steps actually used in its solution in the computer:

$$[S \cos (Brq - 180° - A)(Tg + Tf + Td) + cRhq \cos (360° - Brq) - (So[Tf + Tg] + P)] \cos (360° - cBgr) + [cRhq \sin (360° - Brq) - S \sin (Brq - 180° - A)(Tg + Tf + Td] \sin (360° - cBgr) = R2 \quad (45)$$

The bracketed expression on the left of Equation 45 will be seen to represent the component along own ship's track of R2, and its product by $\cos (360° - cBgr)$ to be that portion of R2 lying to the left of the perpendicular AB to R2 from the intersection at A, or R2L. $\cos (360° - cBgr)$ is transmitted from cosine mechanism 688 to multiplier 684 and is also applied thru a linkage 684A to multiplier 682; the product obtained in multiplier 682, or R2L, is applied to the additive linkage differential 690.

The bracketed expression on the right in Equation 45 will be seen to represent the component normal to own ship's track of Rq, and its product by $\sin (360° - cBgr)$ to be that portion of R2 lying to the right of the intersection of perpendicular AB with Rq, or R2R. $\sin (360° - cBgr)$ is transmitted from sine mechanism 689 thru a linkage 689A to multiplier 680, and is also transmitted thru cross link 680B to multiplier 685. In multiplier 685 the product, equal to R2R, is obtained, and transmitted to the linkage differential 690 thru links 685A.

The output of lever differential 690, physically represented by lateral displacement of pivot 691, is thus R2. On the pivot 691 is mounted one end of a subtractive linkage differential 692, which receives R2 directly and acts as the balancing element for servo loop 750. The actual balance point on linkage 692 is at pivot 693, which controls the loop thru an idler lever 695 mounted also on a fixed pivot 696. Idler lever 695 has one end connected to pivot 693; its other end is connected by answer arm linkage 697 to the ball carriage 756. A displacement R2 value applied thru pivot 693 moves answer arm linkage 697. A rotational output from differential 754 results, which will register on range dial 47, and produce electrical range signals from synchro generator 757. This rotational output is also fed thru gearing 761 to a rack and pinion 762, which reconverts it to a displacement for return thru R2 balancing return rod 764 to the linkage differential 692. Displacing the end of differential 692 in the proper direction returns pivot point 693 to its original position, in turn zeroing the integrator. The magnitude of the rotational output from differential 754 required to zero the integrator is thus proportional to R2.

All factors necessary for carrying out an attack with a trainable weapon have now been obtained. When the weapon has been trained to the proper $cBgr$, the operator gives the firing signal as soon as the advance range closes to the distance the weapon is capable of reaching.

ABBREVIATIONS AND SYMBOLS

| | |
|---|---|
| $c$ | Quantity modifier. |
| $d$ | Quantity modifier. |
| $j$ | Quantity modifier. |
| $\Delta$ | Quantity modifier. |
| $A$ | Target angle. |
| $Bgr$ | Relative projector bearing. |
| $cBgr$ | Generated projector bearing order. |
| $Bq$ | True sonar bearing. |
| $cBq$ | Generated true sonar bearing. |
| $dBq$ | True sonar bearing rate. |
| $Brq$ | Relative sonar bearing. |
| $Brq - 180° - A$ | Angle between tracks of target and own ship. |
| $cBrq$ | Generated relative sonar bearing. |
| $\Delta cBrq$ | Increments of generated relative sonar bearing |
| $C$ | Target course. |
| $jC$ | Target turn. |
| $Co$ | Own ship's course. |

| | |
|---|---|
| cCo | Own ship's course order. |
| jCo | Own ship's course correction. |
| E | Predicted explosion point, projected to surface. |
| Eq | Sonar depression angle. |
| F | Actual explosion point, projected to surface. |
| Hq | Target depth. |
| P | Parallax for fixed ahead-thrown and trainable-thrown attacks. |
| P1 | Parallax for stern-dropped attacks. |
| Re | Effective range. |
| Rq | Advance range. |
| cRhq | Generated horizontal range. |
| ΔcRhq | Increments of generated horizontal range. |
| dRhq | Horizontal range rate. |
| Rhu | Horizontal range to a point E directly above the theoretical explosion point. |
| Rq | Sonar range. |
| jRq | Generated sonar range correction. |
| Rqj | Manual sonar range correction. |
| S | Target speed. |
| Sd | Sinking speed. |
| So | Own ship's speed. |
| t | Time. |
| Td | Sinking time. |
| Tf | Time of flight. |
| Tg | Dead time (lag between pushing buttons and actual firing.) |
| Tu | Time to explosion. |
| Tud | Time remaining to fire. |
| Xo | Component of own ship's velocity across line of sound. |
| Xt | Component of target velocity across line of sound. |
| jXt | Generated correction to Xt. |
| Yo | Component of own ship's velocity along line of sound. |
| Yt | Component of target velocity along line of sound. |
| jYt | Generated correction to Yt. |

We claim:

1. In a device for determining the horizontal range from a vessel to a submerged target, means for obtaining a rotary motion representative of the direct distance from said vessel to said target, means for providing a value representing the sine function of the angle of depression of the submerged target relative to the attacking vessel, means responsive to the rotary motion representing the direct distance from the vessel to the target and to the sine function of the angle of depression for multiplying the direct distance from said vessel to said target by the sine function of the angle of depression to obtain a product equal to the depth of said target, means responsive to the sine function of the angle depression for converting the sine function of the angle of depression to the tangent function of half the said angle, means responsive to the target depth and the tangent function for obtaining the linear product of target depth and said tangent function, means including an integrator loop responsive to said linear product for converting said linear product to a rotary motion representative of the product of target depth and said tangent function and for determining when said rotary motion has become proportional to said linear product, and means responsive to the difference between said rotary motion representative of the product of target depth and said tangent function of the angle of depression and said rotary motion representative of the direct distance from said vessel to said target to obtain a rotational output representative of the horizontal range.

2. In an attack director having means adapted to receive target range and bearing information relative to own ship from position-finding gear on own ship having a horizontal range computing section and a target bearing computing section, means for continuously computing the movements of the target when such information is not being received by the director, comprising means for storing information representing the last measurements of horizontal range and target bearing, means responsive to the last measurements of horizontal range for computing continuously the integral of the rate of change of horizontal range last found while such information was being received, means for retaining the last measurements of target range, means for providing signal indications representing target range and the angle of target depression of the target relative to own ship, means responsive to the signal indications representing target range and the angle of target depression for obtaining the product of the target depth and the tangent of half the angle of target depression, means responsive to the integral and the product for obtaining the difference between said integral and said product, means responsive to said difference value for returning said difference to said horizontal range computing section as an input value, and means responsive to said difference value and said retained value of target range for combining these values to obtain the computed values of target range.

3. In a device for determining the position and movements of a target relative to an attacking ship, means for obtaining corrected values of target angle, comprising an integrator servo loop having an integrator, a constant speed motor arranged to drive said integrator, a balancing element arranged to control the output of said integrator, means for inserting values representing a correction vector across the target track into one side of said balancing element, and means for introducing the product of target speed and an unknown target angle increment into the other side of said balancing element whereby said constant speed motor will continue to drive into said loop incremental target angle values until a balance is reached.

4. In a device for computing information as to the movements and position of a target relative to an attacking vessel, means responsive to the position and movement of the target for computing continuously changes in the position of the target along and across a line of sound between said attacking vessel and said target, means responsive to the computed changes in the position of the target for cyclically converting said changes in position to values representing rates of change of position of the target along and across the said line of sound; means for indicating the angle formed by the direction of movement of the target and a line between the attacking vessel and the target, means responsive to the target angle for obtaining the sine and cosine functions of the angle of the target relative to the said line of sound, means responsive to the cross-products of said sine and cosine functions and said values representing rates of change of target position along and across said line of sound to determine velocity components representing target motion along and across the track of said target, means responsive to said velocity components to determine corrected values of target angle and speed, and means responsive to said corrected values of target angle and speed to determine continuously the rates of change of target position along the line of sound.

5. In an attack director arranged to compute the movements and position of a target relative to an attacking vessel, means arranged for cyclically dividing by time incremental positional changes of the target relative to a line of sound between said attacking vessel and said target, comprising means for receiving successive values of coordinates representing the position of said target relative to said line of sound, means for determining the difference between each particular one of said values and the value last preceding, comprising a servo loop having an integrator, a differential, a time motor, means for determining the direction of rotation of said time motor, means for controlling transmission of rotation from said motor to said integrator, means for energizing said motor, means for holding said motor in an energized condition, means for stopping application of rotation to said control means when at a desired point, means for restoring said integrator to zero position after each cyclical operation, means for applying the difference between said successive values to said control means, and means for furnishing the actual rotation of said time rotor as an output value.

6. Apparatus on own ship for computing the speed of a target, including, means for providing a value representing a bearing angle between a fixed direction such as north and a line of sound between own ship and target, means including a servo loop and an integrator in the loop for providing values representing increments in the bearing angle, differential means for combining the values of the bearing angle and the increments in the bearing angle to obtain values representing corrections in the bearing angle, means for providing values representing target range and target depth, means including at least one servo loop for combining the values representing target range and target depth to obtain values representing horizontal range to the target, means including an integrator for combining the values representing horizontal range and corrections in the bearing angle to obtain values representing corrections in the displacement of the target across the line of sound, means for using the values representing horizontal range to obtain values representing corrections in the displacement of the target along the line of sound, and means including at least one integrator for using the last two mentioned values to obtain values representing the speed of the target.

7. Apparatus as set forth in claim 6 for computing the speed of a target, including, means for adjusting the values representing the speed of the target in accordance with movements of the target in a curved path.

8. Apparatus on own ship for computing the speed of a target, including, means for providing values representing target bearing, means including a servo loop and an integrator in the loop for providing values representing increments in target bearing, differential means for combining the last two quantities to produce values representing corrections in target bearing, means for providing values representing target range and target depth, means including at least one servo loop and an integrator in the loop for combining the values representing target range and target depth to produce values representing the horizontal range between own ship and the target, means including an integrator for combining the values representing horizontal range and corrections in target bearing to produce values representing the displacement of the target across a line of sound between own ship and the target, differential means for using the values representing horizontal range to produce values representing the displacement of the target along the line of sound, means for converting the displacement of the target along and across the line of sound into corresponding target speeds in these directions, means for providing values representing the angle between the target course and the line of sound and for converting the values representing the target angle into values representing the trigonometric functions of the angle, and means including at least one integrator for combining the values representing the trigonometric functions of the target angle and target speeds along and across the line of sound to produce values representing the target speed.

9. Apparatus on own ship for computing a target angle defined by the course of a target and a line of sound between own ship and the target, including means for providing values representing the speed of the target along and across the line of sound, means for providing values representing the target angle, means responsive to the values representing the target angle for converting the target angle to values representing particular trigonometric functions of the target angle, means including a first pair of integrators and a differential responsive to the values representing the components of target speed and the particular trigonometric functions of the target angle for combining these values to produce values representing the target speed, means including a second pair of integrators and a differential responsive to the values representing the target speed and the components of target speed and the particular trigonometric functions of the target angle for combining these values to produce values representing corrections in the target angle, means for providing values representing the target bearing, and differential means responsive to the values representing the target bearing and the corrections in the target angle for combining these values to produce values representing the target angle.

10. Apparatus on own ship for computing a target angle defined by the course of a target and a line of sound between own ship and the target, including means for providing values representing the speed of the target along the line of sound, means for providing values representing the speed of the target across the line of sound, means for providing values representing the target angle means responsive to the values representing target angle for converting these values to values representing particular trigonometric functions of the target angle, means including first integrators and differentials responsive to the target speeds along and across the line of sound and the particular trigonometric functions of the target angle for combining these values to produce values representing the target speed, means including second integrators and differentials responsive to the target speed and the components of the target speeds along and across the line of sound and the particular trigonometric functions of the target angle for combining these values to produce values representing corrections in the target angle, and means responsive to the values representing corrections in the target angle to produce values representing the target angle.

11. Apparatus for computing the range of a target relative to own ship in the absence of current information as to movements of the target, including, means for providing values representing target range and target depth, means including at least one integrator and one servo loop responsive to the values representing target range and target depth for combining these values to produce values representing the product of the target depth and a particular trigonometric function of an angle representing target depression, means responsive to the values representing the last mentioned product and target range for combining these values to produce values representing horizontal target range, means for providing values representing own ship's speed, means responsive to the values representing own ship's speed for converting these values to values representing the component of own ship's speed along a line of sound between own ship and the target, means including a plurality of interrelated servo loops and integrators for providing values representing the target speed and the target angle between the line of sound and the target course, means responsive to the values representing the target angle for providing values representing a particular trigonometric function of the target angle, means including a multiplier responsive to the values representing the particular trigonometric function of the target angle and the values representing target speed for combining these values to obtain values representing the component of the target speed along the line of sound, means including an integrator responsive to the values representing the target speed along the line of sound and own ship's speed along the line of sound for combining these values to obtain values representing incremental changes in horizontal target range, and differential means responsive to the values representing horizontal target range and incremental changes in the horizontal target range for combining these values to obtain new values representing the horizontal target range.

12. Apparatus for computing the range of a target relative to own ship in the absence of current information as to movements of the target, including, means for providing values representing corrections in the horizontal range between own ship and the target, means including an integrator for converting the last mentioned values into values representing incremental changes in the horizontal range, means for providing values representing the target range and the target depth, means including a servo loop responsive to the values representing the target range and the target depth for combining these values to produce values having a particular relationship to an angle of target depression, means including a servo loop responsive to the values related to the angle of target depression for converting these values to values representing a particular trigonometric function of a particular fraction of the angle of depression, means responsive to the values representing the particular trigonometric function and the values representing target depth for combining these values to obtain values representing the product, and means responsive to the values representing the last mentioned product and the values representing corrections in the horizontal range for combining these values to obtain values representing incremental changes in the horizontal target range.

13. Apparatus for computing the bearing of a line of sound between own ship and a target relative to own ship's course in the absence of current information as to movements of said target, including, means for providing values of the relative bearing between own ship's course and target course, means responsive to the values representing relative bearing for converting these values into values representing particular trigonometric functions of these values, means for providing values representing own ship's speed, means including multipliers responsive to the values representing own ship's speed and the particular trigonometric function of relative bearing for combining these values to obtain values representing the component of own ship's speed across the line of sound between own ship and the target, means including a plurality of interrelated servo loops and integrators for providing values representing the target speed and the target angle between the line of sound and target course, means including multipliers responsive to the values representing the target angle for converting these values into values representing a particular trigonometric function of the target angle, means responsive to the values representing the particular trigonometric function of the target angle and representing the target speed for combining these values to obtain values representing the component of the target speed across the line of sound, subtracting means responsive to the values representing the components of own ship's speed and target speed across the line of sound for obtaining the difference between these values, means for providing values representing target range and target depth, means including at least one servo loop and integrators in the loop and responsive to the values representing target range and target depth for combining these values to obtain values representing corrections in the horizontal target range, means including a servo loop and an integrator responsive to the values representing corrections in the target range and the difference between own ship's speed and target speed across the line of sound for combining these values to obtain values representing increments in a bearing angle between the line of sound and a reference direction, means responsive to the increments in the bearing angle for converting these increments into values representing increments in the relative bearing between the line of sound and own ship's course, and means responsive to the increments in the relative bearing between the line of sound and own ship's course for determining such relative bearing.

14. Apparatus for computing the bearing of a line of sound between own ship and a target relative to own ship's course in the absence of current information as to movements of said target, including, means for providing values representing the horizontal displacement of the target along the line of sound, means responsive to the last mentioned values for converting these values into values representing corrections in the horizontal displacement, means for providing values representing the bearing angle formed between the line of sound and a fixed direction such as true north, means responsive to the last mentioned values for converting these values into values representing corrections in the bearing angle, means including an integrator responsive to the values representing the horizontal displacement and corrections in the bearing angle for combining these values to obtain values representing corrections in the displacement of the target across the line of sound, means including a first servo loop and timing mechanisms in the loop responsive to the values representing the corrections in the displacement of the target along the line of sound for converting these values into values representing corrections in the target speed along the line of sound, means including a second servo loop and timing mechanisms in the loop responsive to the corrections in the displacement of the target across the line of sound for converting these values into values representing corrections in the target speed across the line of sound, means for providing values representing a target angle between the line of sound and the target course, means including integrators responsive to the values representing the target angle for converting these values into values representing particular trigonometric functions of this angle, means responsive to the values representing the particular trigonometric functions and the corrections in the target speed along and across the line of sight for combining these values to obtain values representing the speed of the target, means including multipliers responsive to the values representing the speed of the target and the target angle for combining these values to obtain vectorial components of target speed across the line of sight, means for providing vectorial components of own ship's speed across the line of sound, means including at least one integrator, one difference member and one multiplier responsive to the values of own ship's speed and target speed for combining these values to obtain a difference value, means responsive to the last mentioned difference value the time integral of this difference, means responsive to the values representing the last mentioned time integral and representing the distance of the line of sound for combining the values to obtain values representing changes in the bearing of the line of sound, means responsive to the values representing changes in the bearing of the line of sound for converting these values into values representing changes in the bearing of the line of sound relative to own ship's course, and means responsive to increments in the bearing of the line of sound relative to own ship's course for combining such increments to produce values representing the bearing of the line of sound relative to own ship's course.

15. Apparatus for continuously computing the bearing of a line of sound between own ship and target relative to own ship's course in the absence of current information as to movements of said target, including, means for providing values representing bearing angle between a fixed direction such as north and the line of sound between own ship and target, means for providing values representing increments in the bearing angle, differential means responsive to the values of the bearing angle and the increments in the bearing angle for combining these values to obtain values representing corrections in the bearing angle, means for providing values representing target range and target depth, means responsive to the value representing target range and target depth for combining these values to obtain values representing horizontal range to the target, means including an integrator responsive to the values representing horizontal range and corrections in the bearing angle for combining these values to obtain values representing corrections in the displacement of the target across the line of sound, means including a servo loop and an integrator in the servo loop responsive to the values representing corrections in the displacement of the target across the line of sound for converting these values into values representing target speed across the line of sound, means for providing values representing own ship's speed across the line of sound, means including a servo loop and an integrator in the servo loop responsive to the values representing own ship's speed, target speed and horizontal range for combining these values to obtain values representing increments in the bearing angle, means for providing values of own ship's course, differential means responsive to the values representing own ship's speed and the increments in the bearing angle for combining these values to obtain values representing increments in the relative bearing between own ship's course and the line of sound, and means responsive to the values representing the increments in the relative bearing between the line of sound and own ship's course for combining these values to obtain values representing the relative bearing angle between the line of sound and own ship's course.

16. Apparatus for continuously computing the bearing of a line of sound between own ship and a target relative to own ship's course in the absence of current information as to movements of said target, including, means for providing values representing target bearing, means responsive to the values representing target bearing for converting these values into values representing corrections in the target bearing, means for providing values representing target range and target depth, means including at least one servo loop responsive to the values representing target range and target depth for combining these values to produce values representing the horizontal component of target range, means including an integrator responsive to the values representing the horizontal component of target range and the corrections in the target bearing for combining these values to produce values representing the displacement of the target across the line of sound between own ship and the target, means including at least one servo loop and at least one timing member responsive to the values representing the displacements of the target across the line of sound for converting these values into values representing corresponding target speeds across the line of sound, means for providing values representing own ship's speed across the line of sound, and means including a servo loop and an integrator in the loop responsive to the values of own ship's speed across the line of sound, target speed bearing of the line of sound relative to own ship's course, and means responsive to the values representing the incremental changes in the bearing of the line of sound relative to own ship's course for combining these values to obtain values representing such relative bearing and horizontal range for combining these values to produce values representing incremental changes in the relative target bearing.

17. Apparatus for determining the corrections in own ship's course to move the ship into position for firing a projectile accurately at a submerged target, including, means for providing values representing the relative bearing angle defined by own ship's course and a line of sound between own ship and the target, means responsive to the last mentioned values for combining these values to compute values representing particular trigonometric functions of a first angle related to the relative bearing angle, differential means responsive to the values representing own ship's course and the relative bearing angle for combining these values to produce values representing the target angle between the line of sound and the target course, means including differential means responsive to the values representing the relative bearing angle and the target angle for combining these values to produce values representing the difference in the angles, means responsive to the values representing the last mentioned difference for converting these difference values into values representing particular trigonometric functions of these difference angles, means for providing values representing target range and target depth, means including at least one servo loop and an integrator in the loop and responsive to the values representing target range and target range for combining these values to compute values representing the horizontal target range, means including at least one servo responsive to the values representing target angle and horizontal range for combining these values to compute values representing target speed, means including a first plurality of adding, subtracting and multiplying members responsive to the values representing the horizontal range, target speed and the particular trigonometric functions of the first angle and the difference angles for combining these values to compute values representing the time remaining until the explosion of the projectile against the target, and means including a second plurality of adding, subtracting and multiplying members responsive to the values representing the horizontal range, target speed, the particular trigonometric functions and the time until explosion of the first angle and the difference angles for combining these values to compute values representing corrections in own ship's course 18. Apparatus for determining the corrections in own ship's course to move the ship into position for firing a projectile accurately at a submerged target, including, means for obtaining values representing trigonometric functions of first angles related to the relative bearing angle defined by own ship's course and a line of sound between own ship and the target, differential means responsive to the values representing own ship's course and the relative bearing angle for combining these values to produce values representing the target angle between the line of sound and the target course, means including differential means responsive to the values representing the relative bearing angle and the target angle for combining these values to produce values representing a difference between the angles, means responsive to the last mentioned difference values for converting these values into values representing particular trigonometric functions of the difference angles, means for providing values representing target range and target depth, means including a servo loop responsive to the values representing target range and target depth for combining these values to obtain values representing the horizontal range to the target, means responsive to the values representing horizontal range and the particular trigonometric functions of the first angles for combining these values to obtain first control values representing the product of horizontal range and the particular trigonometric functions, means for determining the values of target speed along and across the line of sound, means responsive to the values of target speed along and across the line of sound and the values representing target angle for combining these to obtain values representing target speed, means responsive to the values representing target speed and the particular trigonometric functions of the difference angles for combining these values to obtain second control values representing the product of target speed and the particular trigonometric functions, and means including adding and subtracting members responsive to the first and second control values for combining these values to obtain values representing corrections in own ship's course.

19. Apparatus for determining the corrections in own ship's course to move the ship into position for firing a projectile accurately at a submerged target, including, means for providing values representing the relative bearing angle defined by own ship's course and a line of sound between own ship and the target, means responsive to the values representing the relative bearing angle for converting these values into values representing particular trigonometric functions of first angles having a particular relationship to the relative bearing angle, means for providing values representing the horizontal range to the target, means responsive to the values representing horizontal range and the particular trigonometric functions of the first angles for combining these values to obtain first control values representing the product of the horizontal range and the particular trigonometric functions, means including at least one servo loop responsive to the values representing horizontal range and relative bearing angle for combining these values to obtain values representing target speed, means including differential means responsive to the values representing relative bearing angle for converting these values into values representing particular trigonometric functions of second angles having a particular relationships to the relative bearing angle, means responsive to the values representing target speed and the particular trigonometric functions of the second angles for combining these values to obtain second control values representing the product of target speed and the particular trigonometric functions, and means including adding and subtracting members responsive to the first and second control values for combining these values to obtain values representing corrections in own ship's course.

20. Apparatus as set forth in claim 19, including, means responsive to any movements of the target from a substantially fixed course for adjusting the values representing the corrections in own ship's course in accordance with such movements of the target.

21. Apparatus for determining the corrections in own ship's course to move the ship into position for firing a projectile accurately at a submerged target, including, means for providing values representing the relative bearing angle defined by own ship's course and a line of sound between own ship and the target, means responsive to the values representing relative bearing angle for converting these values into values representing particular trigonometric functions of a first angle having a particular relationship to the relative bearing angle, differential means responsive to the values representing own ship's course and the relative bearing angle for combining these values to produce values representing the target angle between the line of sound and target course, means including differential means for producing values representing angles having a particular relationship to the difference between the relative bearing angle and the target angle, means responsive to the difference values for converting these differences into particular trigonometric functions of a second angle, means for providing values representing target range and target depth, means including at least one servo loop responsive to the values representing target range and target depth for combining these values to produce values representing horizontal target range, means including at least one servo loop responsive to the values representing target angle and horizontal range for combining these values to produce values representing target speed, means including a first plurality of adding, subtracting and multiplying members responsive to the values representing horizontal range, target speed and the particular trigonometric functions of the first and second angles for combining these values to produce values representing the time remaining until the explosion of the projectile against the target ship, means for providing values representing angles of corrections to own ship's course, means responsive to the values representing the angles of corrections to own ship's course for converting these values into values representing particular trigonometric functions of these angles, means including a second plurality of multiplying, adding and substracting members responsive to the values representing horizontal range, target speed, time until explosion and the particular trigonometric functions of the first and second angles and of the angles of correction to own ship's course for combining these values to produce error values, and means including a servo lop responsive to the error values to adjust the values responsenting the angles of corrections to own ship's course in a direction to minimize the error values.

22. Apparatus for determining the corrections in own ship's course to move the ship into position for firing a projectile accurately at a submerged target, including, means for providing values responsenting the relative bearing angle defined by own ship's course and a line of sound between own ship and the target, means responsive to the values representing the relative bearing angle for converting these values to values representing particular trigonometric functions of a first angle having a particular relationship to the relative bearing angle, means including differential means responsive to the values representing relative bearing angle for converting these values into values representing particular trigonometric functions of second angles having a particular relationship to the relative bearing angle, means for providing values representing horizontal target range, means including at least one servo loop responsive to the values representing relative bearing angle and horizontal range for combining these values to produce values representing target speed, means for providing values representing angles of corrections to own ship's course, means responsive to the values representing the angles of correction to own ship's course to convert these values into values representing particular trigonometric functions of these angles, means including a plurality of multiplying, adding and subtracting members responsive to the values representing horizontal range, target speed and the particular trigometric functions of the first and second angles for combining these values to produce error values, and means including a servo loop responsive to the error values to adjust the values representing the angles of corrections to own ship's course in a direction to minimize the error values.

23. Apparatus as set forth in claim 22, including means responsive to any curved paths being followed by the target and to the sharpness of such curved paths for adjusting the values representing the corrections in target course in accordance with the sharpness of such curved paths.

24. Apparatus for determining the corrections in own ship's course to move the ship into position for firing a projectile accurately at a submerged target, including, means for providing values representing target range and target depth, means including at least one servo loop responsive to the values representing target range and target depth for combining these values to produce values representing horizontal target range, means for providing values representing relative bearing angle as defined by own ship's course and a line of sound between own ship and the target means responsive to the values representing relative bearing angle for converting these values into values representing particular trigonometric functions of first angles having a particular relationship to the relative bearing angle, means responsive to the values representing horizontal range and the trigonometric functions of the first angles for combining these values to obtain first product values, means including differential means responsive to the values representing relative bearing angle and target course for combining these values to obtain values representing target angle, means responsive to the values representing the target angle and the values representing relative bearing angle for combining these values to provide values of a second angle having a particular relationship to the difference between the relative bearing angle and the target angle, means responsive to the values representing the last mentioned difference angle for converting these values into values representing particular trigonometric functions of this angle, means including at least one servo loop and an integrator in the servo loop responsive to the values representing horizontal range and the target angle for combining these values to produce values of the target speed, means including a first plurality of multiplying, adding and subtracting members responsive to the values representing horizontal range, target speed and the particular trigonometric functions of the first and second angles for combining these values to produce values representing the time remaining for explosion of the projectile on the target, means responsive to the values representing target speed, time until explosion and the particular trigonometric functions of the second angle for combining these values to obtain second product values, means including a servo loop for obtaining values representing a third angle of correction to own ship's course, means responsive to the values representing the last mentioned angle for converting these values into values representing particular trigonometric functions of the last mentioned angle, means including a second plurality of multiplying, adding and subtracting members responsive to the values representing the first and second product values and the particular trigonometric functions of the third angle for combining these values to obtain error values, and means for introducing the error values to the servo loop for adjusting the values representing angles of correction to own ship's course in a direction to minimize the error values.

25. Apparatus for determining the time to fire a projectile from own ship for striking a submerged target, including, means for providing values representing target range and target depth means including a servo responsive to the values representing target range and target depth for combining these values to produce values representing horizontal target range, means for providing values representing relative bearing angle defined by own ship's course and a line of sound between own ship and the target means responsive to the values representing relative bearing angle for converting these values into values representing particular trigonometric functions of first angles having a particular relationship to the relative bearing angle, means including differential means responsive to the values representing the relative bearing angle to produce values representing the target angle between the line of sound and the target course means responsive to the values representing the relative bearing angle and target angle for combining these values to provide values representing particular trigonometric functions of second angles having a particular relationship to differences between the relative bearing angle and target angle, means including a servo responsive to the values representing horizontal range and target angle for combining these values to produce values representing target speed, means for providing values representing time to fire, means responsive to the values representing time to fire for combining these values with values representing particular constants dependent upon the characteristics of the projectile to obtain values representing time until explosion, means for providing values representing own ship's speed, means responsive to the values representing time until explosion and own ship's speed for combining these values to obtain first control values, means including multiplying, adding and subtracting means responsive to the values representing horizontal target range, target speed, time until explosion, the first control values and the particular trigonometric functions of the first and second angles for combining these values to obtain error values, and means responsive to the error values to adjust the values representing time to fire in a direction for reducing the error values.

26. Apparatus for determining the time to fire a projectile from own ship for striking a submerged target, including, means for providing values representing horizontal target range, means for providing values representing a relative bearing angle defined by own ship's course and a line of sound between own ship and the target, means responsive to the values representing the relative bearing angle for converting these values into values representing particular trigonometric functions of first angles having a particular relationship to the relative bearing angle, means including differential means responsive to the values representing relative bearing angle for converting these values into values representing particular trigonometric functions of second angles having a particular relationship to the relative bearing angle, means including a servo loop responsive to the values representing horizontal range and the relative bearing angle for combining these values to produce values representing target speed, means for providing values representing time to fire, means responsive to the values representing time to fire for combining these values with certain values representing time constants related to the flight characteristics of the projectile to obtain values representing time until explosion, means for providing values representing own ship's speed, means responsive to the values representing time until explosion and own ship's speed for combining these values to obtain first control values, means including multiplying, adding and subtracting means responsive to the values representing horizontal target range, target speed, time until explosion, the first control values and the particular trigonometric functions of the first and second angles for combining these values to obtain error values, and means responsive to the error values to adjust the values representing time to fire in a direction for reducing the error values.

27. Apparatus for determining the time to fire a projectile from own ship for striking a submerged target, including, means for providing values representing horizontal target range, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angle, means responsive to the values representing horizontal range and the particular trigonometric function of the first angles for combining these values to obtain first product values, means including differential means responsive to the values representing relative bearing angle to obtain values representing particular trigonometric functions of second angles having a particular relationship to the relative bearing angle, means including a servo loop responsive to the values representing horizontal target range and relative bearing angle for combining these values to produce values representing target speed, means for providing values representing time to fire the projectile and representing certain constants related to the flight characteristics of the projectile, means responsive to the values representing time to fire and representing the time factors to produce values representing time until explosion, means responsive to the values representing target speed, time until explosion and the particular trigonometric functions of the second angles for combining these values to obtain second product values, means for providing values representing own ship's speed, means responsive to the values representing own ship's speed and the time until explosion for combining these values to obtain third product values, means responsive to the first, second and third product values for combining these values to obtain error values, and means including a servo loop responsive to the error values for adjusting the values representing time to fire in a direction to minimize the error values.

28. Apparatus for determining the angle at which to fire a projectile from own ship towards a moving target with a variable component transverse to the direction of own ship's movement for a trainable-thrown attack, including, means for providing values representing target range and target depth, means including a servo responsive to the values representing target range and target depth for combining these values to produce values representing horizontal target range, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angle, means including differential means responsive to the values representing relative bearing angle to compute values representing target angle between the line of sound and the target course, means responsive to the values representing relative bearing angle and target angle for combining these values to compute values representing particular trigonometric functions of second angles having a particular relationship to differences between relative bearing angle and target angle, means including at least one servo responsive to the values representing horizontal range and target for combining these values to compute values representing target speed, means for providing values representing particular time constants having a particular relationship to the flight characteristics of the projectile, means for providing values representing the angles for firing the projectile realtive to the direction of own ship's movement, means responsive to the values representing the angle of firing the missile for converting these values into values representing particular trigonometric functions of third angles having a particular relationship to the angle of firing the missile, means including multiplying, adding and subtracting means responsive to the values representing the trigonometric functions of the first, second and third angles, representing the target speed and representing the horizontal target range for combining these values to generate error values, and means including a servo loop responsive to the error values to adjust the values of the angle for firing the projectile in a direction to reduce the error values.

29. Apparatus for determining the angle at which to fire a projectile from own ship towards a moving target with a variable component transverse to the direction of own ship's movement for a trainable-thrown attack, including, means for providing values representing horizontal target range, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angle, means including differential means responsive to the values representing relative bearing angle for converting these values into values representing particular trigonometric functions of second angles having a particular relationship to the relative bearing angle, means including differential means and at least one servo loop responsive to the values representing horizontal range and relative bearing angle for combining these values to produce values representing target speed, means for providing values representing particular time constants having a particular relationship to the flight characteristics of the projectile, means for providing values representing the angles for firing the projectile relative to the direction of own ship's movement, means responsive to the values representing the angles of firing the missile for converting these values into values representing particular trigonometric functions of third angles having a particular relationship to the angles of firing the projectile, means including multiplying, adding and subtracting means and a servo loop responsive to the values representing target speed, the time constants, the horizontal target range and the particular trigonometric functions of the first, second and third angles for combining these values to generate error values, and means responsive to the error values to adjust the values of the angle for firing the projectile in a direction to reduce the error values.

30. Apparatus for determining the angle at which to fire a projectile from own ship towards a moving target with a variable component transverse to the direction of own ship's movement for a trainable-thrown attack, including, means for providing values representing relative bearing angle defined by own ship's course and a line of sound between own ship and the target, means responsive to the values representing relative bearing angle for converting these values into values representing particular trigonometric functions of a first angle having a particular relationship to the relative bearing angle, means for providing values representing target range and target depth, means including at least one servo loop and an integrator in the servo loop and responsive to the values representing target range and target depth for combining these values to produce values representing horizontal target range, means responsive to the values representing horizontal target range and the particular trigonometric functions of the first angle for combining these values to produce first and second product values, means including differential means responsive to the values representing relative bearing angle to produce values representing target angle between the line of sound and the target course, means responsive to the values representing the bearing angle and the target angle for converting these values into particular trigonometric functions of second angles having a particular relationship to the differences between the relative bearing angle and the target angle, means including at least one servo loop responsive to the values representing horizontal target range and target angle for combining these values to produce values representing target speed, means for providing values representing particular time constants having a particular relationship to the flight characteristics of the projectile, means responsive to the values representing target speed, the time factors and the particular trigonometric functions of the second angles for combining these values to obtain third and fourth product values, means for providing values representing own ship's speed, means responsive to the values representing own ship's speed and the values representing the time constants to obtain fifth product values, and means including adding and subtracting members responsive to the first, second, third, fourth and fifth product values for combining these values to obtain values representing the angle for firing the projectile relative to the direction of own ship's movement.

31. Apparatus for determining the angle at which to fire a projectile from own ship towards a moving target with a variable component transverse to the direction of own ship's movement for a trainable-thrown attack, including, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angle, means responsive to the values representing relative bearing angle to compute values representing target angle between the line of sound and the target course means responsive to the values representing the relative bearing angle and target angle for combining these values to compute particular trigonometric functions of second angles having a particular relationship to the difference between the relative bearing angle and target angle, means for providing values representing target range and target depth, means including a servo loop responsive to the values representing target range and target depth for combining these values to compute values representing horizontal target range, means including a servo loop responsive to the values representing horizontal range and target angle for combining these values to compute values representing target speed, means for providing values representing particular time factors having a particular relationship to the flight characteristics of the projectile and to the time for the projectile to sink to the target depth, means for providing values representing the angle for firing the projectile relative to the direction of own ship's movement, means responsive to the values representing the angle of firing the projectile for converting these values into values representing particular trigonometric functions of third angles having a particular relationship to the angles for firing the projectiles, means including first multiplying, adding and subtracting members responsive to the values representing target speed, horizontal target range, the time factors and the particular trigonometric functions of the first, second and third angles for combining these values to obtain first output values, means including second multiplying, adding and subtracting members responsive to the values representing own ship's speed, target speed, horizontal target range, the time factors and the particular trigonometric functions of the first, second and third angles for combining these values to obtain a second output value, means responsive to the first and second output values for comparing these values to obtain an error value, and means including a servo loop responsive to the error values and the values of the angle for firing the projectile for adjusting these values in a direction to minimize the error values.

32. Apparatus for computing the range for firing a projectile from own ship towards a target in a trainable-thrown attack at an angle with a variable component transverse to the direction of own ship's movement, including, means for providing values representing relative bearing angle between own ship's course and a line of sound between own ship and the target, means responsive to the values representing relative bearing angle for converting these values into values representing particular trigonometric functions of first angles having a particular relationship to the relative bearing angle, means including differential means responsive to the values representing relative bearing angle to compute values representing particular trigonometric functions of second angles having a particular relationship to the relative bearing angle, means for providing values representing target range and target depth, means including a servo loop responsive to the values representing target range and target depth for combining these values to compute values representing horizontal target range, means including at least one servo loop responsive to the values representing horizontal target range and relative bearing angle for combining these values to compute values representing target speed, means including a servo loop and first multiplying, adding and subtracting members responsive to the values representing target speed, horizontal target range and the particular trigonometric functions of the first and second angles for combining these values to produce values representing the angle for firing the projectile relative to the direction of own ship's movement, means responsive to the values representing the angle of firing the projectile for converting these values into values representing particular trigonometric functions of third angles having a particular relationship to the angles for firing the projectile, and means including second multiplying, adding and subtracting members responsive to the values representing target speed, horizontal target range and the particular trigonometric functions one of the first second and third angles for combining these values to produce values representing the range at which to fire the projectile.

33. Apparatus for computing the range for firing a projectile from own ship towards a target in a trainable-thrown attack and at an angle with a variable component transverse to the direction of own ship's movement, including, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angle, means including differential means responsive to the values representing relative bearing angle to compute values representing target angle between the line of sound and the target course means responsive to the values representing the relative bearing angle and the target angle for combining the values to produce values representing particular trigonometric functions of second angles having a particular relationship to the difference between the relative bearing angle and the target angle, means for providing values representing target range and target depth, means including a servo loop responsive to the values representing target range and target depth for combining these values to compute values representing horizontal target range, means including a servo loop responsive to the values representing horizontal target range and target angle for combining these values to produce values representing target speed, means for providing values representing angles for firing the projectile relative to the direction of own ship's movement, means responsive to the values representing the angles of firing the projectile to produce values representing particular trigonometric functions of the angles, means including first multiplying, adding and subtracting members responsive to the values representing target speed, horizontal target range and the particular trigonometric functions of the first and second angles and of the firing angle for combining these values to produce error values, means including a servo loop responsive to the error values to adjust the values representing the firing angle in a direction to minimize the error values, and means including second multiplying, adding and subtracting members responsive to the values representing horizontal target range, target speed and the particular trigonometric functions of the first and second angles and the firing angle for combining these values to produce values representing the range for firing the projectile.

34. Apparatus for computing the range for firing a projectile from own ship towards a target in a trainable-thrown attack and at an angle with a variable component transverse to the direction of own ship's movement, including, means for providing values representing relative bearing angle defined by own ship's course and a line of sound between own ship and the target, means responsive to the values representing relative bearing angle for converting these values into values representing particular trigonometric functions of first angles having a particular relationship to the relative bearing angles, means including differential means responsive to the values representing the relative bearing angle to compute values representing a target angle between the line of sound and the target course means responsive to the values representing relative bearing angle and target angle for combining these values to compute values representing particular trigonometric functions of second angles having a particular relationship to the difference between the relative bearing angle and the target angle, means for providing values representing target range and target depth, means including a servo loop responsive to the values representing target range and target depth for combining these values to compute values representing horizontal target range, means including at least one servo loop responsive to the values representing horizontal target range and target angle to compute values representing target speed, means for providing values representing own ship's speed, means for providing values representing particular time factors having a particular relationship to the projectile flight, means including a servo loop and first multiplying, adding and subtracting members responsive to the values representing horizontal target range, target speed, own ship's speed, the time factors and the particular trigonometric functions of the first and second angles for combining these values to produce values representing the angle for firing the projectile relative to the direction of own ship's movement, means responsive to the values representing the firing angles to produce values representing particular trigonometric functions of the angles, and means including second multiplying, adding and subtracting members responsive to the values representing horizontal target range, target speed, own ship's speed, the time factors and the particular trigonometric functions of the first and second angles and of the firing angle for combining these values to produce values representing the range at which to fire the projectile.

35. Apparatus for determining any error in firing projectiles from own ship at a target, including, means for providing values representing relative bearing angle defined by own ship's course and a line of sound betweeen own ship and the target, means responsive to the values representing relative bearing angle for converting these values into values representing particular trigonometric functions of first angles having a particular relationship to the relative bearing angle, means including differential means responsive to the values representing relative bearing angle for converting these values into values representing particular trigonometric functions of second angles having a particular relationship to the relative bearing angle, means for providing values representing horizontal target range, means responsive to the values representing the horizontal range and the particular trigonometric functions of the first angles for combining these values to obtain the product of the values, means including at least one servo loop responsive to the values representing horizontal target range and relative bearing angle for combining these values to produce values representing target speed, means including at least one servo loop responsive to the values representing horizontal range, target speed and the particular trigonometric functions of the first angles for combining these values to produce values representing time until explosion of the projectile, means including multiplying members responsive to the values representing target speed, time until explosion and the particular trigonometric functions of the second angle for combining these values to obtain second product values, and means including subtracting members responsive to the first and second product values for obtaining the difference between these product values to obtain values representing any errors in firing the projectile.

36. Apparatus for determining any error in firing projectiles from own ship at a target, including, means for providing values representing relative bearing angle as defined by own ship's course and a line of sound between own ship and target, means responsive to the values representing relative bearing angle for converting these values into values representing particular trigonometric functions of first angles having a particular relationship to the relative bearing angle, means including differential means responsive to the values representing relative bearing angle for converting these values into values representing the target angle between the line of sound and the target course, means including differential means responsive to the values representing the relative bearing angle and the target angle for combining these values to produce values representing particular trigonometric functions of second angles having a particular relationship to differences between the relative bearing angle and the target angle, means for providing values representing target range and target depth, means including at least one servo loop responsive to the values representing target range and target depth for combining these values to compute values representing horizontal target range, means including at least one servo loop responsive to the values representing the horizontal target range and the target angle for combining these values to produce values representing target speed, means for providing values representing the time until explosion of the projectile, means including multiplying members responsive to the values representing the horizontal target range and the particular trigonometric functions of the first angles for combining these values to obtain first product values, means including multiplying members responsive to the values representing target speed, time until explosion and the particular trigonometric functions of the second angles for combining these values to produce second product values, means responsive to the first and second product values for combining these values to provide values representing any attack error, and means responsive to the error values for providing an indication of the error values.

37. Apparatus for computing the bearing of a target relative to own ship in the absence of current information as to movements of said target, including, means for providing values representing any changes in own ship's course, means for providing values representing the speed of own ship, during the period of information absence, in a direction perpendicular to a line of sound between own ship and the target, means for providing values representing the speed of the target, means including a servo loop responsive to the values representing target speed for producing values representing the speed of the target in a direction perpendicular to the line of sound during the period of information absence, means including a differential and an integrator responsive to own ship's speed and the computed target speed in a direction perpendicular to the line of sound for combining these values to obtain a difference value, means responsive to the difference value for obtaining an integral of changes in this value, means including at least one servo loop for providing values representing target range and target depth, means responsive to the values representing target range and target depth for combining these values to compute values representing the horizontal distance between own ship and the target, means including a servo loop responsive to the values representing the integral and the horizontal distance between own ship and the target for combining these values to obtain values representing changes in the angular position of the line of sound, means for obtaining values representing changes in the angular direction of own ship's course, and means responsive to the difference between the values representing changes in the angular position of the line of sound and changes in the angular direction of own ship's course for combining these values to obtain values representing changes in the relative target bearing.

38. In apparatus for determining the horizontal range between a surface vessel and a submerged target, means for providing a value representing the range between the surface vessel and the submerged target, means for providing a value of target depth, means including a servo loop responsive to the values of range and target depth for combining these values to produce values representing the sine functions of the angle of depression of the target, means in the servo loop for obtaining the product of range and the sine function of the angle of target depression, means including an integrator in the servo loop for obtaining the difference between one half of the target range and the product of range and the sine value of the angle of depression of the target, means responsive to the difference value to stabilize the operation of the servo loop in obtaining the product of the range and the sine function of the angle of target depression, means including an integrator for taking an output representing the sine function from the loop, means responsive to the output representing the sine function for converting the sine function into the tangent function of half of the angle of depression, means including a servo loop responsive to the tangent function and the target depth for obtaining the product of these values, and means responsive to the values of range and the product of target depth and the tangent function for combining these values to obtain a difference value representing horizontal range between the surface vessel and the submerged target.

39. In apparatus for determining the horizontal range between a surface vessel and a submerged target, means for providing values of range between the surface vessel and the submerged target, means for providing values of target depth, means including a closed loop having a time motor and an integrator driven by the motor and responsive to the values representing range and target depth for combining these values to obtain values representing the sine of an angle of depression defined by the depth of the submerged target and the line between the surface vessel and the submerged target, means in the servo loop and including a multiplier for obtaining the product of range and the difference between the sine of the angle of target depression and a constant, means responsive to the values representing target depth and the product of range and the sine of the target angle of depression and a constant for balancing these values to control the operation of the servo loop in obtaining the sine of the angle of target depression, means responsive to the values representing the sine of the angle of target depression for converting these values into values representing the tangent of half of the angle of depression, means including a servo loop and an integrator in the loop responsive to the tangent values and the target depth for combining these values to obtain product values, and means including subtracting members responsive to the difference between the values representing range and the product of the tangent values and target depth for combining these values to obtain values representing the horizontal range between the surface vessel and the target.

40. In apparatus for directing own ship relative to a submerged target and arranged to receive data as to the target range and bearing relative to own ship and to combine such data with data representing the course and direction of own ship, means for converting the data representing the target range between the target and own ship to data representing the horizontal range between the target and own ship, means responsive to the data representing the horizontal target range for utilizing such data at successive instants of time to determine the displacement component of the target along and across a line of sound between own ship and the target, means responsive to the displacement components of the target along and across the line of sound for obtaining from such displacement components the vectorial rates of change of position of the target relative to own ship along and across the line of sound, means responsive to the vectorial rates of change of relative position of the target along and across the line of sound for converting such vectorial rates of change of relative position of the target along and across the line of sound to corresponding rates of change of relative position of the target along and across the track of the target, means responsive to such rates of change of relative position of the target along and across the track of the target and responsive to the currently received data as to the course and speed of own ship for combining such information to determine the position of the target relative to own ship in the absence of currently received data relating to target movement, means responsive to the computed position of the target and to the rates of change of target position relative to own ship for combining such information to determine course for a stern-dropped attack or a fixed-ahead-thrown attack dependent upon the arrangement of firing mechanisms upon the attacking ship, means responsive to the computed position of the target and to the rates of change of target position relative to own ship for combining such information to determine the time to fire for a stern-dropped attack or a fixed-ahead-thrown attack dependent upon the arrangement of firing mechanisms upon the attacking ship, means responsive to the computed position of the target and the rates of change of relative position of the target along and across the target track for combining such information to determine the advance range for a trainable-thrown attack, and means responsive to the computed position of the target and the rates of change of the relative position of the target along and across the target track for combining such information to determine projectile bearing order for a trainable-thrown attack.

41. In a device for directing own ship relative to a submerged target and arranged to receive data as to the target range and bearing and to combine such data with data representing the course and position of own ship, means responsive to the data representing target range for converting such data to data representing the horizontal range between own ship and the target, means responsive to the data representing the horizontal range between own ship and the target for utilizing such data to determine the displacement components of the target along and across a line of sound between own ship and the target, means responsive to the displacement components of the target along and across the line of sound for obtaining from such displacement components the vectorial rates of change of position of the target relative to own ship along and across the line of sound, means responsive to the vectorial rates of change of relative position along and across the line of sound for converting the vectorial rates of change of relative position along and across the line of sound to corresponding rates of change of position of the target relative to own ship along and across the track of the target, means responsive to the rates of change of position of the target relative to own ship along and across the track of the target and responsive to the currently received data as to the course and speed of own ship to compute the position of the target relative to own ship in the absence of currently received data relating to the target movement, means responsive to the change of position of the target relative to own ship along and across the track of the target for determining particular ballistic factors involved in a stern-dropped attack or a fixed-ahead-thrown attack dependent upon the firing mechanisms of the attacking ship, means responsive to the change of position of the target relative to own ship along and across the track of the target for determining particular ballistic factors involved in a trainable-thrown attack, and means for indicating the error to be anticipated in a stern-dropped attack or a fixed-ahead-thrown attack for a continuation of the present target course.

42. In combination in own ship, means for measuring target range and target depth, means responsive to the measurement of target range and target depth for computing continuously incremental changes in horizontal range between own ship and the target, means responsive to the measurements of target range and target depth for computing the tangent of half of the angle of target depression relative to own ship, means responsive to the measurement of target depth and the determinations of the tangent of half of the angle of target depression for continuously computing the product of target depth and the tangent of half of the angle of target depression, means responsive to the determinations of the last mentioned product and the incremental changes in horizontal range for continuously computing changes in the range between own ship and the target, and means responsive to the computed changes in the range between own ship and the target for returning such computed changes to the means for computing horizontal range to provide a computed indication as to the range between own ship and target in the absence of measurements of such range and to obtain indications as to the horizontal range between own ship and the target in the absence of measurements of the range between own ship and the target.

43. In apparatus for computing the measurements and positions of a target relative to own ship and having means for providing values representing the rates of change of target position along and across a line of sound between own ship and the target, means responsive to the rates of change of target position along and across the line of sound for determining changes in the bearing of own ship relative to the line of sound, means responsive to the changes in the bearing of own ship relative to the line of sound for determining changes in a target course angle defined by the line of sound and the target course, means responsive to the changes in the target course angle for computing corrected values of the sine and cosine of the target course angle, means responsive to the sine function of the target course angle and responsive to the rate of change of target position across the line of sound for obtaining the product of the sine function and the rate of change of target position across the line of sound, means responsive to the cosine function of the target course angle and responsive to the rate of change of target position along the line of sound for obtaining the product of the cosine function and the rate of change of target position along the line of sound, and means responsive to the last two mentioned products for combining the products on an additive basis to obtain a corrected value of target speed.

44. In combination to compute the movements and position of a target relative to own ship, means for providing vector components of target velocity along and across a line of sound between own ship and the target; means responsive to the vector components of target velocity along and across the line of sound for computing corrected values of the components of target velocity along and across the line of sound, said means comprising an integrator loop including an integrator, a constant speed motor for driving said integrator, and sequentially operable control means coupled to said integrator and said motor and arranged to be actuated by a correction to one of said components of target speed relative to the line of sound to control the time for actuation of the integrator by the motor and to obtain an interruption in the computation of the corrected value of the target velocity along and across the line of sound when a proper correction has been obtained; and means responsive to the corrected values of target velocity along and across the line of sound for computing target speed and the direction of target movement relative to the line of sound.

45. Apparatus as set forth in claim 44, including, means responsive to a deviation of the target from a fixed course for providing corrective values in accordance with the extent of target deviation from the fixed course, and means responsive to the corrective values and the values representing target speed for combining these values to obtain adjusted values for the target speed.

46. In combination for furnishing information as to the movements and position of a target relative to own ship, means for providing a value representative of target speed, means for providing a value representing a target angle defined by the direction of movement of the target and a line of sound between own ship and the target, means for providing values representing corrections in the target speed along and across the line of sound, means responsive to the value representing the target angle for converting this value into values representing the sine and cosine of the target angle, means responsive to the corrections in the speed of the target along the line of sound and the sine of the target angle for combining these values to obtain a first product of a correction component of target speed along the line of sound and the sine of the target angle, means responsive to the corrections in the speed of the target across the line of sound and the cosine of the target angle for combining these values to obtain a second product of a correction component of the target speed across the line of sound and the cosine of the target angle, means responsive to the first and second products for obtaining the difference between these products, means responsive to the speed of the target and to the difference between the first and second products to determine corrections in the target angle, and means responsive to the target angle and to the corrections in the target angle to determine a corrected value of the target angle.

47. Apparatus on own ship for computing the speed of a target, including, means for providing values representing the target bearing, differential means responsive to the values representing the target bearing to produce values representing corrections in the target bearing, means for providing values representing target range and target depth, means responsive to the values representing target range and target depth for combining these values to provide values representing the horizontal component of target range, means including an integrator responsive to the corrections in the target bearing and to the horizontal component of target range for obtaining the product of these values to produce values representing the displacement of the target across a line of sound between own ship and the target, differential means responsive to the values representing the horizontal component of target range for converting these values into values representing the displacement of the target along and across the line of sound, servo means responsive to the displacement of the target along and across the line of sound for producing values representing target speed along and across the line of sound, and integrator means responsive to the target speed along and across the line of sound for combining these values to produce values representing the speed of the target.

48. Apparatus on own ship for computing a target angle defined by the course of the target and a line of sound between own ship and the target, including, means for providing values representing the speed of the target along and across the line of sound, means for providing values representing the target angle, means responsive to the values representing the target angle for converting such values to values representing the sine and cosine of the target angle, first integrating means responsive to the values representing the components of target speed along and across the line of sound and responsive to the sine and cosine of the target angle for combining these values to produce values representing the target speed, second integrating means responsive to the values representing the components of target speed along and across the line of sound and responsive to the sine and cosine of the target angle and responsive to the values representing target speed for combining these values to produce values representing corrections in the target angle, means for providing values representing the target bearing, and differential means responsive to the values representing the target bearing and the corrections in the target angle for combining these values to produce values representing the target angle for introduction to the means for providing values representing the target angle.

49. Apparatus for computing the range of a target relative to own ship in the absence of current information as to movements of the target, including, means for providing values representing target range and target depth, first servo means responsive to the values representing target range and target depth for combining these values to produce values representing the product of the target depth and the sine of an angle representing target depression, means responsive to the values representing the last mentioned product and responsive to the values representing target range for combining these values to produce values representing horizontal target range, means for providing values representing own ship's speed, means responsive to the values representing own ship's speed for converting these values to values representing the component of own ship's speed along the line of sound between own ship and the target, second servo means for providing values representing the target speed and the target angle between the target course and a line of sound extending from own ship to the target, means responsive to the values representing the target angle for providing values representing a cosine of the target angle, means responsive to the values representing the cosine of the target angle and the values representing target speed for combining these values to obtain values representing the component of the target speed along the line of sound, integrating means responsive to the values representing the target speed along the line of sound and own ship's speed along the line of sound for combining these values to obtain values representing incremental changes in the horizontal range between own ship and the target, and differential means responsive to the values representing horizontal range and the incremental changes in the horizontal target range for combining these values to obtain new values representing the horizontal target range.

50. Apparatus for computing the bearing of a line of sound between a target and own ship relative to own ship's course in the absence of current information as to the movement of the target, including, means for providing values representing the relative bearing between own ship's course and the target course, means responsive to the values representing the relative bearing for converting these values into values representing the sine of the relative bearing, means for providing values representing own ship's speed, means responsive to the values representing own ship's speed and the sine of the relative bearing for combining these values to obtain values representing the component of own ship's speed across the line of sound, first servo means for providing values representing the target speed and the target angle between the line of sound and the target course, means responsive to the values representing the target angle for converting these values into values representing the sine of the target angle, means responsive to the values representing the sine of the target angle and representing the target speed for combining these values to obtain values representing the component of the target speed across the line of sound, means responsive to the values representing the components of own ship's speed and target speed across the line of sound for obtaining the difference between these values, means for providing values representing target range and target depth, second servo means responsive to the values representing target range and target depth for combining these values to obtain values representing corrections in the horizontal target range, third servo means responsive to the values representing the corrections in the horizontal target range and the difference between own ship's speed and target speed across the line of sound for combining these values to obtain values representing increments in a bearing angle between the line of sound and a reference direction, means responsive to the increments in the bearing angle for converting these increments into values representing increments in the bearing of the line of sound relative to own ship's course, and means responsive to the increments in the bearing of the line of sound relative to own ship's course for determining the bearing of the line of sound relative to own ship's course.

51. Apparatus for continuously computing the bearing of a line of sound between own ship and a target relative to own ship's course in the absence of current information as to the movements of the target, including, means for providing values representing target bearing, means responsive to the values representing target bearing for converting these values into values representing corrections in the target bearing, means for providing values representing target range and target depth, first servo means responsive to the values representing target range and target depth for combining these values to produce values representing the horizontal component of the target range, first integrator means responsive to the values representing the horizontal component of the target range and representing the corrections in the target bearing for combining these values to produce values representing the displacement of the target across a line of sound between own ship and the target, second servo means responsive to the values representing the displacements of the target across the line of sound for converting these values into values representing corresponding target speeds across the line of sound, means for providing values representing own ship's speed across the line of sound, third servo means responsive to the values of own ship's speed across the line of sound, target speed across the line of sound, and horizontal range for combining these values to produce values representing incremental changes in the bearing of the line of sound relative to own ship's course, and means responsive to the values representing the incremental changes in the bearing of the line of sound relative to own ship's course for combining such incremental changes to obtain values representing the bearing of the line of sound relative to own ship's course.

52. Apparatus for determining the corrections in own ship's course to move the ship into position for firing a projectile accurately at a submerged target, including, means for providing values representing the relative bearing angle defined by own ship's course and a line of sound between own ship and the target, means responsive to the values representing the relative bearing angle for combining these values to determine values representing the sine and cosine of a first angle constituting the complement of the relative bearing angle, differential means responsive to the values representing own ship's course and the relative bearing angle for combining these values to produce values representing a target angle between the line of sound and the target course, differential means responsive to the relative bearing angle and the target angle for combining these values to produce values representing a difference angle constituting the difference between the relative bearing angle and the sum of 180° and the target angle, means responsive to the values representing the last mentioned difference angle for converting these values into values representing the sine and cosine of such difference angle, means for providing values representing target range and target depth, first servo means responsive to the values representing target range and target depth for combining these values to compute values representing the horizontal target range, second servo means responsive to the values representing the target angle and the horizontal target range for combining these values to compute target speed, means responsive to the values representing the horizontal target range, the target speed and the sine and cosine of the first angle and the sine and cosine of the difference angle for combining these values to compute values representing the time remaining until the explosion of the projectile against the target, and means responsive to the values representing the horizontal target range, the target speed and the sine and cosine of the first angle and the sine and cosine of the difference angle and the time until explosion for combining these values to compute values representing corrections in own ship's course.

53. Apparatus for determining the corrections in own ship's course to move own ship into position for firing a projectile accurately at a submerged target, including, means for providing values representing the relative bearing angle defined by own ship's course and a line of sound between own ship and the target, means responsive to the values representing the relative bearing angle for converting these values into values representing the cosine of a first angle constituting the difference between 360° and the relative bearing angle, means for providing values representing the horizontal range to the target, means responsive to the values representing the horizontal range and the cosine of the first angle for combining these values to obtain first control values representing the product of the horizontal range and the cosine of the first angle, means responsive to the values representing the horizontal range and the relative bearing angle for combining these values to obtain values representing target speed, means responsive to the values representing the relative bearing angle for providing values representing a target angle defined by the line of sound and the direction of the target course, differential means responsive to the values representing the relative bearing angle and the target angle for combining these values to obtain values representing the sine and cosine of a second angle constituting the difference between the relative bearing angle and the sum of 180° and the target angle, means responsive to the values representing the target speed and the sine and cosine of the second angle for combining these values to obtain second control values representing the products of the target speed and the sine and cosine of the second angles, and means responsive to the first and second control values for combining these values to obtain values representing corrections in own ship's course.

54. Apparatus for determining the corrections in own ship's course to move the own ship into position for firing a projectile accurately at a submerged target, including, means for providing values representing target range and target depth, first servo means responsive to the values representing target range and target depth for combing these values to produce values representing horizontal target range, means for providing values representing relative bearing angle as defined by own ship's course and a line of sound between own ship and the target, means responsive to the values representing relative bearing angle for converting these values into values representing the cosine of a first angle constituting the difference between 360° and the relative bearing angle, means responsive to the values representing the horizontal range and the cosine of the first angles for combining these values to obtain first product values, differential means responsive to the values representing the relative bearing angle and the target course for combining these values to obtain values representing the target angle defined by the line of sound and the course of the target, means responsive to the values representing the target angle and the relative bearing angle for combining these values to obtain values representing a second angle constituting the difference between the relative bearing angle and the sum of the target angle plus 180°, means responsive to the values representing the second angle for converting these values into values representing the sine and cosine of the second angle, servo means responsive to the values representing the horizontal range and the target angle for combining these values to produce values representing target speed, means responsive to the values representing the horizontal range, the target speed and the cosine of the first angle for combining these values to produce values representing the time remaining until explosion of the projectile on the target, means responsive to the values representing the target speed, the time until explosion and the sine and cosine of the second angle for combining these values to obtain second product values, servo means for obtaining values representing a third angle constituting the correction to own ship's course, means responsive to the values representing the third angle for converting these values into values representing the sine and cosine of the third angle, means responsive to the values representing the first and second product values and the sine and cosine of the third angle for combining these values to obtain error values, and means in the servo loop and responsive to the error values for adjusting the values representing the angles of correction to own ship's course in a direction to minimize the error values.

55. Apparatus for determining the time to fire a projectile from own ship for striking a submerged target, including, means for providing values representing target range and target depth, servo means responsive to the values representing target range and target depth for combining these values to produce values representing horizontal target range, means for providing values representing relative bearing angle defined by own ship's course and a line of sound between own ship and the target, means responsive to the values representing the relative bearing angle for converting these values into values representing the cosine of a first angle constituting the difference between 360° and the relative bearing angle, means responsive to the values representing the relative bearing angle to produce values representing the target angle between the line of sound and the target course, means responsive to the values representing the relative bearing angle and the target angle for combining these values to produce values representing the sine and cosine of second angles constituting the difference between the relative bearing angle and the sum of 180° and the target angle, servo means responsive to the values representing the horizontal range and the target angle for combining these values to produce values representing target speed, means for providing values representing time to fire, means responsive to the values representing the time to fire for adjusting these values in accordance with values representing particular constants dependent upon the characteristics of the projectile to obtain values representing time until explosion, means for providing values representing own ship's speed, means responsive to the values representing time until explosion and own ship's speed for combining these values to obtain first control values, means responsive to the values representing the horizontal target range, the target speed, the time until explosion, the first control values and the sine and cosine of the second angle and the cosine of the first angle for combining these values to obtain error values, and means responsive to the error values to adjust the values representing time to fire in a direction for reducing the error values.

56. Apparatus for determining the angle at which to fire a projectile from own ship toward a moving target in a trainable-thrown attack with a variable component transverse to the direction of own ship's movement, including, means for providing values representing target range and target depth, servo means responsive to the values representing target range and target depth for combining these values to produce values representing horizontal target range, means for providing values representing relative bearing angle defined by own ship's course and a line of sound between own ship and the target, means responsive to the values representing relative bearing angle for converting these values to values representing the cosine of a first angle constituting the difference between 360° and the relative bearing angle, means responsive to the values representing relative bearing angle to compute values representing the target angle between the line of sound and the target course, means responsive to the values representing the relative bearing angle and the target angle for combining these values to compute values representing the sine and cosine of second angles constituting the difference between the relative bearing angle and the sum of the target angle and 180°, servo means responsive to the values representing the horizontal range and the target angle for combining these values to compute values representing target speed, means for providing values representing particular time constants having a particular relationship to the flight characteristics of the projectile, means for providing values representing the angle for firing the projectile relative to the direction of own ship's movement, means responsive to the values representing the angle of firing the projectile for converting these values into values representing the sine and cosine of a third angle constituting the difference between 360° and the angle of firing the projectile, means responsive to the values representing the cosine of the first angle and sine and cosine of the second and third angles and representing the target speed and the horizontal target range for combining these values to generate error values, and servo means responsive to the error values to adjust the values of the angle for firing the projectile in a direction to reduce the error values.

57. Apparatus for determining the angle at which to fire a projectile from own ship towards a moving target in a trainable-thrown attack with a variable component transverse to the direction of own ship's movement, including, means for providing values representing relative bearing angle defined by own ship's course and a line of sound between own ship and the target, means responsive to the values representing relative bearing angle for converting these values into values representing the cosine of a first angle constituting the difference between 360° and the relative bearing angle, means responsive to the values representing the relative bearing angle for computing values representing a target angle between the line of sound and the target course, means responsive to the values representing the relative bearing angle and the target angle for combining these values to compute the sine and cosine of a second angle constituting the difference between the relative bearing angle and the sum of 180° and the target angle, means for providing values representing target range and target depth, servo means responsive to the values representing target range and target depth for combining these values to compute values representing horizontal target range, servo means responsive to the values representing the horizontal range and the target angle for combining these values to compute values representing target speed, means for providing values representing particular time factors having a particular relationship to the flight characteristics of the projectile and to the time for the projectile to sink to the target depth, means for providing values representing the angle for firing the projectile relative to the direction of own ship's movement, means responsive to the values representing the angle of firing the projectile for converting these values into values representing the sine and cosine of a third angle constituting the difference between 360° and the angle for firing the projectile, means responsive to the values representing the target speed, the horizontal target range, the time factors, the cosine of the first angle and the sine and cosine of the second and third angles for combining these values to obtain first output values, means responsive to the values representing own ship's speed, the target speed, the horizontal target range, the cosine of the first angle and the sine and cosine of the second and third angles for combining these values to obtain second output values, means responsive to the first and second output values to obtain an error value, and servo means responsive to the error value for adjusting the value of the angle for firing the projectile in a direction to minimize the error value.

58. Apparatus for computing the range and angle for firing a projectile from own ship towards a target in a trainable-thrown attack, including, means for providing values representing the relative bearing angle between own ship's course and a line of sound between own ship and the target, means responsive to the values representing the relative bearing angle for converting these values into values representing the cosine of a first angle constituting the difference between 360° and the relative bearing angle, means responsive to the relative bearing angle to compute values representing a target angle between the line of sound and the target course, means responsive to the values representing the relative bearing angle and the target angle to compute values representing the sine and cosine of a second angle constituting the difference between the relative bearing angle and the sum of 180° and the target angle, means for providing values representing target range and target depth, servo means responsive to the values representing target range and target depth for combining these values to compute values representing horizontal target range, servo means responsive to the values representing the horizontal target range and the relative bearing angle for combining these values to compute values representing target speed, servo means responsive to the values representing the target speed, the horizontal target range and the cosine of the first angle and the sine and cosine of the second angle for combining these values to produce values representing the angle for firing the projectile relative to the direction of own ship's movement, means responsive to the values representing the angle of firing the projectile for converting these values into values representing the sine and cosine of a third angle constituting the difference between 360° and the angle for firing the projectile, and means responsive to the values representing the target speed, the horizontal target range, the cosine of the first angle and the sine and cosine of the second and third angles for combining these values to produce values representing the range at which to fire the projectile.

59. Apparatus for determining any error in firing a projectile from own ship at a target, including, means for providing values representing relative bearing angle defined by own ship's course and a line of sound between own ship and the target, means responsive to the values representing the relative bearing angle for converting these values into values representing the sine and cosine of a first angle constituting the difference between 360° and the relative bearing angle, means responsive to the values representing the relative bearing angle for producing values representing a target angle defined by the line of sound and the target course, means responsive to the values representing the relative bearing angle and the target angle for converting these values into values representing the sine and cosine of a second angle constituting the difference between the relative bearing angle and the sum of the target angle and 180°, means for providing values representing horizontal target range, means responsive to the values representing the horizontal target range and the sine and cosine of the first angle for combining these values to obtain first product values, servo means responsive to the values representing the horizontal target range and the relative bearing angle for combining these values to produce values representing target speed, servo means responsive to the values representing the horizontal range, the target speed and the sine and cosine of the first and second angles for combining these values to produce values representing time until explosion of the projectile, means responsive to the values representing the target speed, the time until explosion and the sine and cosine of the second angle for combining these values to obtain second product values, and subtracting means responsive to the first and second product values for obtaining the difference between these product values to produce values representing any errors in the firing of the projectile.

References Cited in the file of this patent
UNITED STATES PATENTS

| | | |
|---|---|---|
| 2,403,542 | Newell | July 9, 1946 |
| 2,404,011 | White | July 16, 1946 |
| 2,564,698 | Knowles | Aug. 21, 1951 |
| 2,600,159 | Ergen | June 10, 1952 |
| 2,616,625 | Griest et al. | Nov. 4, 1952 |
| 2,660,371 | Campbell | Nov. 24, 1953 |

OTHER REFERENCES

Mechanical Computing Mechanisms; by Reid and Stromback, appearing in Product Engineering August-November 1949 (four articles). Article appearing November 1949, pp. 121–124 of special interest.

Electronic Instruments, vol. 21, Radiation Laboratory Series, McGraw-Hill, 1948, p. 164 relied on.